US010139496B2

(12) United States Patent
Evrard et al.

(10) Patent No.: US 10,139,496 B2
(45) Date of Patent: Nov. 27, 2018

(54) MULTI-RADIATION IDENTIFICATION AND DOSIMETRY SYSTEM AND METHOD

(71) Applicant: Canberra Industries, Inc., Meriden, CT (US)

(72) Inventors: Olivier Roger Evrard, Olen (BE); Roger Abou-Khalil, Paris (FR); Stephane Dogny, Bagnols-sur-Ceze (FR); Nabil Menaa, Montigny-le-Bretonneux (FR); Wilhelm Friedrich Mueller, Meriden, CT (US); Mathieu Morelle, Olen (BE); Edward Lee Reagan, Meriden, CT (US)

(73) Assignee: MIRION TECHNOLOGIES (CANBERRA), INC., Meriden, CT (US)

( * ) Notice: Subject to any disclaimer, the term of this patent is extended or adjusted under 35 U.S.C. 154(b) by 433 days.

(21) Appl. No.: 14/963,504

(22) Filed: Dec. 9, 2015

(65) Prior Publication Data

US 2017/0146668 A1 May 25, 2017

(30) Foreign Application Priority Data

Nov. 25, 2015 (FR) .................................. 15 61389

(51) Int. Cl.
*G01T 1/02* (2006.01)
*G01T 1/169* (2006.01)
(Continued)

(52) U.S. Cl.
CPC .............. *G01T 1/023* (2013.01); *G01T 1/169* (2013.01); *G01T 1/20* (2013.01); *G01T 1/208* (2013.01);
(Continued)

(58) Field of Classification Search
CPC ....... G01T 1/203; G01T 1/208; G01T 1/2018; G01T 1/169; G01T 1/2928; G01T 1/20; G01T 7/00
See application file for complete search history.

(56) References Cited

U.S. PATENT DOCUMENTS

| 8,421,172 B2 | 4/2013 | Morichi et al. |
| 2010/0096674 A1* | 4/2010 | Christophersen ........... H01L 31/02240 257/290 |

(Continued)

FOREIGN PATENT DOCUMENTS

EP 2246711 A2 3/2010

OTHER PUBLICATIONS

Hartmann R et al: "Ultrathin entrance windows for silicon drift detectors", Nuclear Instruments & Methods in Physics Research, Section A: Accelerators, Spectrometers, Detectors, and Associated Equipment, vol. 387, No. 1, mars 1, 1997 (Mar. 1, 1997), pp. 250-254, ISSN: 0168-9002.

(Continued)

*Primary Examiner* — David Porta
*Assistant Examiner* — Mindy Vu
(74) *Attorney, Agent, or Firm* — David W. Carstens; James H. Ortega; Carstens & Cahoon, LLP

(57) ABSTRACT

A multi-radiation identification and dosimetry system and method that allows for monitoring of alpha, beta, and gamma radiation is disclosed. The system/method incorporates a segmented silicon drift detector (SSDD) that allows measurement of directly absorbed radiation in the semiconductor (betas, conversion electrons, Lx lines, and alphas) on one SSDD segment and radiation from a radiation scintillation detector (RSD) on multiple segments of the SSDD. With the anode side of the SSDD directed toward the radiation inspection surface (RIS), the SSDD+RSD stacked (Continued)

radiation detector collects radiation which is processed by a charge sensitive amplifier (CSA) and then processed by a time stamping differentiator (TSD). A computing control device (CCD) may be configured to collect the time stamp differentiation data from the various SSDD segments to permit the simultaneous discrimination of several types of radiation by and presentation of these radiation types and counts on a display monitor.

60 Claims, 72 Drawing Sheets

(51) Int. Cl.
  *G01T 1/20* (2006.01)
  *G01T 1/29* (2006.01)
  *G01T 1/208* (2006.01)
  *G01T 7/00* (2006.01)

(52) U.S. Cl.
  CPC .......... *G01T 1/2018* (2013.01); *G01T 1/2928* (2013.01); *G01T 7/00* (2013.01)

(56) References Cited

U.S. PATENT DOCUMENTS

| | | |
|---|---|---|
| 2010/0264319 A1 | 10/2010 | Morichi et al. |
| 2011/0012216 A1 | 1/2011 | Morichi et al. |
| 2012/0132814 A1* | 5/2012 | Weinberg ............. G01V 5/0075 250/362 |
| 2015/0102227 A1* | 4/2015 | Nygrd ................... G01T 1/247 250/370.09 |

OTHER PUBLICATIONS

Pausch G et al: "Demonstration of a Dual-Range Photon Detector With SDD and Scintillator", IEEE Transactions on Nuclear Science, vol. 56, No. 3, juin 1, 2009 (Jun. 1, 2009), pp. 1229-1237, ISSN: 0018-9499.

G. Lutz: "Silicon drift and pixel devices for X-ray imaging and spectroscopy", Journal of Synchrotron Radiation, vol. 13, No. 2, fevrier 17, 2006 (Feb. 17, 2006), pp. 99-109, ISSN: 0909-0495.

Marisaldi, M., et al., "X- and Gamma-Ray Detection With a Silicon Drift Detector Coupled to a CsI(T1) Scintillator Operated With Pulse Shape Discrimination Technique," IEEE Transactions on Nuclear Science, vol. 52, No. 5, Oct. 2005, pp. 1842-1848.

Marisaldi, Martino, et al., "A Pulse Shape Discrimination Gamma-Ray Detector Based on a Silicon Drift Chamber Coupled to a CsI(T1) Scintillator: Prospects for a 1 keV-1 MeV Monolithic Detector," IEEE Transactions on Nuclear Science, vol. 51, No. 4, Aug. 2004, pp. 1916-1922.

Whim and Mission Opportunities Presentation, "Wide Field Monitor: Prospect for Use of Silicon and Scintillator Detectors," ROMA, Jan. 2006, retrieved from: http://slidegur.com/doc/1830861/silicon-drift-detectors-coupled-to-csi-tl-scintillators.

* cited by examiner

FIG. 4
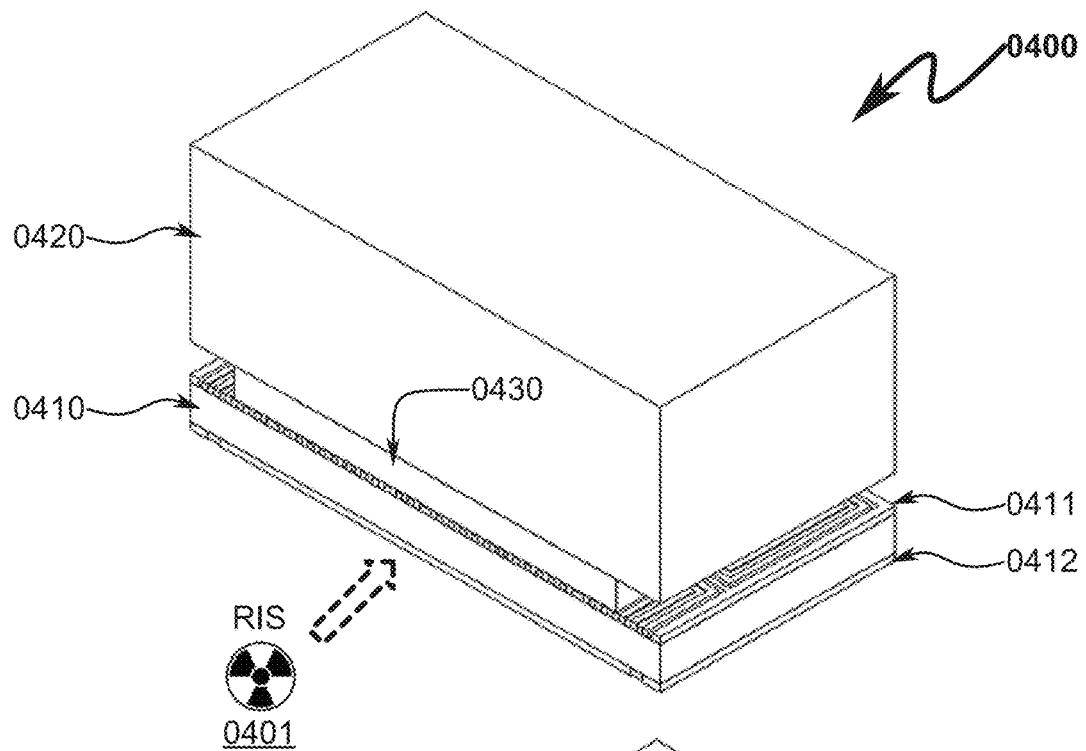
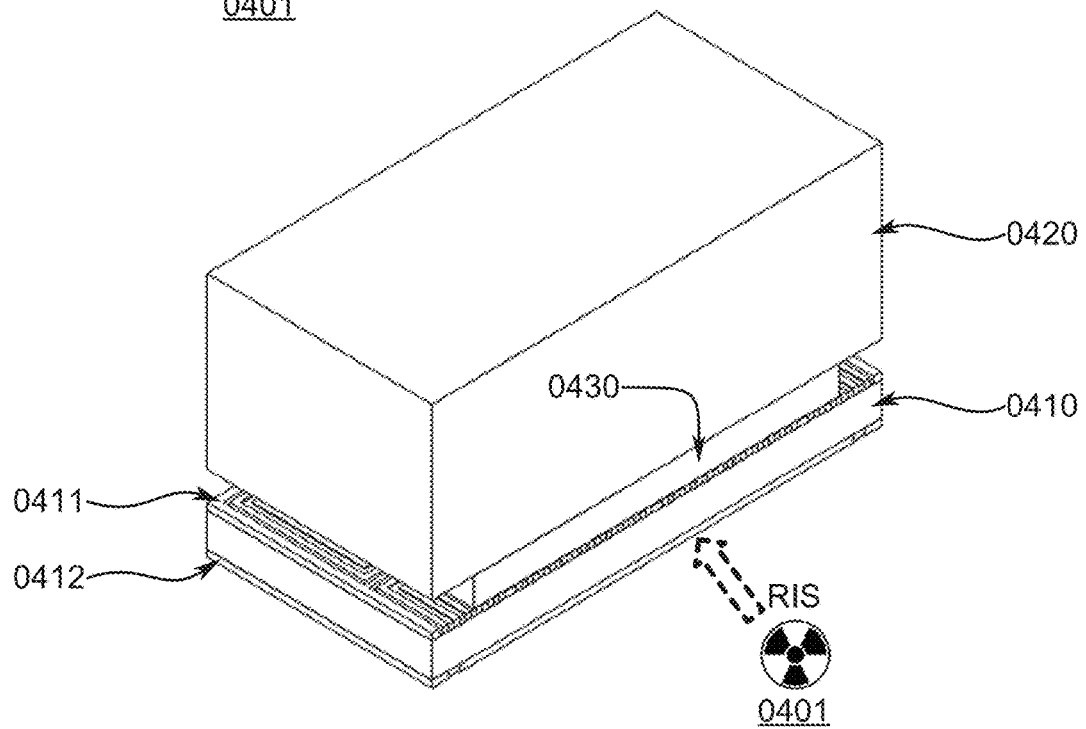

1700

2600

3700

4200

MULTI-RADIATION IDENTIFICATION AND DOSIMETRY SYSTEM AND METHOD

CROSS REFERENCE TO RELATED APPLICATIONS

Foreign Patent Application

This application claims benefit under 35 U.S.C. § 120 and hereby incorporates by reference French Patent Application for MULTI-RADIATION IDENTIFICATION AND DOSIMETRY SYSTEM AND METHOD by inventor Olivier Roger EVRARD, French Patent Application No. 1561389, filed Nov. 25, 2015.

PARTIAL WAIVER OF COPYRIGHT

All of the material in this patent application is subject to copyright protection under the copyright laws of the United States and of other countries. As of the first effective filing date of the present application, this material is protected as unpublished material.

However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO A MICROFICHE APPENDIX

Not Applicable

FIELD OF THE INVENTION

The present invention generally relates to systems and methods in the field of radiation detection and has specific application to scenarios involving detection of alpha, beta, and gamma radiation on contaminated surfaces.

PRIOR ART AND BACKGROUND OF THE INVENTION

Overview

Decontamination and decommissioning (D&D) activities of a nuclear power plant require a preliminary diagnosis of the distribution of the radio elements present on the surfaces to be decommissioned. A full inspection of alpha, beta, and gamma radiations is needed in order to have a good assessment of the measures that need to be taken in the planning of the decommissioning of a given installation.

A D&D process is a very costly enterprise. Neglecting any radionuclide in the identification can generate huge additional costs. Experience has shown that focusing on one or two radiation families can be problematic.

In some D&D nuclear power plants, only beta-gamma were sometimes measured, and alpha emitters were identified in a late phase, resulting in a complete redefinition of the D&D strategy in the middle of the process. A decommissioning process of a given location will require a typical budget of USD$20M-USD$30M. Neglecting the identification of critical radionuclides can double or triple the initial budget foreseen for a given nuclear power plant.

Focusing on three radiations families (alpha, beta, gamma) is ideal. Being able to perform the measurements in situ can allow the decommissioning activity to be much more efficient. The taking of swabs, the necessary passing through SAS systems, the travel to the lab, the sending of the interpreted data from a lab to a nuclear power plant are very time consuming processes that greatly increase the cost of the D&D process.

Separate Beta-Gamma Counting

Why do some D&D experts limit themselves to simple beta gamma counting with separate devices? The answer to this question involves the typical list of elements that can be present on a D&D site. The decommissioning of a nuclear power plant will generally occur several years after the nuclear power plant has ceased to operate. The table presented below provides a typical list of elements that can be present on a D&D site:

| Isotope | Half-Life (years) | Beta Energy (keV) | Gamma Energy (keV) | U-235 Fission Yield | Activity Ratio to Cs-137 |
|---|---|---|---|---|---|
| Se-70 | 6.50E+04 | 149 | NA | 0.045 | 3.30E−06 |
| Kr-85 | 1.07E+01 | 687 | 514 | 1.31 | 5.90E−07 |
| Sr-90 | 2.88E+01 | 546 | NA | 5.91 | 9.80E−01 |
| Zr-93 | 1.53E+06 | 62 | NA | 6.38 | 2.10E−05 |
| Tc-98 | 4.20E+06 | 394 | NA | 5.77 | 6.60E−06 |
| Tc-99 | 2.11E+05 | 294 | NA | 6.1 | 1.40E−04 |
| Ru/Rh-106 | 1.02E+00 | 3541 | 512 | 0.402 | 1.90E+00 |
| Pd-107 | 6.50E+06 | 33 | NA | 0.14 | 7.40E−08 |
| Sn-121 | 5.50E+01 | 388 | NA | 0.013 | 1.10E−03 |
| Sb-125 | 2.76E+00 | 622 | 428 | 0.029 | 5.00E−02 |
| I-129 | 1.57E+07 | 152 | NA | 0.74 | 2.20E−07 |
| Cs-134 | 2.06E+00 | 658 | 796 | Activation | NA |
| Cs-137 | 3.01E+01 | 511 | 662 | 6.22 | 1.00E+00 |
| Ce-144 | 7.80E−01 | 318 | 134 | 5.47 | 3.40E+01 |
| Pm-147 | 2.62E+00 | 225 | NA | 2.25 | 4.20E+00 |
| Sm-151 | 9.00E+01 | 76 | NA | 0.418 | 2.20E−02 |
| Eu-154 | 8.59E+00 | 1884 | 723 | Activation | NA |
| Eu-155 | 4.76E+00 | 141 | 1053 | 0.032 | 3.10E−02 |

To this list have to be added 60-Co that arises from transmutation of Ni in stainless steel and Inconel, 40-K and 55-Fe that are present in concrete. 14-C and tritium can as well be present and are often hard to detect with good efficiencies. A series of small lifetime radio elements will have decayed and will therefore not be present in the spectras recorded.

In terms of gamma emission, one of the most sought elements is 137-Cs emitting gammas at 662 keV and betas with a maximum energy of 511 keV with a half-life of 30 years. In terms of beta emission, 90-Sr, a sole beta emitter with a maximum energy of 546 keV with a half-life of 28.8 keV are the mainly investigated element.

The discussion below provides a brief technological study of multi-radiation measurement schemes.

Separate Device Measurement

The method for identifying activity of 90-Sr and 137-Cs with separate devices starts with an activity hypothesis. (See "Characterization of Mixed Beta/Gamma Surface Contamination Using Passive Radiation Measurements" R. C. Hochel Westinghouse Savannah River Company Aiken, S.C. 29808 OSTI DOE note on D&D done under Contract Number DE-AC09-965R18500 with the U.S. Department of Energy. Site address http://www.osti.gov/home/ Document address: http://sti.srs.gov/fulltext/tr2000331/tr2000331.html, Reference WSRC-MS-2000-00331). A hypothesis which is often taken is the dominance of 90-Sr and 137-Cs. For determining the activity of these two elements, beta-gamma inspections have been carried out by using a combination beta and gamma detectors. Several detector combinations are possible such as electret-(NaI/PM), pancake-(NaI/PM) or PIPS-(NaI/PM) combinations.

The activities of 90-Sr are generally derived by performing an spectroscopy measurement of the integral of the 662 keV peak of 137-Cs. From this, the activity of 137-Cs is derived. An electret or pancake detector is then used for beta counting. The inferred electrets counting rate coming from the beta emission of 137-Cs is computed and subtracted from the global electrets counting rate. From this, the deduced electrets counting rate of the 90-Sr is deduced and thus the activity of 90-Sr is:

$$ECR\ 90\text{-}Sr=ECR\ global-ECR\text{-}beta\ 137\text{-}Cs$$

from g NaI activity.

Single Device Measurement

Single devices allowing multi-radiation detection are more sophisticated and allow the separation of different radiation kinds:
by pulse duration differentiation;
by pulse shape discrimination;
by the definition of energy ROIs (for beta alpha spectroscopy in vacuum); and
by time-stamped differentiation.

Beta Gamma Detection with One Single Device

Rising interests have been generated for performing dual beta-gamma detection. The simultaneous detection of betas and gammas using sandwiching scintillators layers that have a specific response to betas and gammas are investigated by Oregon State University (see New Technology To Speed Cleanup Of Nuclear Contaminated Sites, Oregon State University (2010, Dec. 31). Science Daily. Nov. 5, 2012, from http://www.sciencedaily.com/releases/2010/12/101230140705.htm). The possibility to be able to perform both beta and gamma detection from the same device provides a more compact solution to the customer. The application of a surrounding plastic scintillator surrounding a NaI scintillator allows the detection of betas and gammas, the plastic material responding to betas and the NaI to gammas with different scintillating times.

It should be noted though that the beta resolutions of plastic scintillators are poor if compared to PIPS.

Alpha Beta Detection with a Single Device

Phoswitches.
Similarly, devices that detect alphas and betas from the same detector by sandwiching scintillators layers that have a specific response to alphas and betas is now a standard commercial solution. The Ludlum 43-89 alpha/beta phoswitch probe is such an example. The simultaneous detection of alphas and betas is mainly done by using phoswitch detectors where a ZnS layer is deposited on plastic scintillating materials, the ZnS material responding to alphas and the plastic material responding to betas with different emission times. A time width discrimination is then performed.

However, these scintillators must be coupled to PM tubes that can be fragile and take some volume. Moreover, their C-14 efficiency is poor and is in the vicinity of 4%. The cross talk of alphas to betas is still in the vicinity of 10%. Pancake detectors are traditionally used for beta detection with good efficiencies and can lead to C-14 efficiencies ranging between 7.3% to 12%. They do not have however any other possibility to discriminate alphas from betas other than by the application and the removal of a filter and by subtracting the counting performed with and without alpha filters.

Alpha-Beta Detection with Silicon Detectors

For dual alpha-beta detection, silicon detectors are an interesting alternative to PMs due to their compactness, allowing them to gain significant volume savings that can be gained by incorporating a gamma detection module, but the detection of low energy betas such as the ones of C-14 and the detection of higher energy betas such as the ones of Sr-90 require a very good low-energy threshold.

Two solutions are thus anticipated by the present invention:
The pixelization of the silicon area into several segments of acceptable capacity and leakage currents in order to ensure a low energy threshold that is low enough for ensuring the measurement of the lowest energy beta emitters such as 14-C; and
The use of very low capacitance Silicon Drift Detectors. Such detectors are taught by the present invention.

Although the alpha resolutions of PIPS is very good in a vacuum, measurements of sources done in air at too big a distance from the source will result in the tailing of alphas. The low energy extension of the alpha tail will extend to the range of beta energies, resulting in a poor differentiation between alphas and betas. If the energy loss must be reduced, the devising of a vacuum enclosure applied on the surface to be inspected can be a solution as taught by the present invention. This is one of the options that is taught by the present invention.

Alpha Beta Gamma Spectroscopy

Ideally, having one device being able to measure alphas, betas and gammas would be ideal. Such a study was carried out in 2011 (See Seiichi Yamamoto, Jun Hatazawa, Development Of An Alpha/Beta/Gamma Detector For Radiation Monitoring, *Review of Scientific Instruments*, 2011 American Institute of Physics (2011, Nov. 9); New Hybrid Detector Monitors Alpha, Beta, And Gamma Radiation Simultaneously, Science Daily, Retrieved Nov. 5, 2012, from http://www.sciencedaily.com/releases/2011/11/111108201548.htm).

Lx Spectroscopy

Semiconductor detectors having good resolutions can be very efficient tools for discerning several actinides by the Lx lines of their decay product. Strauss shows the use of SiLi detectors for the tracing of radionuclide in soil samples (See Si(Li)—Nai(Tl) Sandwich Detector Array For Measurements Of Trace Radionuclides In Soil Samples, M. G. Strauss, I. S. Sherman, C. T. Roche, Argonne National Laboratory, Argonne, Ill. 60439, USA; R. H. Pehl, Lawrence Berkeley Laboratory, Berkeley, Calif. 94720, USA, Available online 14 Oct. 2002, http://dx.doi.org/10.1016/0168-9002(86)90435-3, Publication date: 1985-01-01 OSTI Identifier: OSTI ID: 5419289, Report Number(s): CONF- 850533-10 DOE Contract Number: W-31-109-ENG-38 Resource Relation: Conference: 6. symposium on X- and gamma-ray sources and applications, Ann Arbor, Mich., USA, 21 May 1985).

With FWMH resolution of 400 eV at 17 keV, the UL$\beta$1 and NpL $\beta$1 X-ray peaks are resolved thus permitting measurement of trace Pu in the presence of 241-Am. This is the most sensitive and selective detector known for nondestructive assay of radioactivity in soil and other samples.

Diprete describes a SDD used for the Lx spectroscopy of sludge wastes (See Radiometric Detector Options To Aid In Doe In High Activity Waste Tank In Situ Characterization Efforts, David Diprete, Cecilia Diprete, J Radioanal Nuck Chemm 296:1017-1023). Several lines are identified with an Amptek 123 detector:

Np X-rays from Am decay (13.8 keV L alpha and 17.8 L beta1);
U X-rays from Pu decay (13.5 KeV L alpha and 17.2 keV Lbeta1);
Y-90 X-rays from Sr-90 decay;
Zr X-rays from Sr-90 decay;
Ba X-rays from Cs-137 decay (32 keV K alpha and 36.04 keV L beta);
Pu from 244-Cm (14.1 keV L alpha and 18.3 keV L beta1);
Gadolinium X-rays from 154-Eu decays (6.0 keV L alpha and 6.7 keV Lbeta1).

The use of a 2000 Gauss magnetic field is used for deviating betas from the domain of interest of g Lx spectroscopy in order to reduce the background.

The potential of silicon drift detector is thus of high interest. They have the necessary efficiency in these low energy ranges, do not require cryogeny to keep them at a reasonable temperature, and can even be used at room temperature. The use of SDDs of large area for Lx spectroscopy is disclosed in detail in the present invention.

Deficiencies in the Prior Art

The prior art as detailed above suffers from the following deficiencies:
Prior art multi-radiation detection systems are generally not portable.
Prior art multi-radiation detection systems are not amenable to use in surface contamination application contexts.
Prior art multi-radiation detection systems have poor efficiencies.

While some of the prior art may teach some solutions to several of these problems, the core deficiencies in the prior art systems have not been addressed.

OBJECTIVES OF THE INVENTION

Accordingly, the objectives of the present invention are (among others) to circumvent the deficiencies in the prior art and affect the following objectives:
(1) Provide for a multi-radiation identification and dosimetry system and method that is portable.
(2) Provide for a multi-radiation identification and dosimetry system and method that is amenable to use in surface contamination application contexts.
(3) Provide for a multi-radiation identification and dosimetry system and method that permits high efficiency measurement.

While these objectives should not be understood to limit the teachings of the present invention, in general these objectives are achieved in part or in whole by the disclosed invention that is discussed in the following sections. One skilled in the art will no doubt be able to select aspects of the present invention as disclosed to affect any combination of the objectives described above.

BRIEF SUMMARY OF THE INVENTION

The present invention addresses several of the deficiencies in the prior art as follows. The present invention includes various embodiments of large area silicon drift detectors (SDD). In the disclosed embodiments, the SDD detector is segmented (herein referred to as a segmented silicon drift detector (SSDD)), the number of segments being equal to or greater than two.

The SSDD is coupled to a radiation scintillation detector (RSD). In one preferred embodiment the anode side of the SSDD may be directed toward the medium to be inspected. This embodiment is useful for applications requiring direct detection of ionizing radiations such as alphas, betas, conversion electrons, and X-rays. The differentiation between radiations absorbed directly in the SSDD and the radiation absorbed in the RSD is performed by time-stamped differentiation and may be implemented using a computing control device (CCD).

A directly absorbed radiation will be detected by one segment in the SSDD, while a radiation absorbed in the RSD will generate visual photons that will reach both segments simultaneously. Differentiation of scintillated and directly absorbed radiation is performed by time-stamped differentiation (via a CCD or other special purpose hardware) of simultaneous multiple hits in single hits. This approach differentiates the present invention from the prior art where the SDD detector is a single segment detector and where radiations directly absorbed in the scintillator and radiations absorbed in the scintillator are differentiated by pulse shape discrimination. The present invention allows the development of low power multi-segment detectors totalizing areas of 3-4 cm$^2$ coupled to a number ranging from 4 to 8 channels of low noise charge storage amplifiers (CSAs) realized on application specific integrated circuits (ASICS) that can allow the obtaining of X-ray resolutions of segments of 50-80 mm$^2$ and 400 eV at room temperature. The need to have from 4 to 8 channels for obtaining good Lx resolutions and maintaining very low power consumptions of MCAs favors analog Gaussian shaping, therefore justifying the directly absorbed radiations and scintillated radiations differentiation by time-stamped single-multiple hit analysis.

For ultimate performances, the SSDD may be cooled by Peltier elements and segmented into several segments, every segment being coupled to a CSA channel of an application specific integrated circuit (ASIC). An estimation of the Lx resolution as a function of the area of the segment and of the temperature of the SSDD is provided in the figures.

In another embodiment, a 2000 gauss magnetic field allows the deviation of the betas outside of the detector area for improving the MDA of radionuclides characterized by their Lx lines.

In another embodiment, the SSDD is used itself both as an alpha detector and as an Lx, beta, CE detector. The counter anode side (SSDD cathode side) is then directed toward the medium to be inspected.

A segmented SSDD using micro linear anodes is also taught by the present invention. The examples illustrate a segment area of approximately 30 mm$^2$. Eight of these segments totalize an area of 240 mm$^2$. This design optimizes the tradeoff between the need to keep small drift lengths for scintillation application (see U.S. Patent Application US20110012216) and the need to reduce the series noise and the anode to steering ring capacitance.

Also disclosed by the present invention is a micro linear anode design where the degree of pixelization is chosen by interlinking a chosen number of micro linear anodes (ranging from 1 to 64, but typically from 1 to 4) together and linking them to a FET. The anodes can be interlined by wire bonding, by metallic interconnect lines realized on a polyimide spacer layer or by bonding to a PCB where very small buss bar lines are designed in order to minimize the parasitic capacitance. The typical length of these micro anodes range between 100 μm and 2000 μm. The connection of these channels to very compact arrays may be realized based on ASIC performance.

In another embodiment, the SSDD detector is enclosed in the upper part of a vacuum chamber. This chamber is devised so that it can be positioned on a double ring system that is fixed on the surface to be inspected by applying glue in the groove region between both rings. A groove is formed on the second ring, allowing the placement of an O-ring that will enable vacuum when the upper part of the vacuum chamber is set in contact with the double ring glued on the surface to be inspected.

In another embodiment, A SSDD detector and a scintillator are devised in an annular way, allowing an X-ray beam to pass through a central cavity for exciting the Lx lines of the surface to be inspected.

In another embodiment, a HpGe detector or Si—Li detector is devised in an annular way, allowing an X-ray beam to pass through a central cavity for exciting the Lx lines of the surface to be inspected.

In another embodiment, an improved alpha spectroscopy is shown where a classical ABS detector for alpha spectroscopy detector neighbors an SSDD detector that can be used to give complementary information on Lx spectroscopy and conversion electrons spectroscopy.

BRIEF DESCRIPTION OF THE DRAWINGS

For a fuller understanding of the advantages provided by the invention, reference should be made to the following detailed description together with the accompanying drawings wherein:

FIG. 4 illustrates front and right perspective section views of a combined SSDD+RSD radiation detector with SSDD anode surface mated to the RSD and SSDD cathode directed toward the RIS;

DESCRIPTION OF THE PRESENTLY PREFERRED EXEMPLARY EMBODIMENTS

Figure 1:
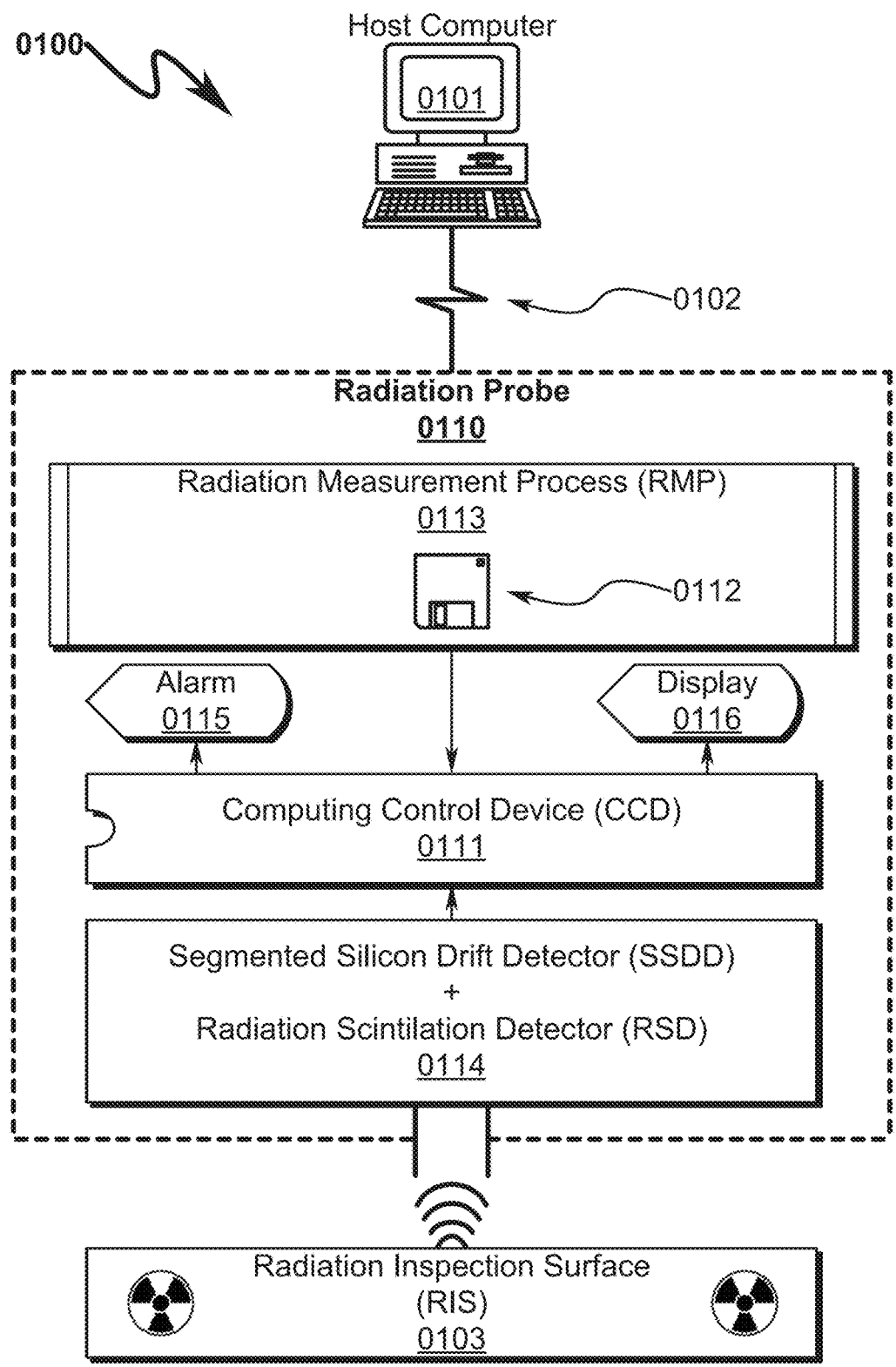
FIG. 1 illustrates an overview system block diagram depicting a preferred exemplary invention system embodiment.

While the present invention is susceptible to embodiment in many different forms, there is shown in the drawings and will herein be described in detailed preferred embodiments of the invention with the understanding that the present disclosure is to be considered as an exemplification of the principles of the invention and is not intended to limit the broad aspect of the invention to the embodiment illustrated.

The numerous innovative teachings of the present application will be described with particular reference to the presently preferred embodiment, wherein these innovative teachings are advantageously applied to the particular problems of a MULTI-RADIATION IDENTIFICATION AND DOSIMETRY SYSTEM AND METHOD. However, it should be understood that this embodiment is only one example of the many advantageous uses of the innovative teachings herein. In general, statements made in the specification of the present application do not necessarily limit any of the various claimed inventions. Moreover, some statements may apply to some inventive features but not to others.

SSDD+RSD Perimeter not Limitive

The present invention anticipates that the segmented silicon drift detector (SSDD) and radiation scintillation device (RSD) combined structure (SSDD+RSD) may take many forms depending on application context. Various preferred embodiments are depicted herein with rectangular and cylindrical forms, but the present invention makes no limitation on the exact peripheral form of either the SSDD or the RSD.

SSDD+RSD Electrical Wiring not Limitive

The present invention anticipates that the segmented silicon drift detector (SSDD) and radiation scintillation device (RSD) combined structure (SSDD+RSD) may be electrically connected to various electronics using a wide variety of electrical connection types. For simplicity of presentation, the drawings presented herein do not include specific wiring implementations as this is something one of ordinary skill in the art will be familiar with and can implement with little difficulty.

RDC/PVC not Limitive

The present invention anticipates that the SSDD+RSD combined radiation detector may be placed within a radiation detection chamber (RDC) which in some cases may be configured as a portable vacuum chamber (PVC). Thus, the term RDC should be given a broad interpretation based on these two configurations.

Overview

The present invention describes the development of a portable nuclide inspection system that allows the monitoring of alpha, beta, and gamma radiations on surfaces of radioactive surfaces. This nuclide inspection may have particular application to nuclear power plants and other facilities that are under decommissioning.

The use of two segment silicon drift detectors assembled with the anode side directed toward the surface to be inspected allows the measurement of directly absorbed radiation in the semiconductor (betas, conversion electrons, Lx lines and alphas) on one segment and the scintillated radiations on both segments of the silicon drift detector. Time stamping differentiation allows discrimination of several types of radiation.

First, the differentiation of directly absorbed radiation and scintillated radiation is enabled. Using the time-stamped differentiation with two segments differentiates the present invention from the prior art in a one segment SSDD where scintillated and directly absorbed signals are differentiated by pulse shape analysis.

Secondly, if an amplifier is connected to the junction on the irradiation side of the SSDD, the measurement of the energy imbalance witnessed on the main irradiation junction and on the anode ohmic contact can allow discrimination of radiations that have deposited energy on one side or on both sides of the SSDD. Medium, high energy beta emitters by Sr-90 and Y-90, and cosmic radiations are typical radiations that can deposit their energy all along the SSDD. The possibility to suppress these events allows the detector to lower the background radiation levels, enabling a better separation between the tails of alpha radiations and beta backgrounds. The use of these medium energy and high energy beta suppression techniques in conjunction with the use of a small filter will allow filtering away low energy betas and enable the measurement of Lx lines (13-17 keV) and some gamma lines (59.35 keV) of actinides with lower MDAs.

Another technique for suppressing cosmics as well as medium and high energy betas is the use of telescopes of either two SSDDs or one simple pin CAM detector in conjunction with a second SSDD detector.

The use of a telescope of detectors allows each detector to specialize in a specific range of radiations. The detector that is the closest to the measured source will be specialized in the measurement of alphas, betas, and conversion electrons. Lx lines will be measured as well. The outputs of this detector will be sent to a first spectral window detector.

The second detector will be specialized in the measurement of X-ray Lx lines and gamma lines if connected to a scintillator. The outputs of this detector will be sent to a second spectral window. Medium and high energy betas can deposit energy in both detectors but can be vetoed from the counting of the second detector by time-stamped analysis. The summing of the energies of betas and cosmics deposited in both detectors can be kept in a separate spectral window or be added to the spectral window of the first detector.

The possibility to bring the SSDD in close proximity to the surface of inspection or to be able to apply a vacuum chamber on the surface to be decommissioned allows a more accurate spectroscopy identification of alpha lines since the energy loss in air will be reduced (in proximity or in a He atmosphere) or suppressed (in vacuum) and allows the measurement of conversion electron spectroscopy. The very good energy thresholds of SSDDs can also be useful for monitoring tritium contaminations on surfaces without doing swab tests if vacuum is applied in the chamber that is built on the area to be inspected which allows positioning of the detector at a reasonable distance from the surface (a few millimeters to a few centimeters. In air, the distance between the detector and the surface must be under 1 mm to ensure a sufficient energy transmission to the detector, risking damage or contamination of the detector.

The use of NaI or plastic scintillators sandwiching Si—Li or HP—Ge detectors is typically constructed for removing partial gamma events that are found in coincidence in the Ge detector and in the scintillators. Here, the limited thickness of the silicon drift detector makes the absorption of ambient gammas and the detection of the low energy components of Compton in the range of interest of the Lx lines very unlikely.

The very good resolutions of the segments of the present invention SSDD allow the possibility of performing high quality Lx spectroscopy to enable discerning trace Pu in the presence of 241Am.

The possibility of determining concentrations of actinides by Lx spectroscopy in a small time lapse can be enhanced if the detector is devised in a ring like manner, allowing the travel of X-rays emanating from an X-ray tube or a strong X-ray source, providing Lx lines excitation of the actinides that are investigated in a smaller time lapse.

A segmented annular SSDD that is drilled in the center by laser drilling or chemical etching can be set under an X-ray source allowing the best proximity to the medium to be inspected. An annular scintillator can also be positioned on this silicon drift detector, allowing both gamma spectroscopy and high quality Lx spectroscopy as well as beta and alpha spectroscopy.

For reaching ultimate MDAS in Lx spectroscopy and K alpha spectroscopy, thin HP—Ge detectors or Si—Li detectors can also be used. Using annular Ge detectors drilled in their center with a hole also allows the travelling of X-rays in an X-ray tube.

Laser ablation with an Er:YAG laser may be used with LA-ICP-MS techniques for volatilizing the samplings of swab papers in order to convey them to a plasma torch followed by Mass Spectrometers. The volatilizing of surfaces to be decommissioned can be performed with a similar technique, the volatilized content being sent to the filter paper positioned under a PIPS alpha beta detector or to an SSDD for performing alpha, beta, Lx, CE, and gamma analysis. The volatilized material can either be transported by an air duct to the filter paper or be deposited on a rolling tape paper and will be positioned toward the detector area.

System Overview (0100)

An overview of the present invention system functionality is depicted in FIG. 1 (0100). Here a host computer system (0101) may communicate (0102) using a wired or wireless communications link to a radiation probe (0110) that detects radiation emitted from a radiation inspection surface (RIS) (0103). Within the radiation probe a computing control device (CCD) (0111) executing machine instructions read from a computer readable medium (0112) implements a radiation measurement process (RMP) (0113) specifically designed to detect transient radiation events that are detected with a combined SSDD+RSD detector (0114) as described herein. Once radiation is detected by the SSDD+RSD detector (0114) under control of the RMP (0113) and CCD (0111), the CCD may initiate various user interface controls such as alarms (0115) or displays (0116) to indicate the presence of radiation events that have been detected by the SSDD+RSD detector (0114).

Method Overview (0200)

Figure 2:
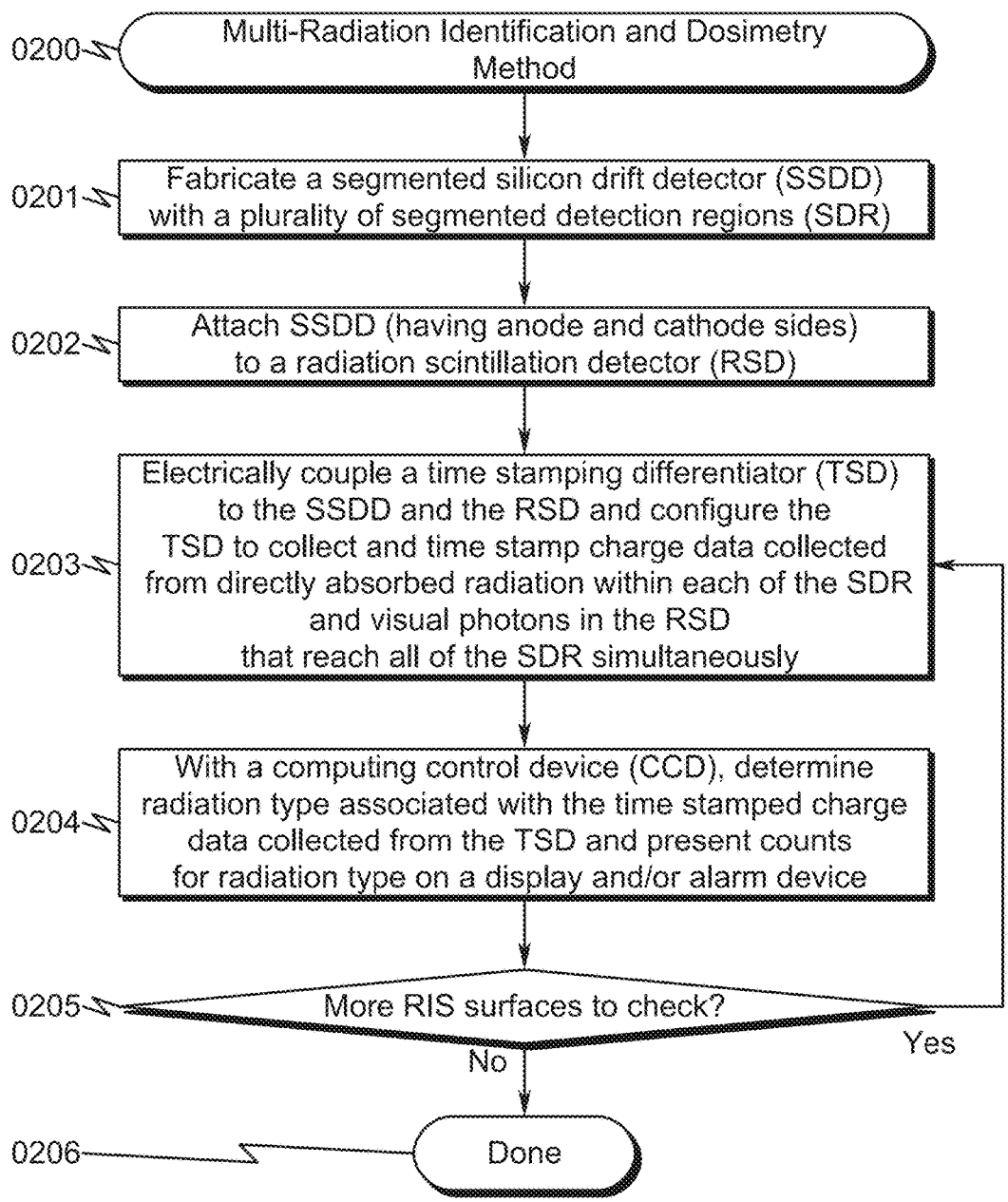
FIG. 2 illustrates an overview flowchart diagram depicting a preferred exemplary invention method embodiment.

The system as described above may be used in conjunction with an operational method in which the SSDD+RSD are constructed and used to detect radiation emitted from the RIS. A general overview of this method is depicted in FIG. 2 (0200) and comprises the following steps:

(1) fabricating a segmented silicon drift detector (SSDD) with a plurality of segmented detection regions (SDR) (0201);

(2) attaching the SSDD (having an anode side and a cathode side) to a radiation scintillation detector (RSD) (0202);

(3) electrically coupling a time stamping differentiator (TSD) to the SSDD and the RSD and configuring the TSD to collect and time-stamp charge data collected from directly absorbed radiation within each of the SDR and visual photons in the RSD that reach all of the SDR simultaneously (0203);

(4) with a computing control device (CCD), determining a radiation type associated with the time-stamped charge data collected from the TSD and presenting counts associated with the radiation type on a display and/or alarm device (0204);

(5) determining if there are additional radiation inspection surfaces to monitor, and if so, proceeding to step (4) (0205); and otherwise (6) terminating the Multi-Radiation Identification and Dosimetry Method (0206).

Within this method context, the SSDD-RSD interface may be constructed in one of two preferred configurations:

SSDD+RSD-Anode wherein the RSD anode side is directed toward a radiation inspection surface (RIS) to be inspected for radiation contamination and the SSDD cathode side is directed toward the RSD.

SSDD+RSD-Cathode wherein the RSD cathode side is directed toward a radiation inspection surface (RIS) to be inspected for radiation contamination and the SSDD anode side is directed toward the RSD.

This general method overview may be augmented by the various elements described herein to produce a wide variety of invention embodiments consistent with this overall design description.

SSDD+RSD-Anode Detector Overview (0300)-(0500)

Figure 3:
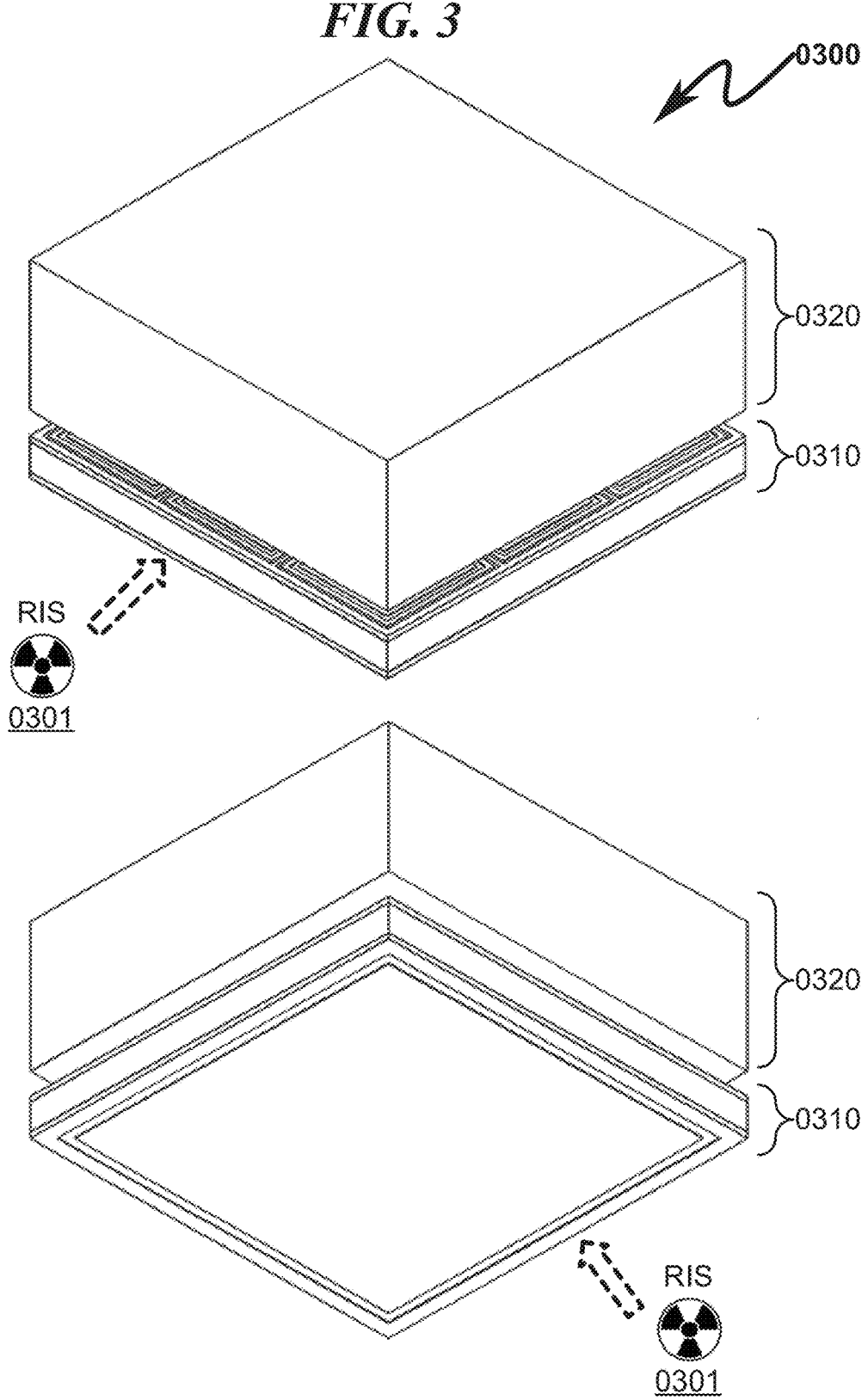
FIG. 3 illustrates top and bottom perspective views of a combined SSDD+RSD radiation detector with SSDD anode surface mated to the RSD and SSDD cathode directed toward the RIS.
Figure 5:
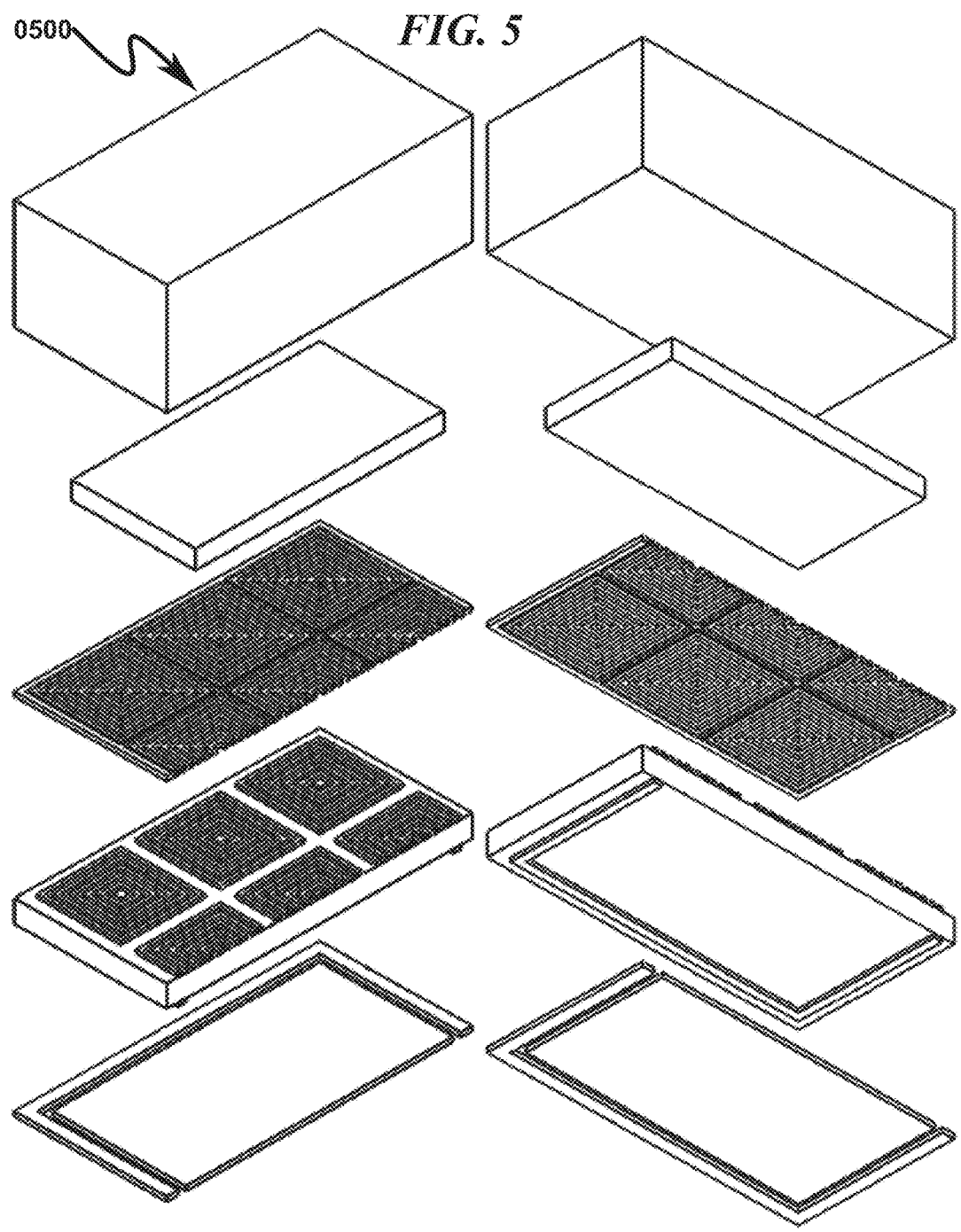
FIG. 5 illustrates top and bottom perspective exploded views of a combined SSDD+RSD radiation detector with SSDD anode surface mated to the RSD and SSDD cathode directed toward the RIS.

An exemplary SSDD+RSD detector in which the RSD anode is positioned toward the SSDD and away from the RIS is depicted in FIG. 3 (0300)-FIG. 5 (0500).

FIG. 3 (0300) depicts a typical combined SSDD+RSD detector structure in which the segmented silicon drift detector (SSDD) (0310) is layered beneath the radiation scintillation detector (RSD) (0320). FIG. 4 (0400) depicts the SSDD+RSD detector in cross section and illustrates the SSDD (0410) and RSD (0420) attached together with an intermediate adhesive layer (0430) or other mechanical contact mating (generally referred to herein as a SSDD-to-RSD mechanical coupler). The SSDD (0410) is configured with the anode surface (0411) directed toward the RSD (0420) and away from the RIS (0401). The surface opposite the anode (0411) comprises the SSDD (0410) cathode (0412) which faces the RIS (0401) and away from the RSD (0420). FIG. 5 (0500) illustrates the SSDD+RSD structure in top/bottom sectional perspective assembly form with individual layers of the structure expanded for clarity.

The structure presented here is only exemplary and may be reconfigured in a variety of other forms such as cylinders, etc. Additionally, it should be noted that the dimensions depicted may vary widely. Specifically, the adhesive layer depicted may take a wide variety of thicknesses and may, as depicted, cover only a portion or the whole surface of the SSDD and/or RSD. The surface areas of the SSDD and RSD are shown to be equal, but this is not necessarily a requirement of the system. An exemplary segmented anode pattern structure is illustrated but may be replaced with a wide variety of other segmented structures as generally discussed later in this document.

SSDD+RSD-Cathode Detector Overview (0600)-(0800)

Figure 6:
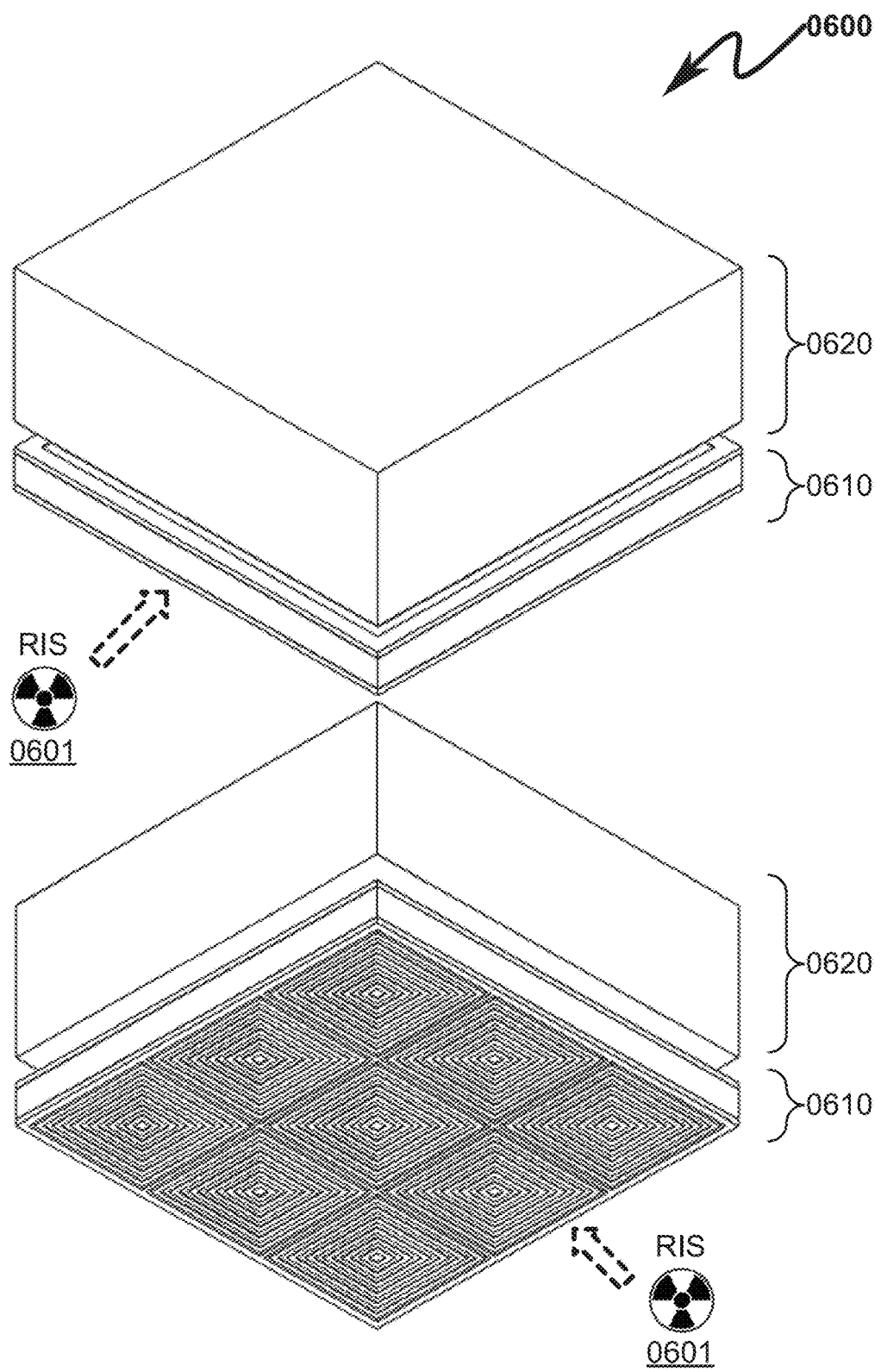
FIG. 6 illustrates top and bottom perspective views of a combined SSDD+RSD radiation detector with SSDD cathode surface mated to the RSD and SSDD anode directed toward the RIS.
Figure 8:
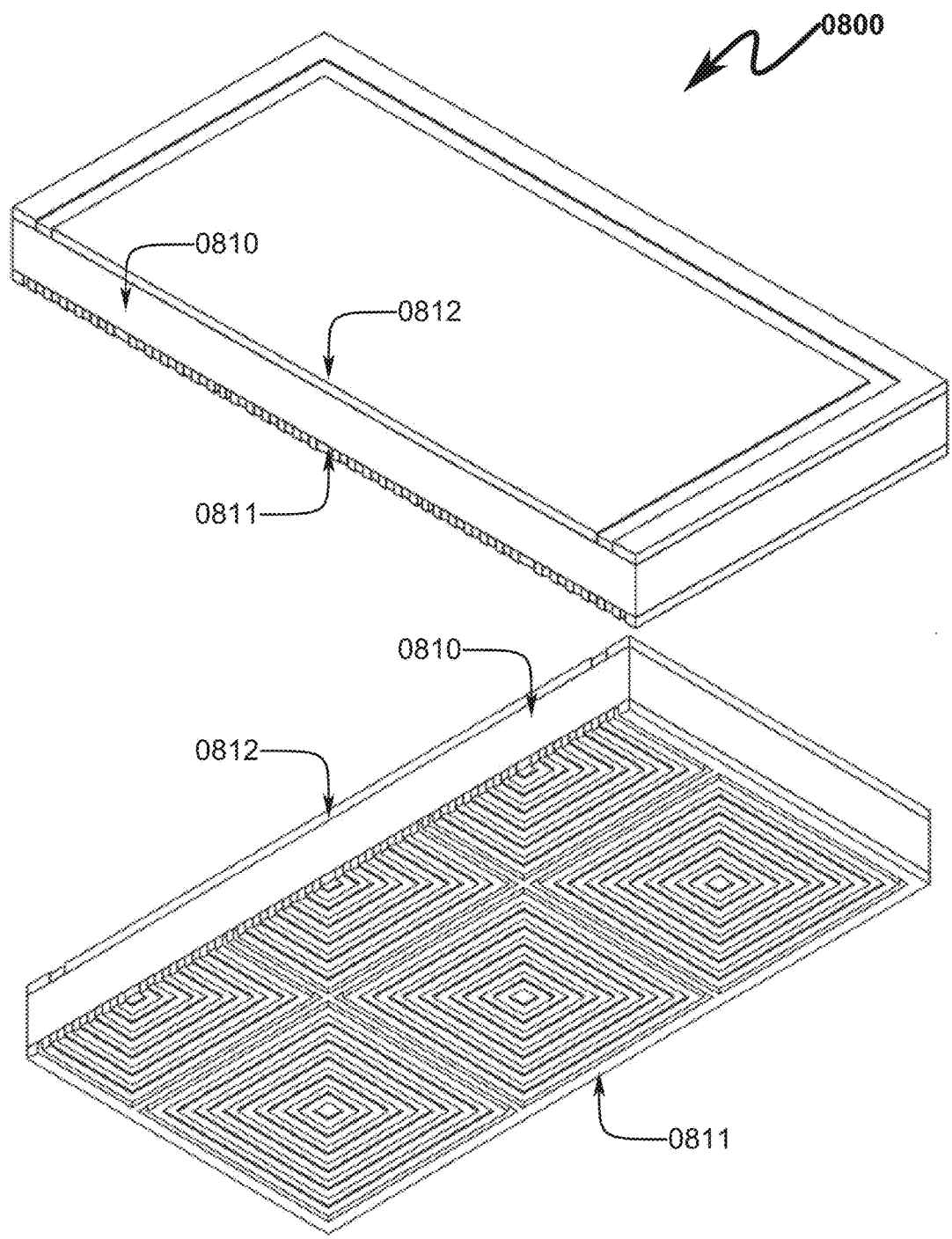
FIG. 8 illustrates top and bottom perspective sectional views of an exemplary SSDD structure used in some present invention embodiments.

An exemplary SSDD+RSD detector in which the RSD anode is positioned away from the SSDD and toward the RIS is depicted in FIG. 6 (0600)-FIG. 8 (0800).

Figure 7:
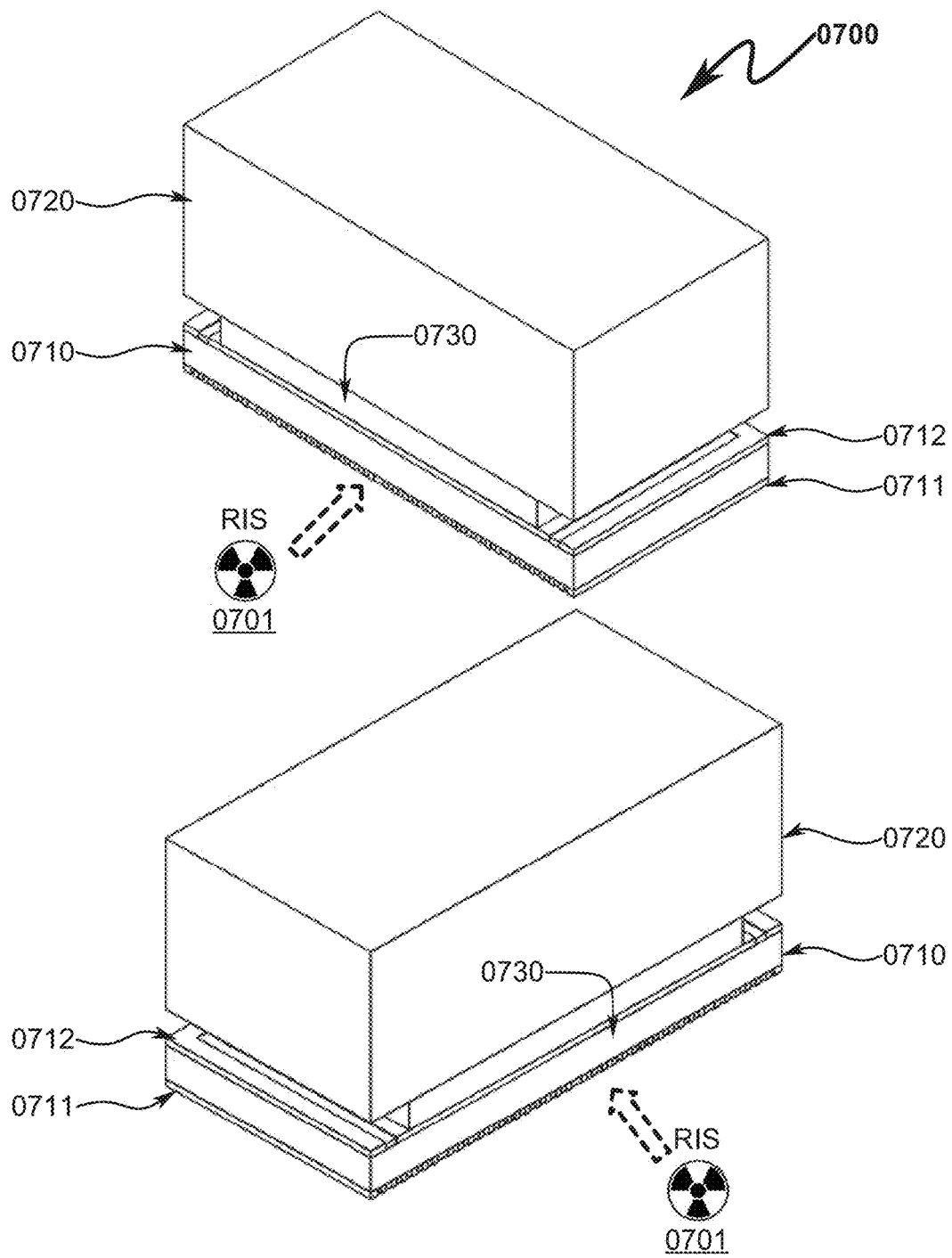
FIG. 7 illustrates front and right perspective section views of a combined SSDD+RSD radiation detector with SSDD cathode surface mated to the RSD and SSDD anode directed toward the RIS.

FIG. 6 (0600) depicts a typical combined SSDD+RSD detector structure in which the segmented silicon drift detector (SSDD) (0610) is layered beneath the radiation scintillation detector (RSD) (0620). FIG. 7 (0700) depicts the SSDD+RSD detector in cross section and illustrates the SSDD (0710) and RSD (0720) attached together with an intermediate adhesive layer (0730). The SSDD (0710) is configured with the anode surface (0711) directed toward the RIS (0701) and away from the RSD (0720). The surface opposite the anode (0711) comprises the SSDD (0710) cathode (0712) which faces the RSD (0720) and away from the RIS (0701).

FIG. 8 (0800) illustrates an exemplary SSDD (0810) structure in top/bottom sectional perspective detail and illustrates the anode (0811) and cathode (0812) surfaces. This exemplary SSDD structure may be used with the SSDD+RSD combined structures having anode-RSD and anode-RIS orientations.

The structure presented here is only exemplary and may be reconfigured in a variety of other forms such as cylinders, etc. Additionally, it should be noted that the dimensions depicted may vary widely. Specifically, the adhesive layer depicted may take a wide variety of thicknesses and may as depicted cover only a portion or the whole surface of the SSDD and/or RSD. The surface areas of the SSDD and RSD are shown to be equal, but this is not necessarily a requirement of the system. An exemplary segmented anode pattern structure is illustrated but may be replaced with a wide variety of other segmented structures as generally discussed later in this document.

Exemplary Inspection Chamber (0900)-(2400)

Figure 9:
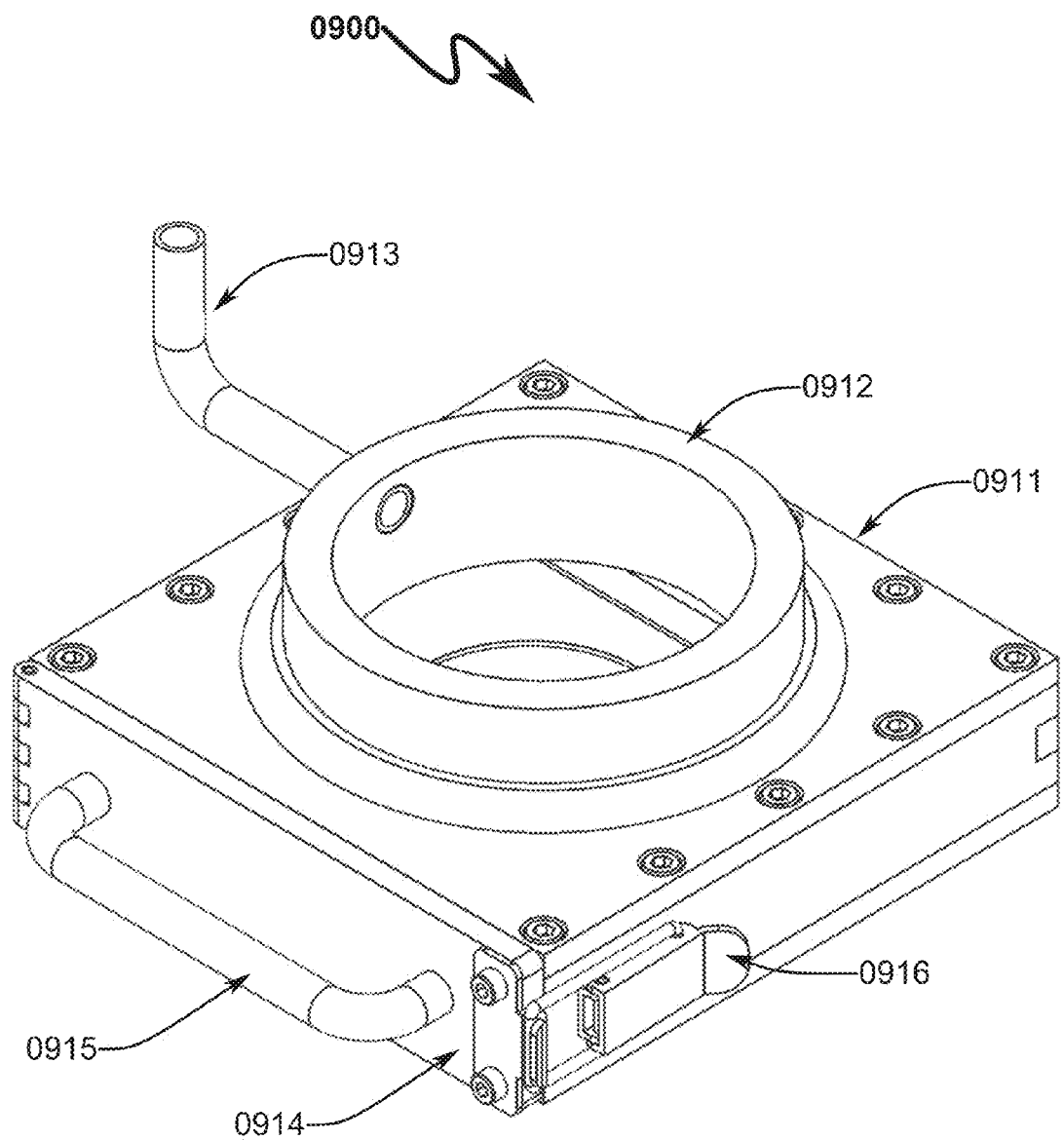
FIG. 9 illustrates a top front right perspective view of a presently preferred exemplary inspection chamber used in a number of preferred invention embodiments.
Figure 10:
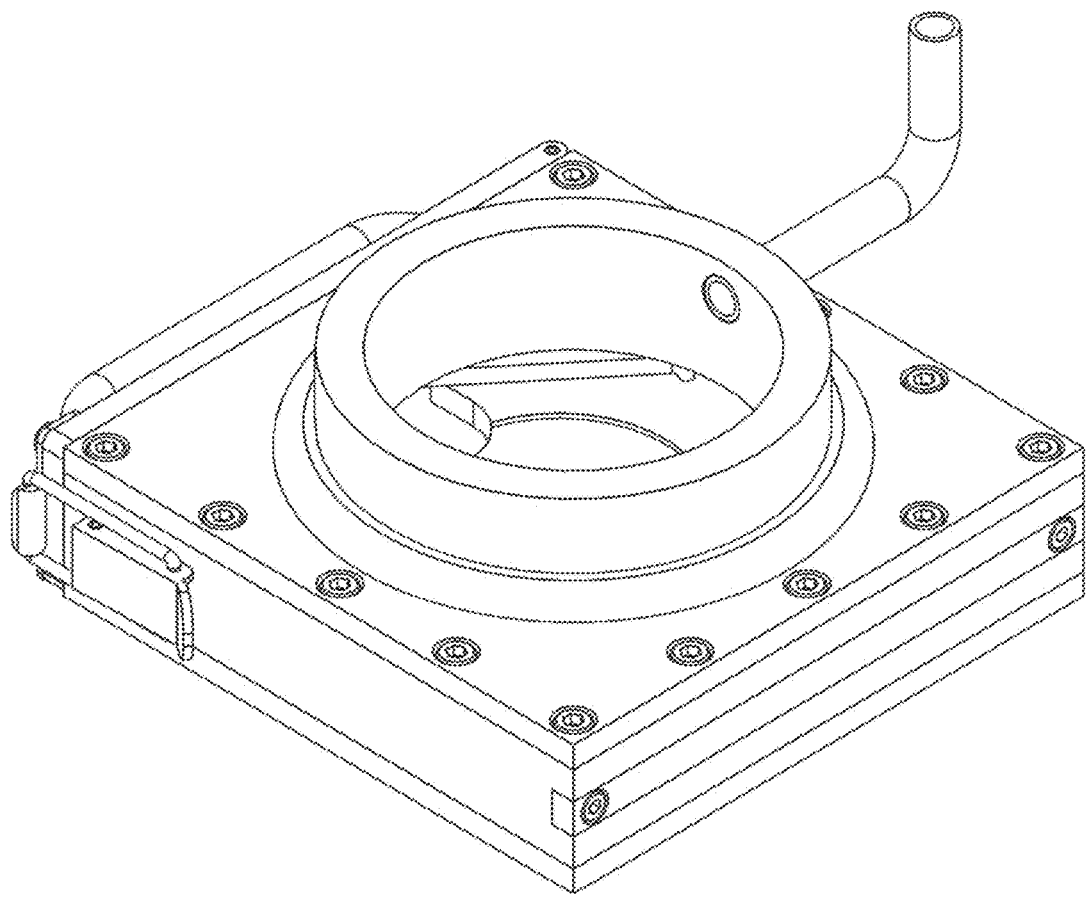
FIG. 10 illustrates a top rear right perspective view of a presently preferred exemplary inspection chamber used in a number of preferred invention embodiments.
Figure 11:
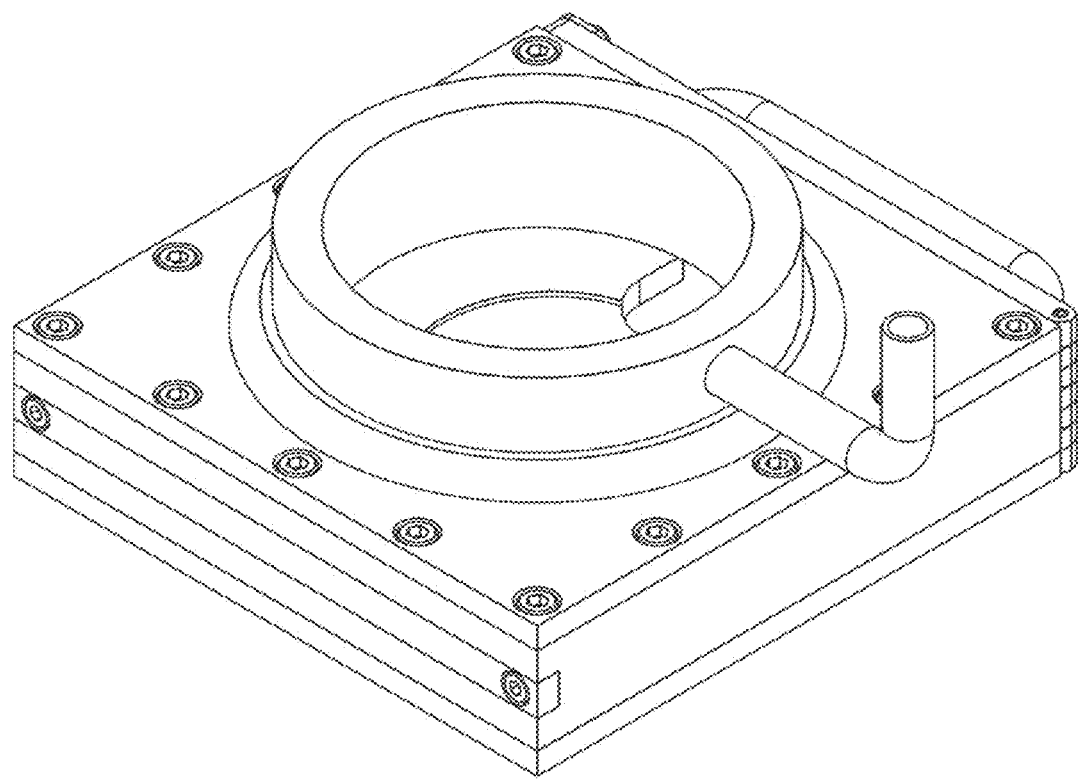
FIG. 11 illustrates a top rear left perspective view of a presently preferred exemplary inspection chamber used in a number of preferred invention embodiments.
Figure 12:
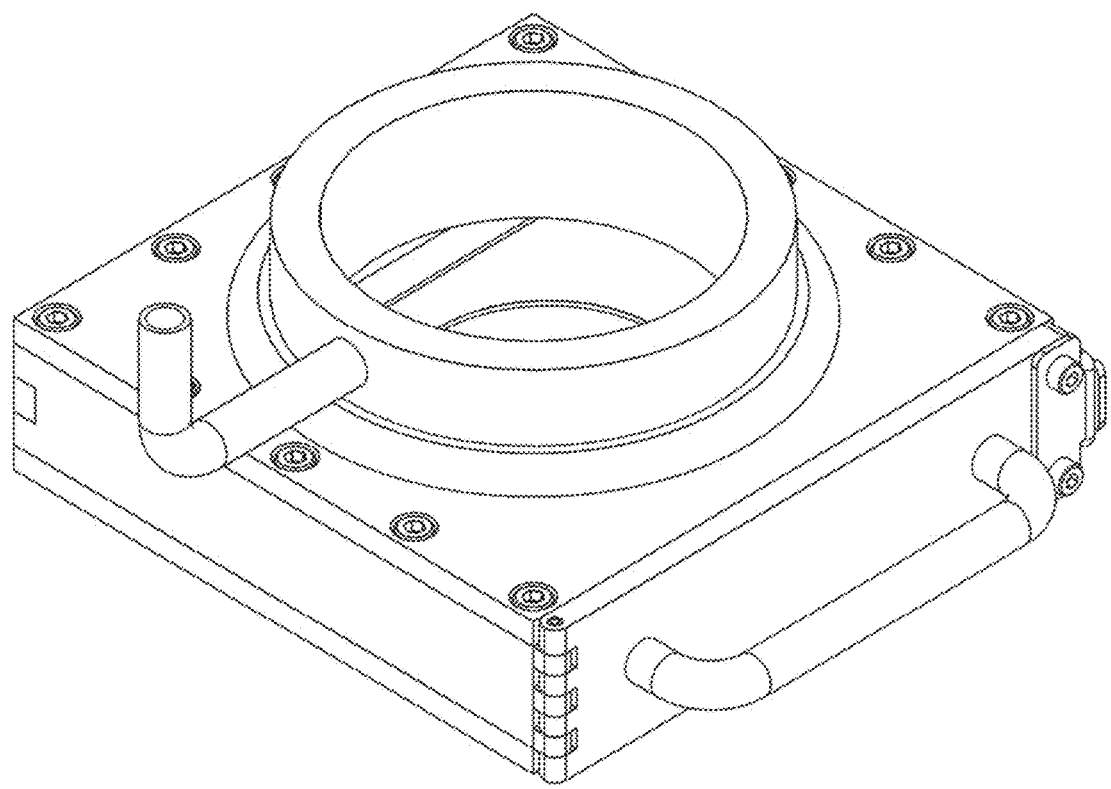
FIG. 12 illustrates a top front left perspective view of a presently preferred exemplary inspection chamber used in a number of preferred invention embodiments.
Figure 13:
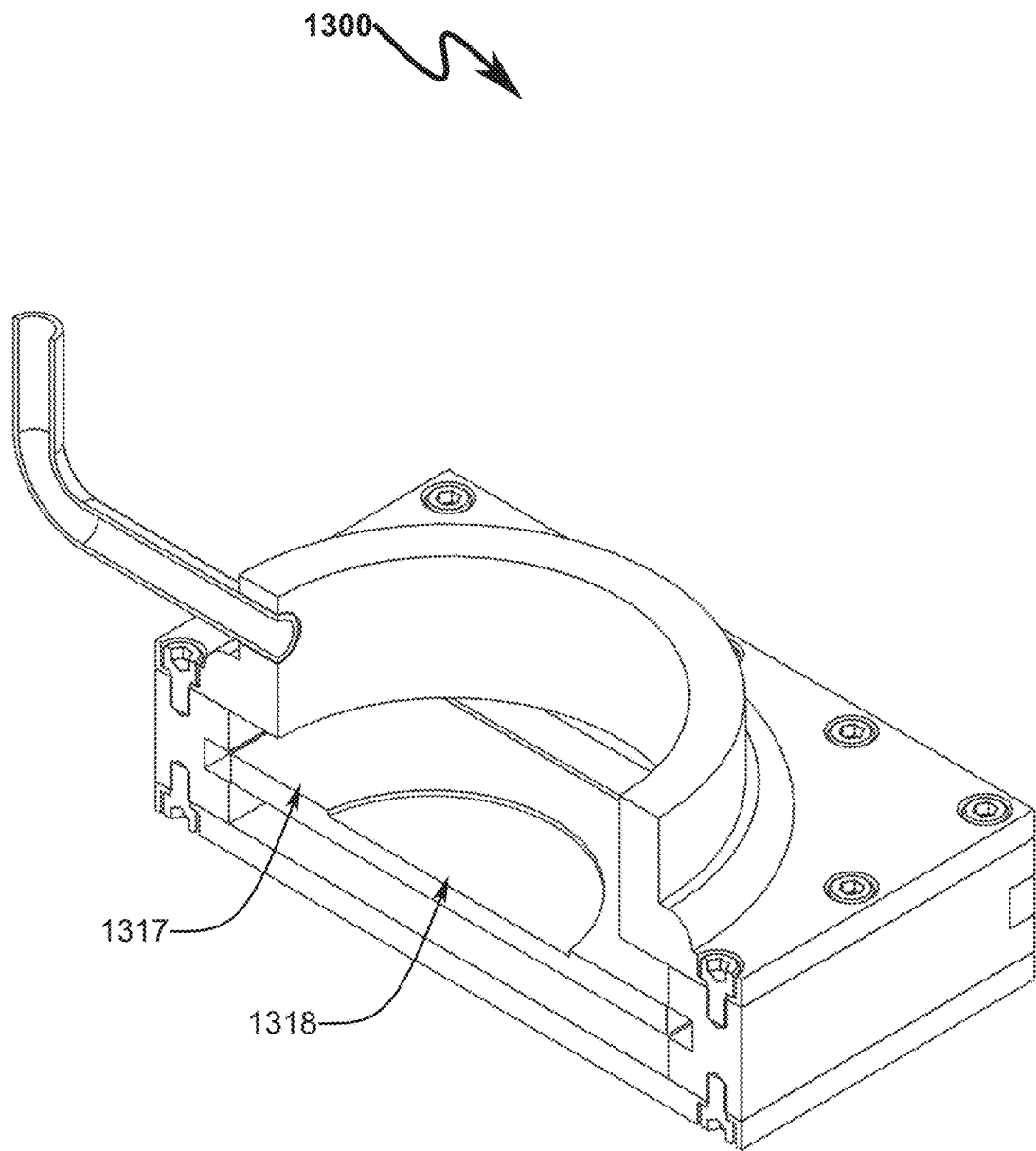
FIG. 13 illustrates a front perspective sectional view of a presently preferred exemplary inspection chamber used in a number of preferred invention embodiments.
Figure 14:
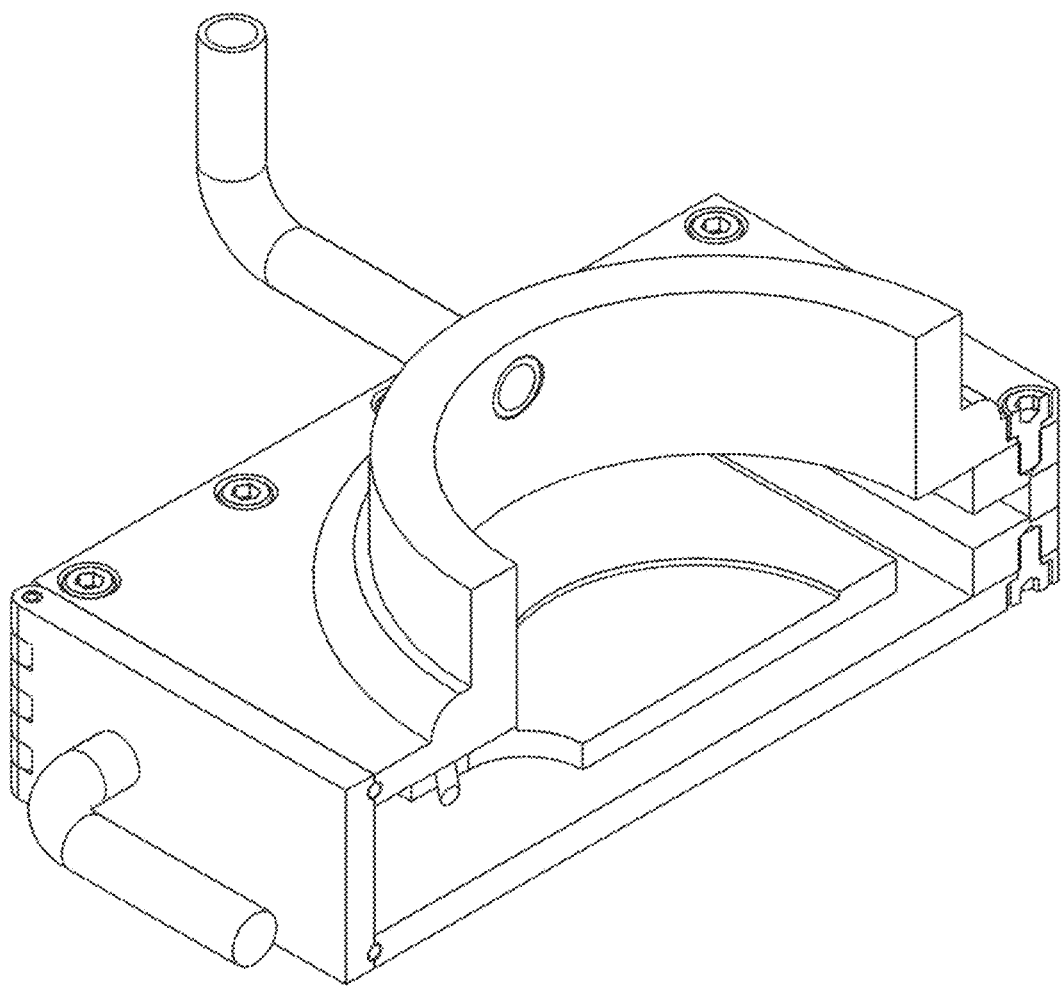
FIG. 14 illustrates a side perspective sectional view of a presently preferred exemplary inspection chamber used in a number of preferred invention embodiments.
Figure 15:
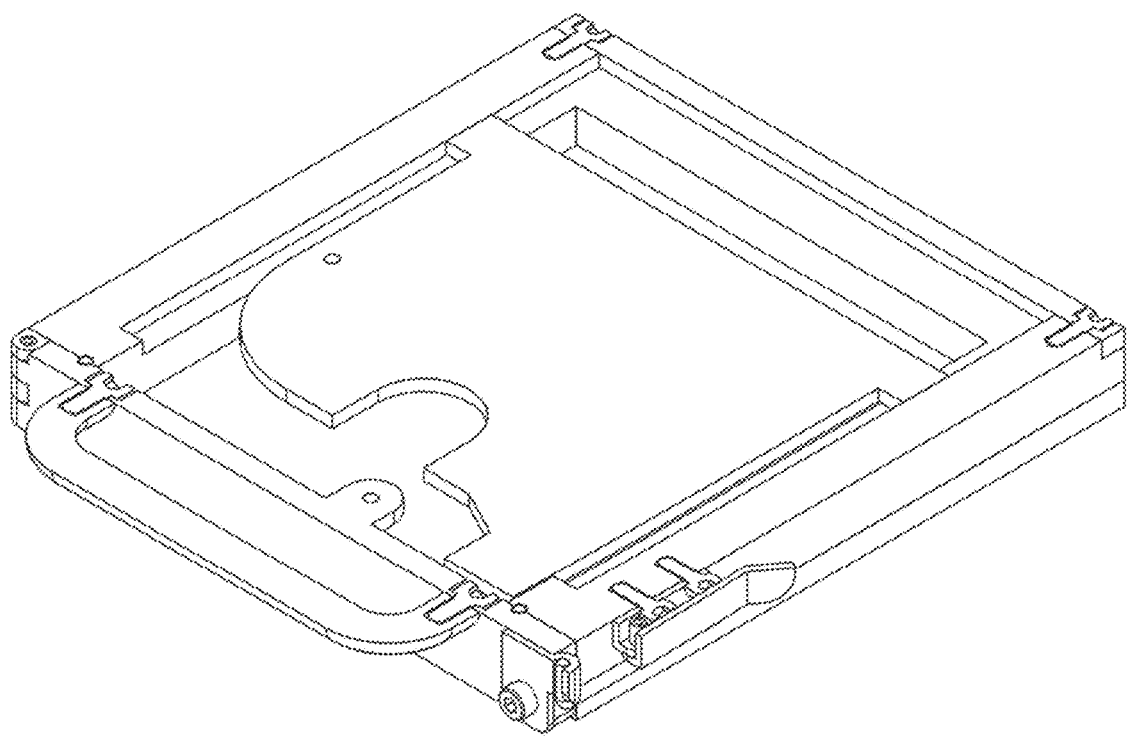
FIG. 15 illustrates a top perspective sectional view of a presently preferred exemplary inspection chamber used in a number of preferred invention embodiments.
Figure 24:
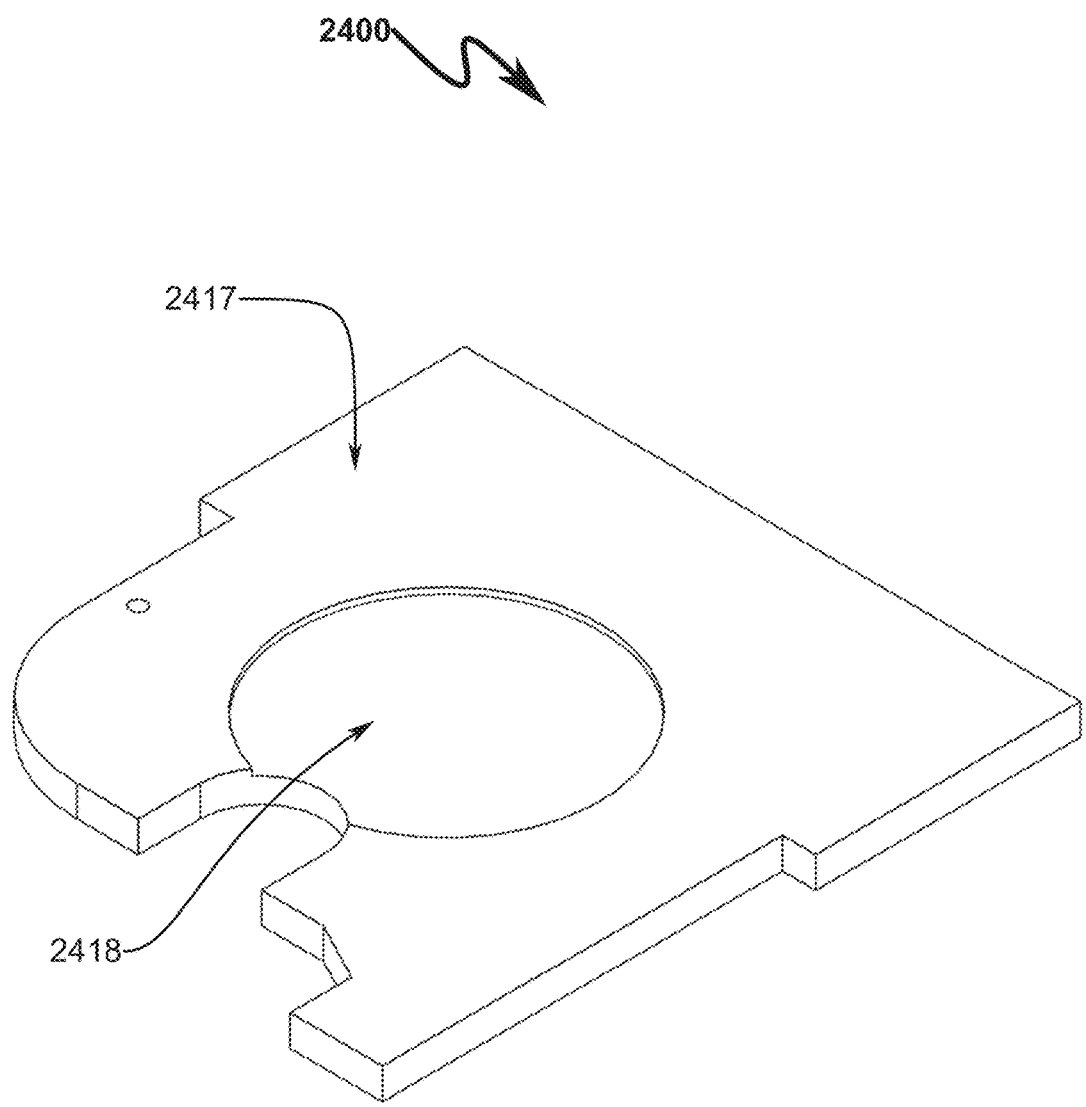
FIG. 24 illustrates a top perspective view of a presently preferred exemplary sliding inspection platform used in a number of preferred invention inspection chamber embodiments.

The SSDD+RSD-Anode detector and SSDD+RSD-Cathode detector described herein may be associated with an inspection chamber as generally depicted in FIG. 9 (0900)-FIG. 24 (2400). This inspection chamber permits radiation detection from swabs of material that have been contacted with surfaces to be inspected for radiation contamination.

Figure 16:
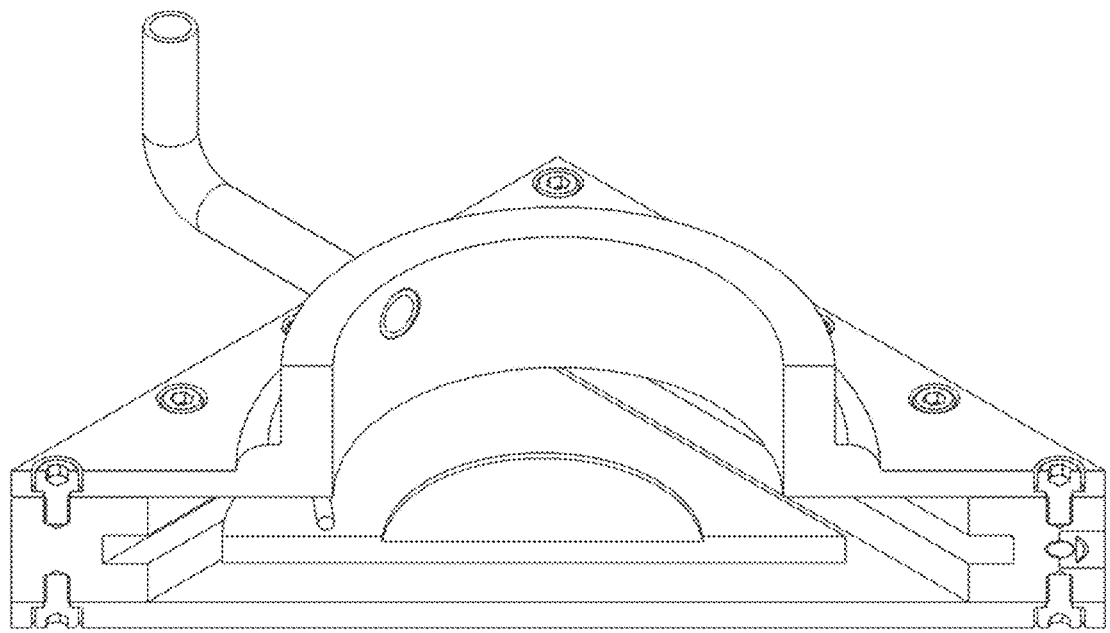
FIG. 16 illustrates a diagonal perspective sectional view of a presently preferred exemplary inspection chamber used in a number of preferred invention embodiments.

Referencing FIG. 9 (0900)-FIG. 16 (1600), the inspection chamber (0911) comprises an interface to the SSDD detector (0912) and plumbing (0913) for pulling a vacuum in the chamber (0911). A front access door (0914) permits insertion/removal of samples within the chamber (0911) and is configured with an access handle (0915) and latch (0916). Within the chamber (0911) a sliding inspection platform (1317) incorporating a sample placement area (1318) is provided that is actuated with opening/closing of the front access door (0914).

Figure 17:
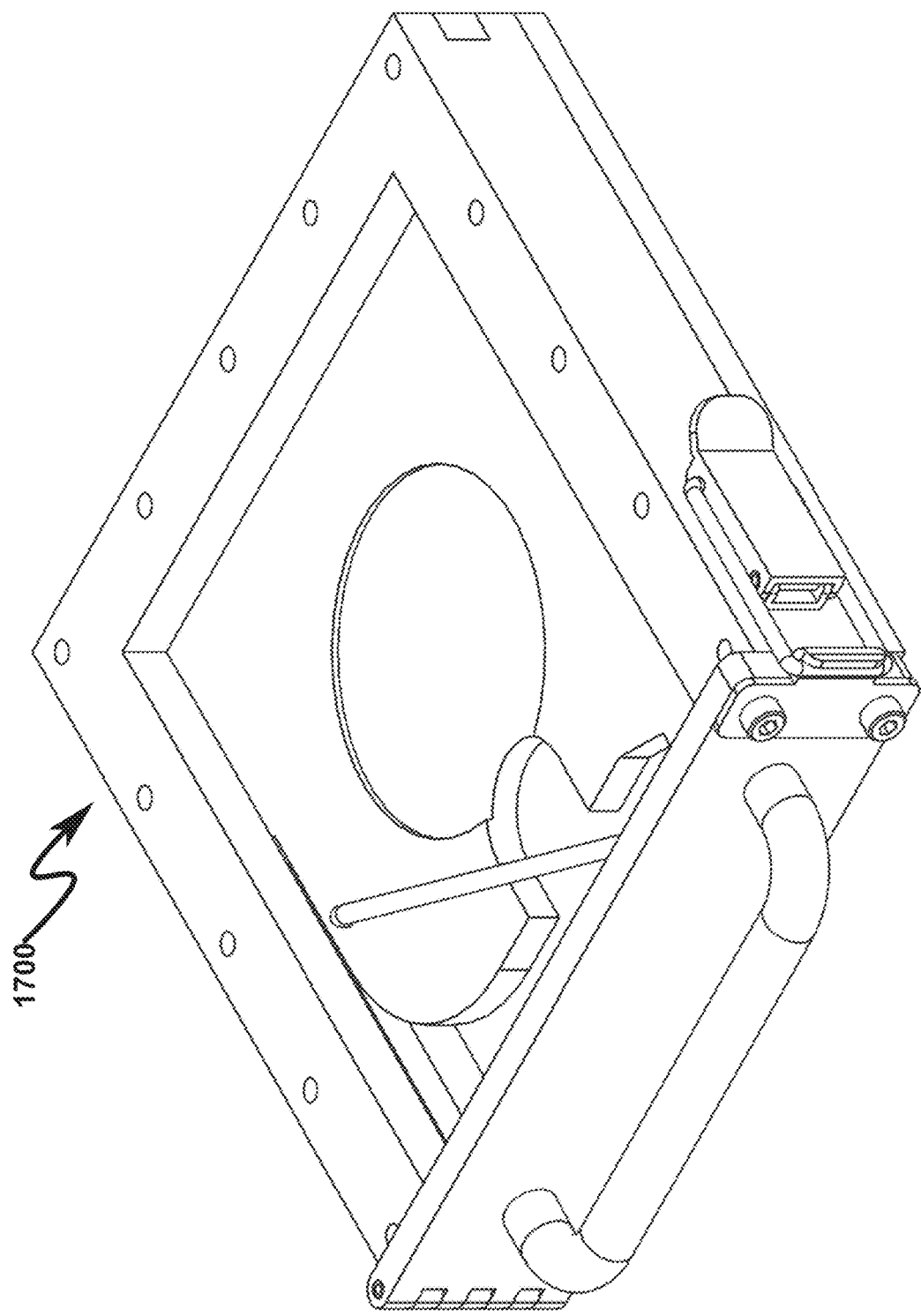
FIG. 17 illustrates a top perspective internal view of a presently preferred exemplary inspection chamber used in a number of preferred invention embodiments with top chamber cover removed and front access door closed.
Figure 18:
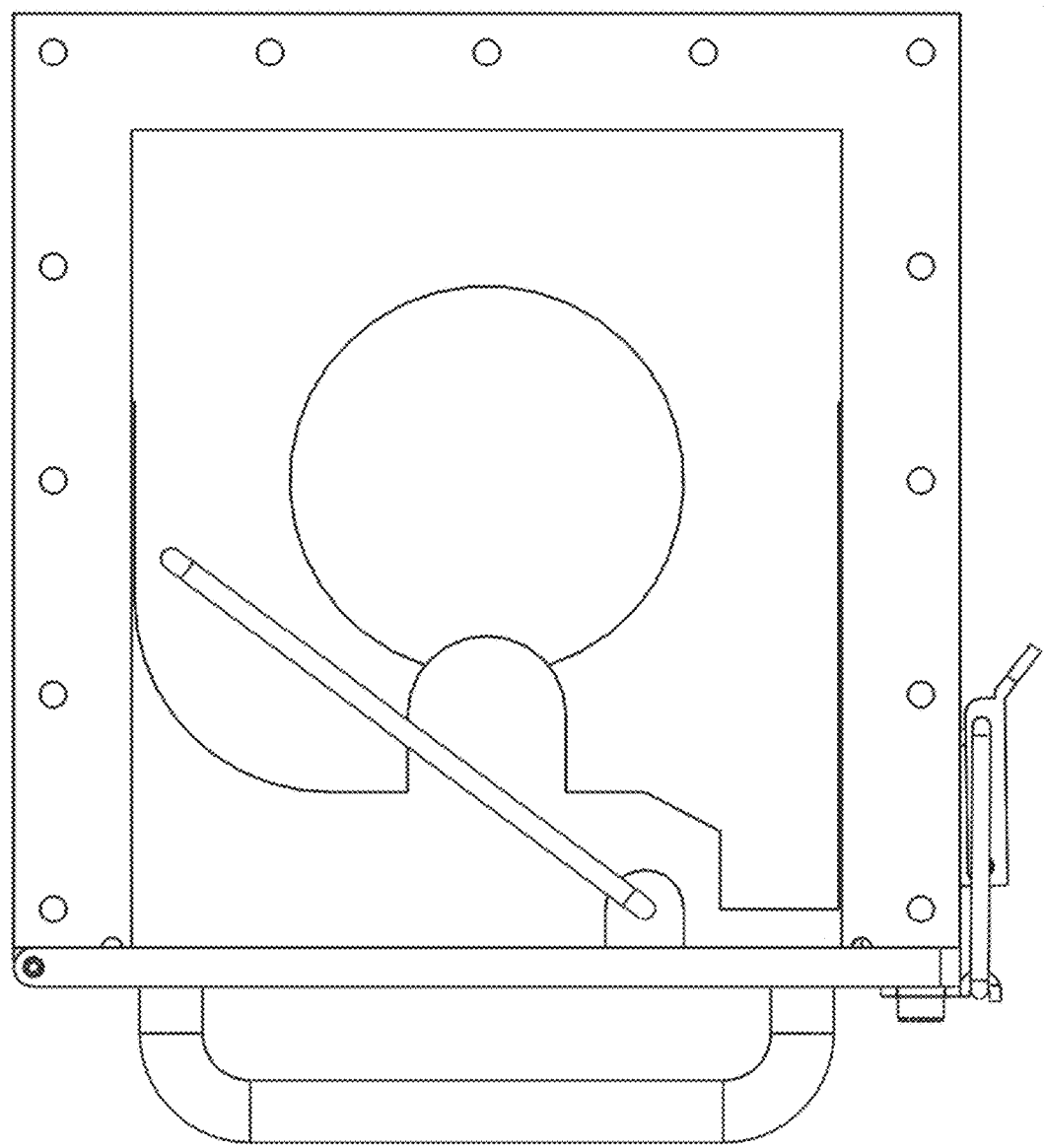
FIG. 18 illustrates a top internal view of a presently preferred exemplary inspection chamber used in a number of preferred invention embodiments with top chamber cover removed and front access door closed.
Figure 19:
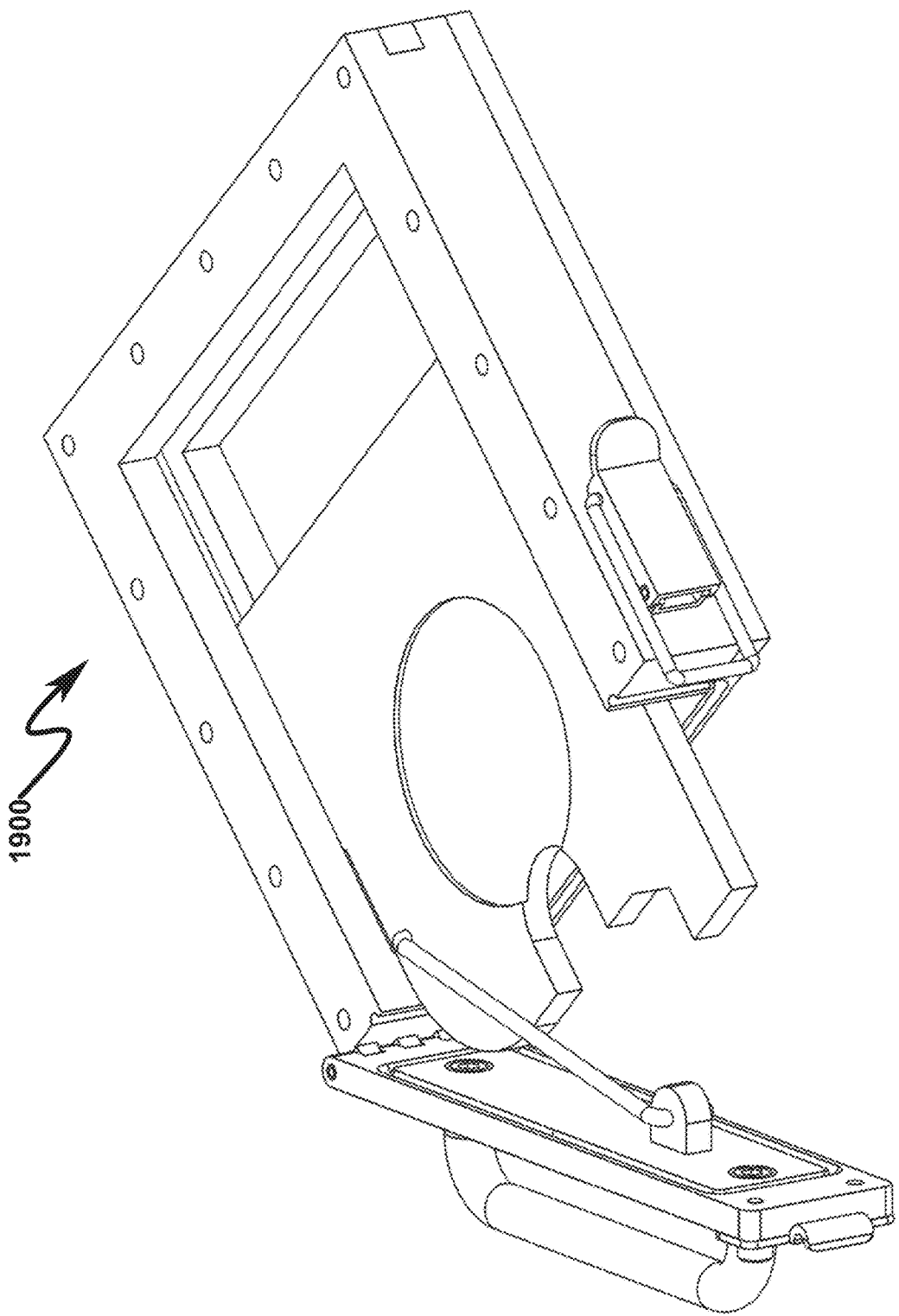
FIG. 19 illustrates a top perspective internal view of a presently preferred exemplary inspection chamber used in a number of preferred invention embodiments with top chamber cover removed and front access door partially open.
Figure 20:
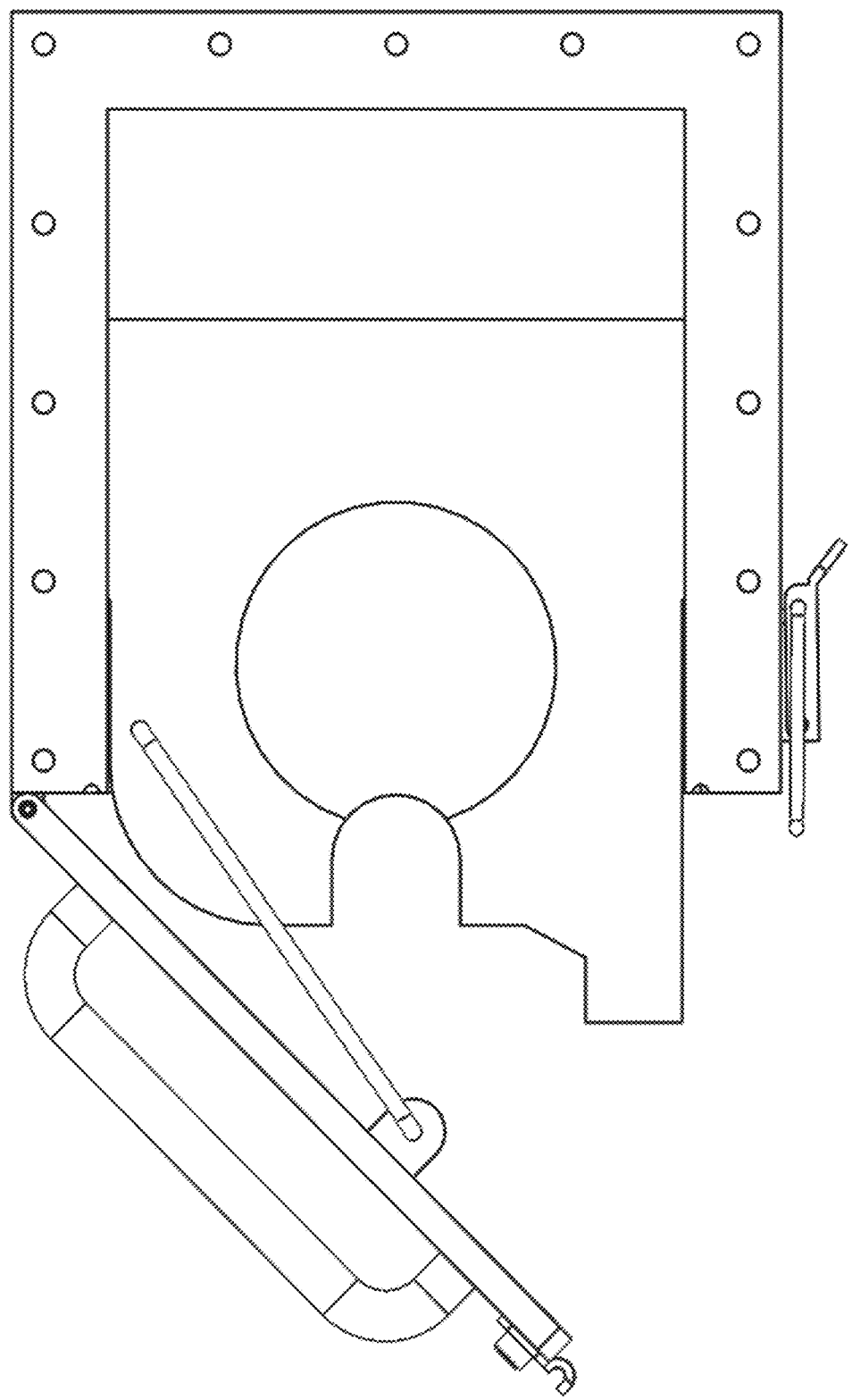
FIG. 20 illustrates a top internal view of a presently preferred exemplary inspection chamber used in a number of preferred invention embodiments with top chamber cover removed and front access door partially open.
Figure 21:
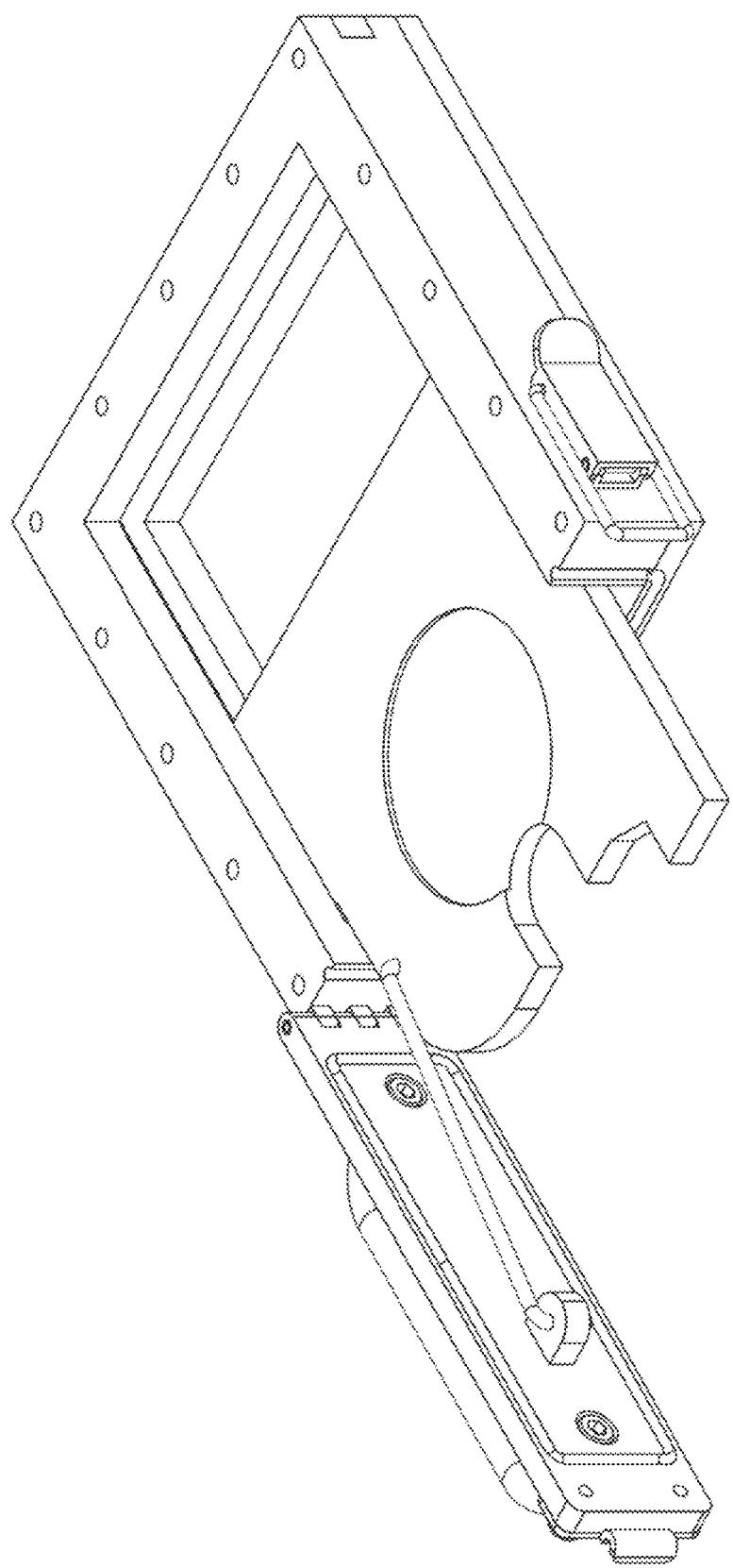
FIG. 21 illustrates a top perspective internal view of a presently preferred exemplary inspection chamber used in a number of preferred invention embodiments with top chamber cover removed and front access door fully open.
Figure 22:
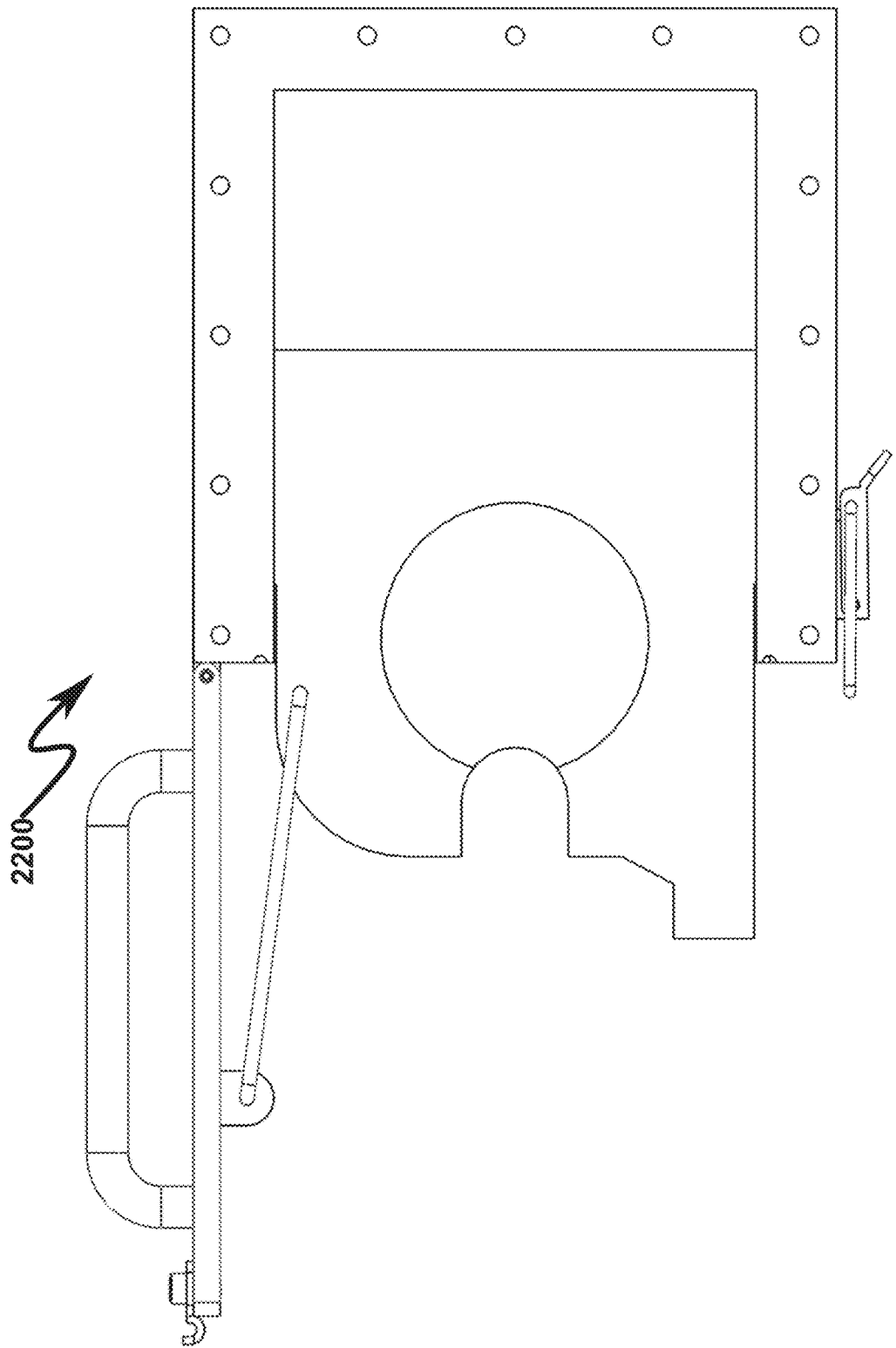
FIG. 22 illustrates a top internal view of a presently preferred exemplary inspection chamber used in a number of preferred invention embodiments with top chamber cover removed and front access door fully open.
Figure 23:
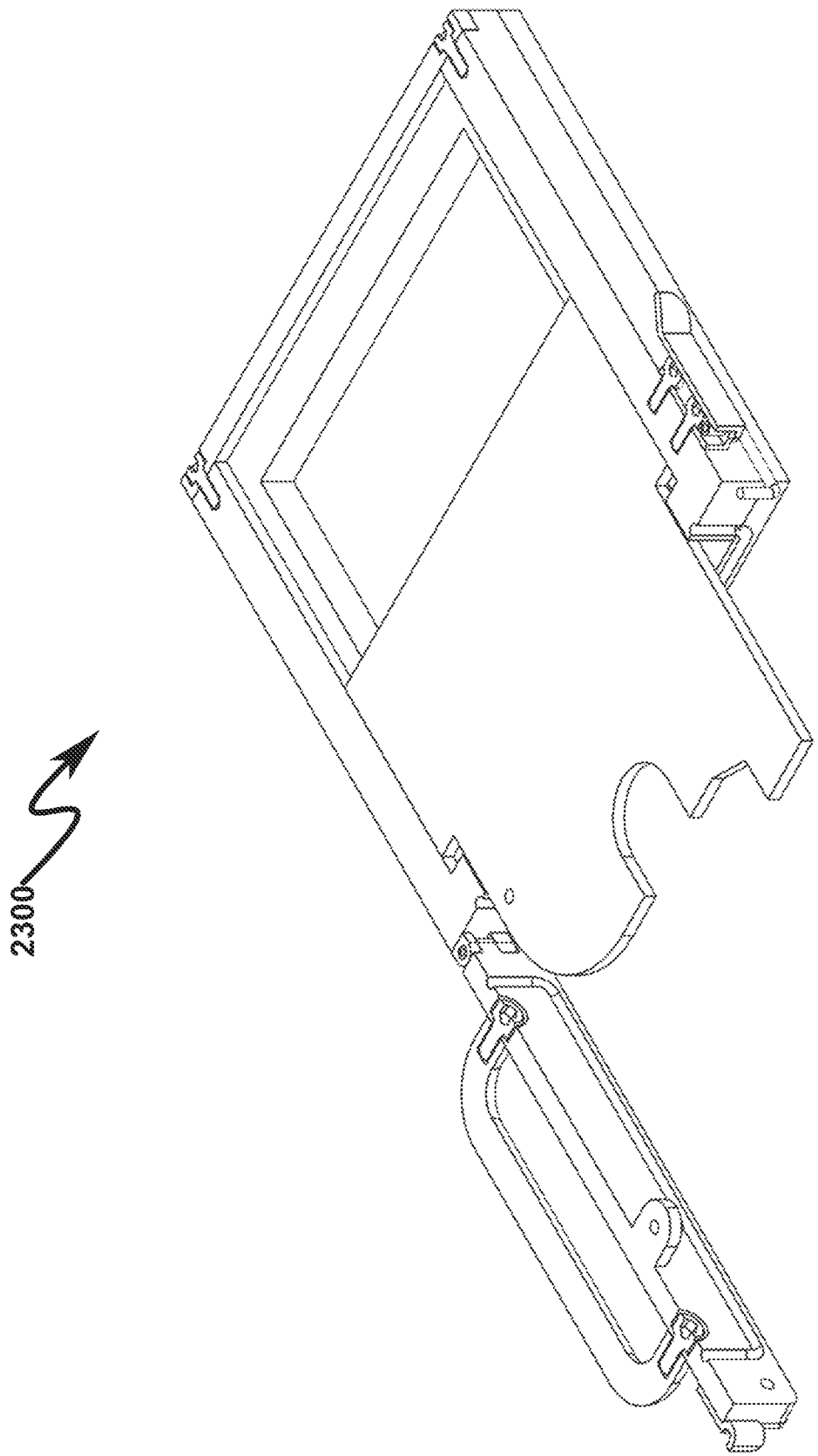
FIG. 23 illustrates a top mid-plane sectional view of a presently preferred exemplary inspection chamber used in a number of preferred invention embodiments with top chamber cover removed and front access door fully open.

FIG. 17 (1700)-FIG. 24 (2400) depict the inspection chamber in various views with the top access cover for the chamber hidden wherein the front access door is closed (FIG. 17 (1700)-FIG. 18 (1800)), partially open (FIG. 19 (1900)-FIG. 20 (2000)), and fully open (FIG. 21 (2100)-FIG. 22 (2200)). FIG. 23 (2300) provides a top perspective sectional view showing the fully open front access door and illustrates the mating relationship between the inspection platform slide tails and grooves within the chamber walls. FIG. 24 (2400) provides a top perspective view of the inspection platform (2417) and sample placement area (2418).

As indicated in the views of FIG. 17 (1700)-FIG. 24 (2400), the inspection platform automatically retracts from the inspection chamber upon opening of the front access door. Similarly, the inspection platform automatically is inserted into the inspection chamber upon closing of the front access door. A sample placement area within the inspection platform permits placement of sampling swabs or other items for radiation contamination evaluation. The system as depicted incorporates front door seals and a latch to permit a vacuum to be pulled within the chamber during the radiation detection operation.

Exemplary Anode-RSD Configuration (2500)-(3600)

Figure 25:
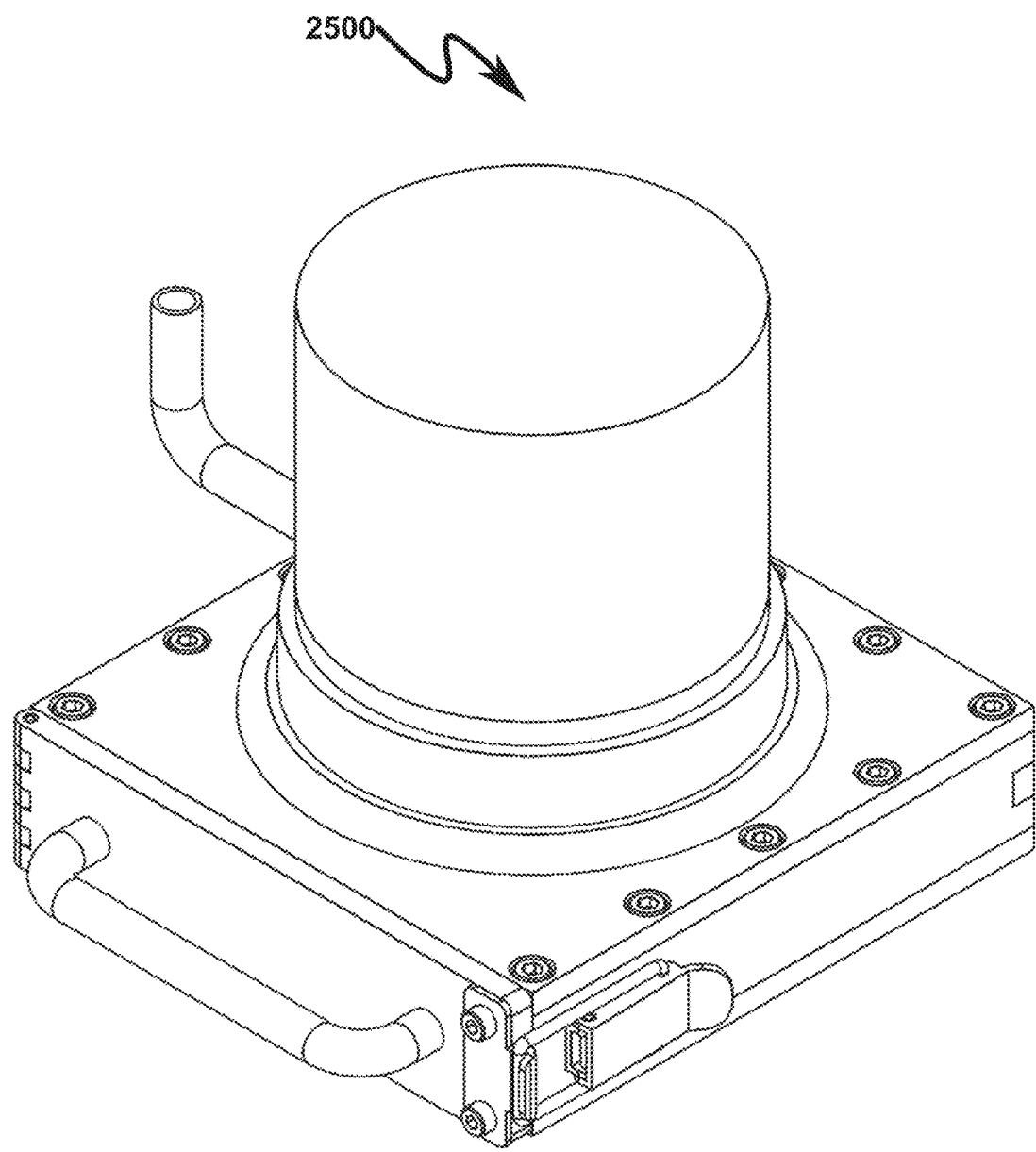
FIG. 25 illustrates a top front perspective view of a typical SSDD+RSD anode-facing-RSD assembly mated with an exemplary inspection chamber with the front access door closed.
Figure 26:
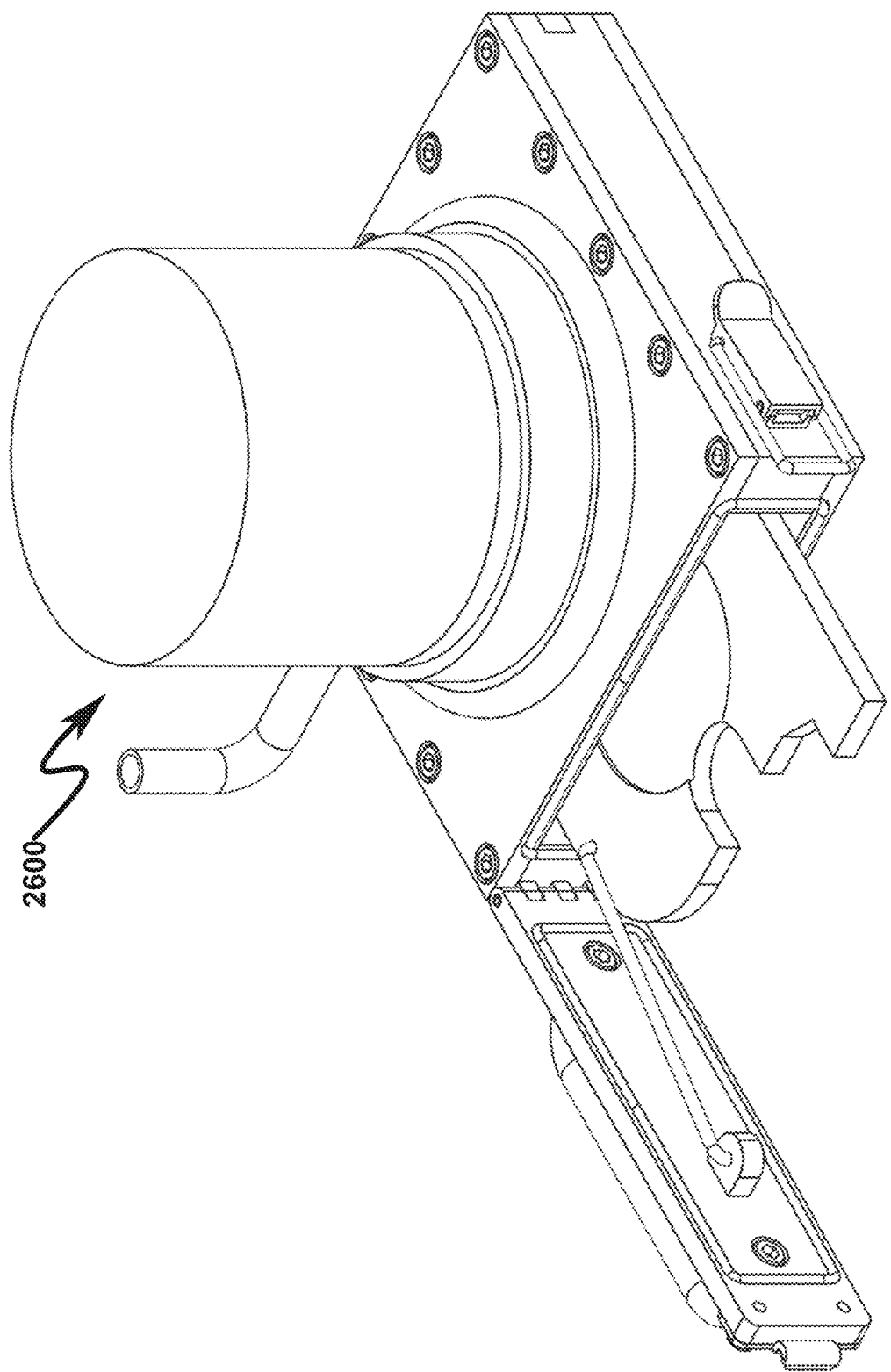
FIG. 26 illustrates a top perspective view of a typical SSDD+RSD anode-facing-RSD assembly mated with an exemplary inspection chamber with the front access door fully open.
Figure 36:
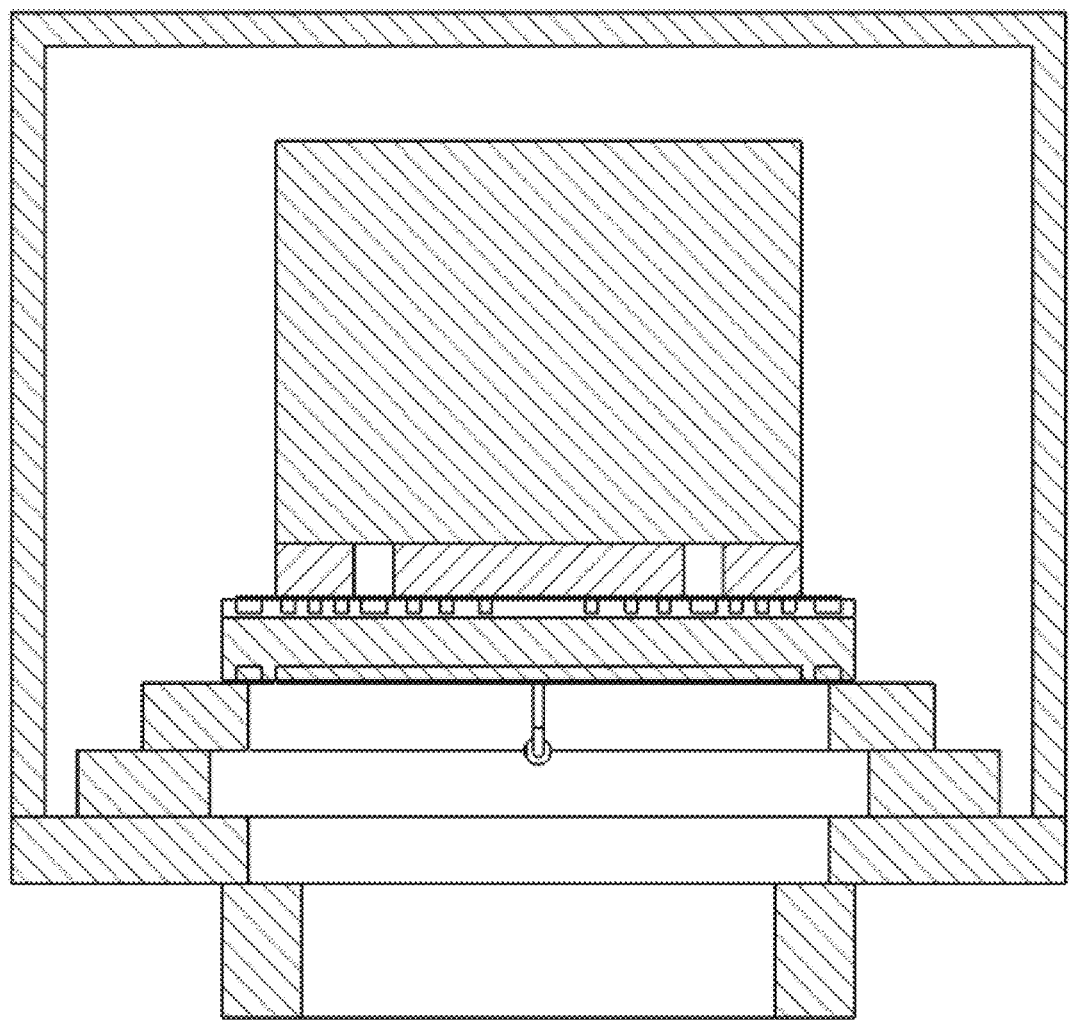
FIG. 36 illustrates a side sectional detail view of a typical SSDD+RSD anode-facing-RSD assembly.

An exemplary invention embodiment wherein the SSDD+RSD structure is configured with the segmented silicon drift detector (SSDD) anode directed toward the radiation scintillation detector (RSD) is depicted in FIG. 25 (2500)-FIG. 36 (3600). Here the SSDD+RSD structure is stacked with the SSDD (2721) mated with the RSD (2722) with and adhesive layer (2723) such that the anode (2724) side of the SSDD (2721) is toward the RSD (2722).

Figure 27:
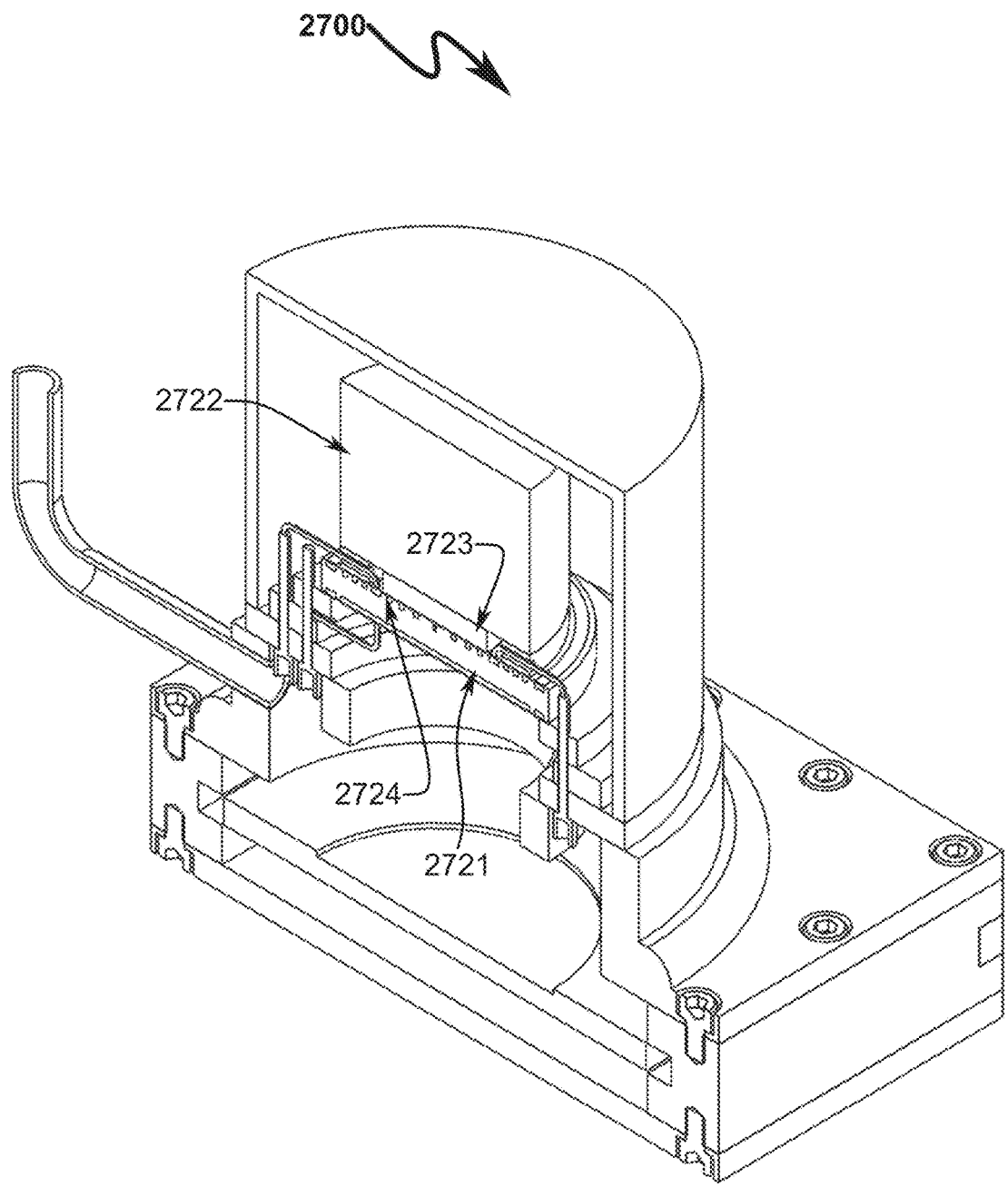
FIG. 27 illustrates a top front perspective front sectional view of a typical SSDD+RSD anode-facing-RSD assembly mated with an exemplary inspection chamber.
Figure 28:
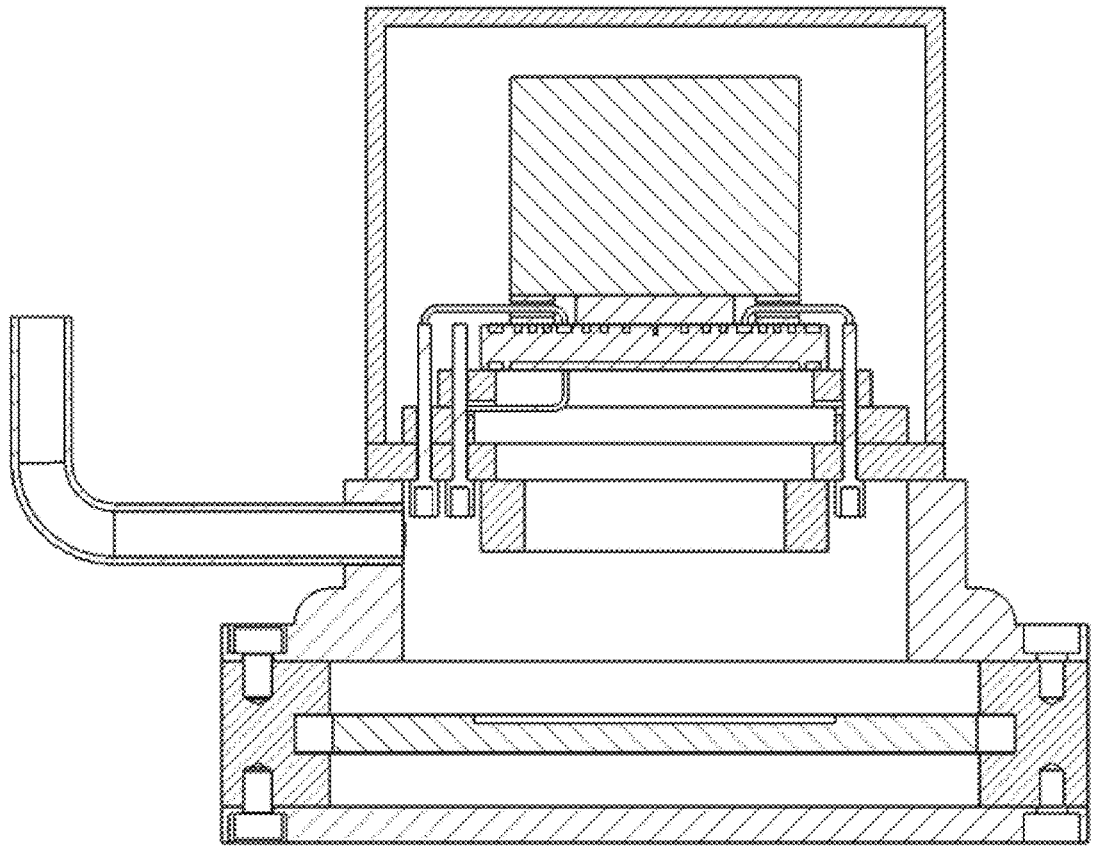
FIG. 28 illustrates a front sectional view of a typical SSDD+RSD anode-facing-RSD assembly mated with an exemplary inspection chamber.
Figure 29:
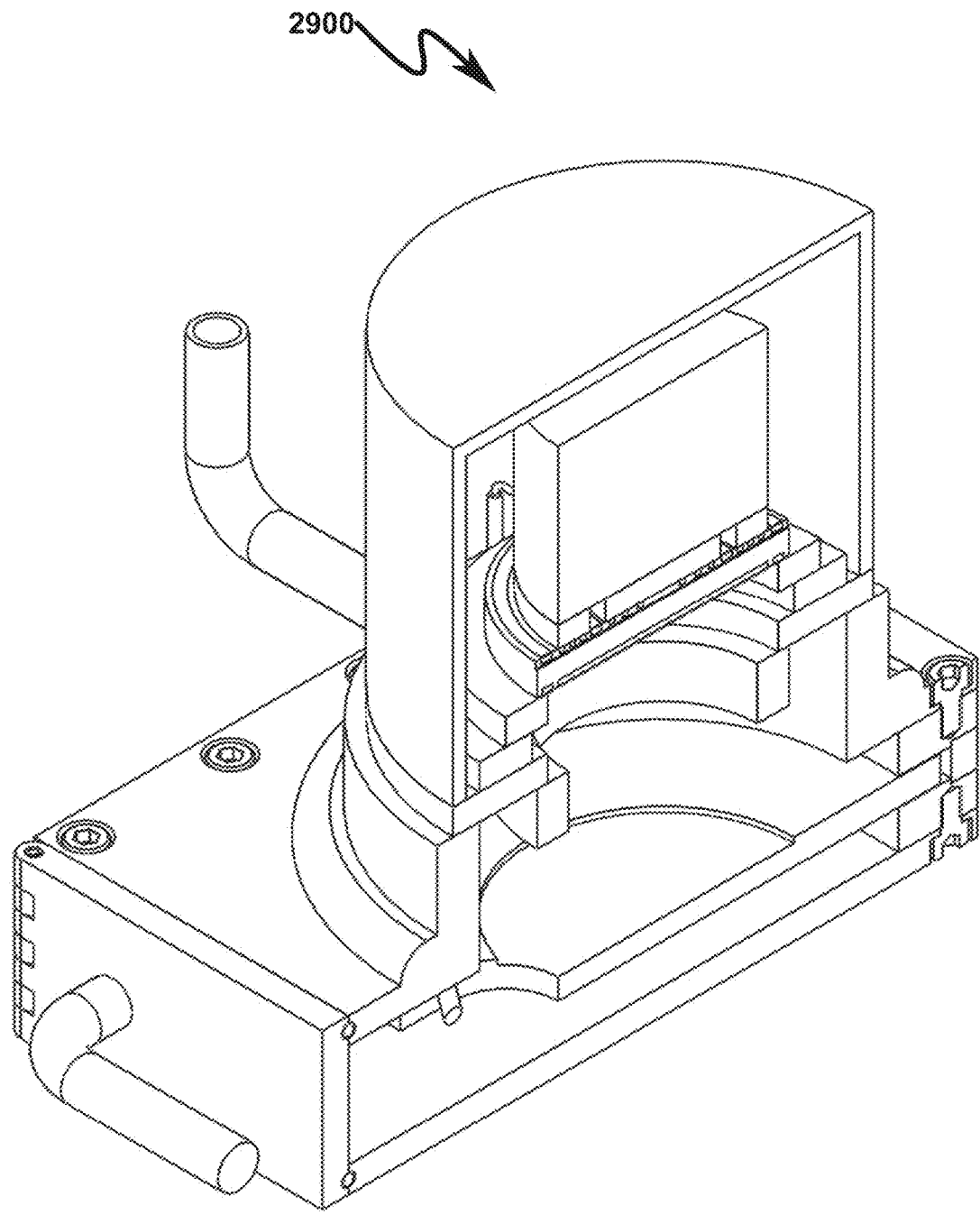
FIG. 29 illustrates a top front perspective side sectional view of a typical SSDD+RSD anode-facing-RSD assembly mated with an exemplary inspection chamber.
Figure 30:
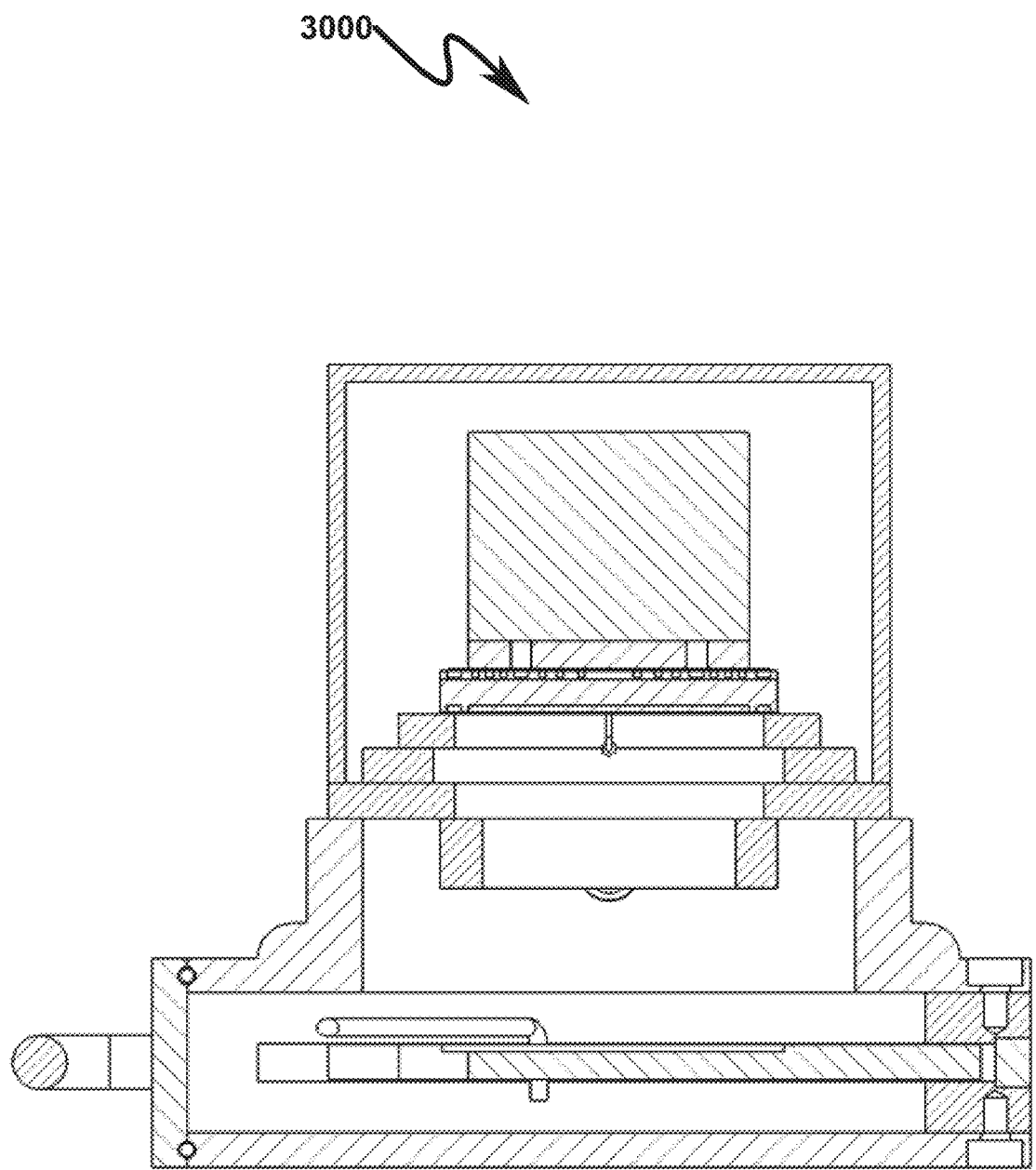
FIG. 30 illustrates a side sectional view of a typical SSDD+RSD anode-facing-RSD assembly mated with an exemplary inspection chamber.
Figure 31:
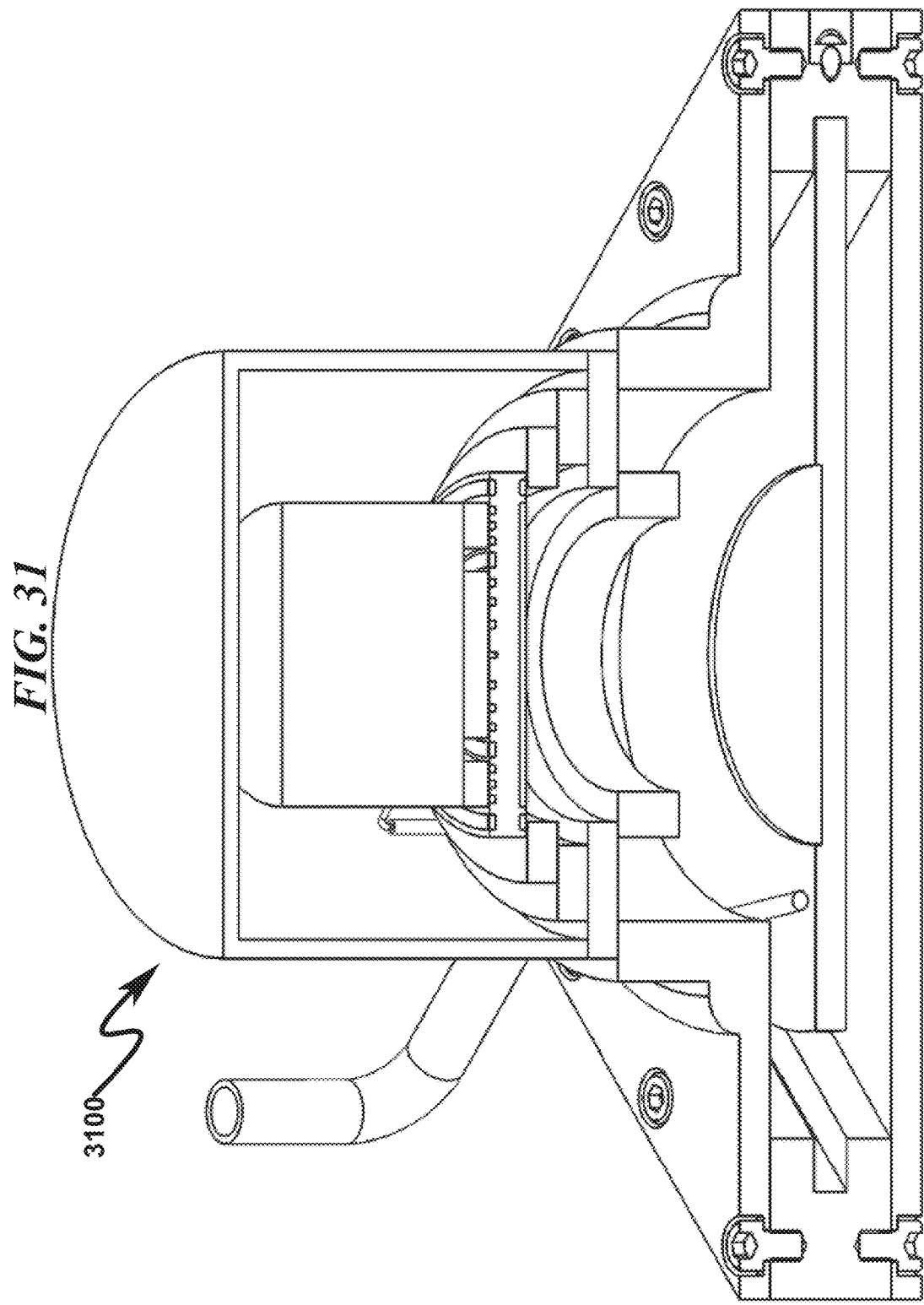
FIG. 31 illustrates a top front perspective diagonal sectional view of a typical SSDD+RSD anode-facing-RSD assembly mated with an exemplary inspection chamber.
Figure 32:
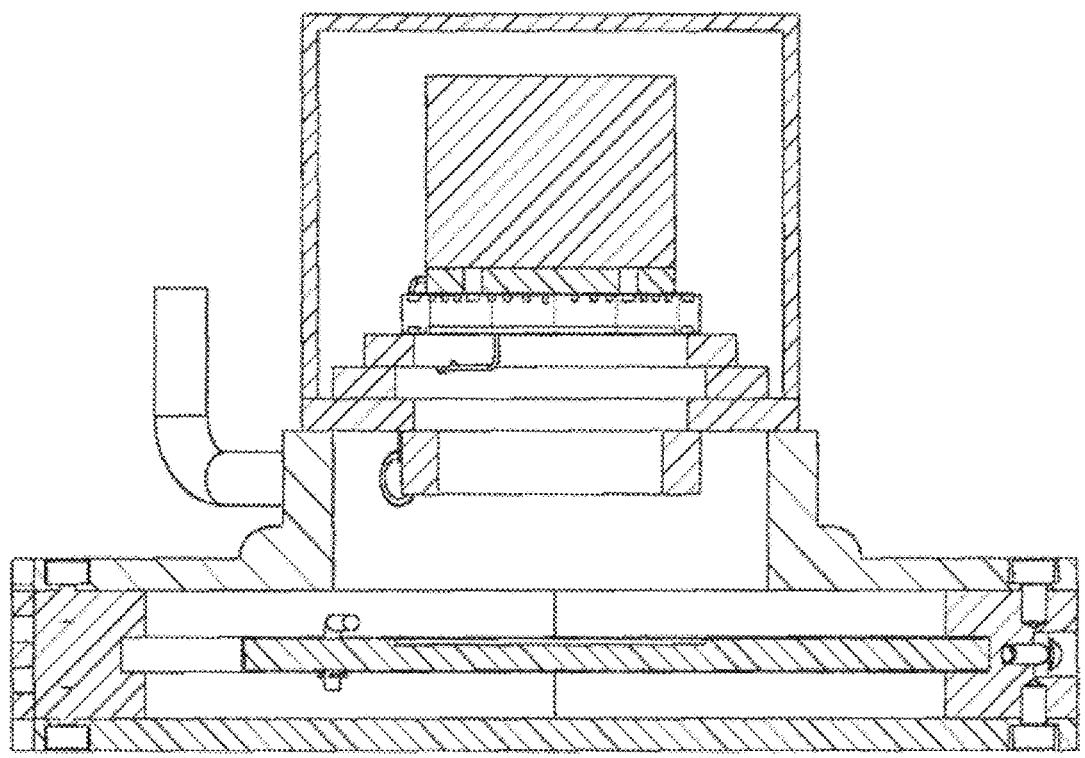
FIG. 32 illustrates a diagonal sectional view of a typical SSDD+RSD anode-facing-RSD assembly mated with an exemplary inspection chamber.
Figure 33:
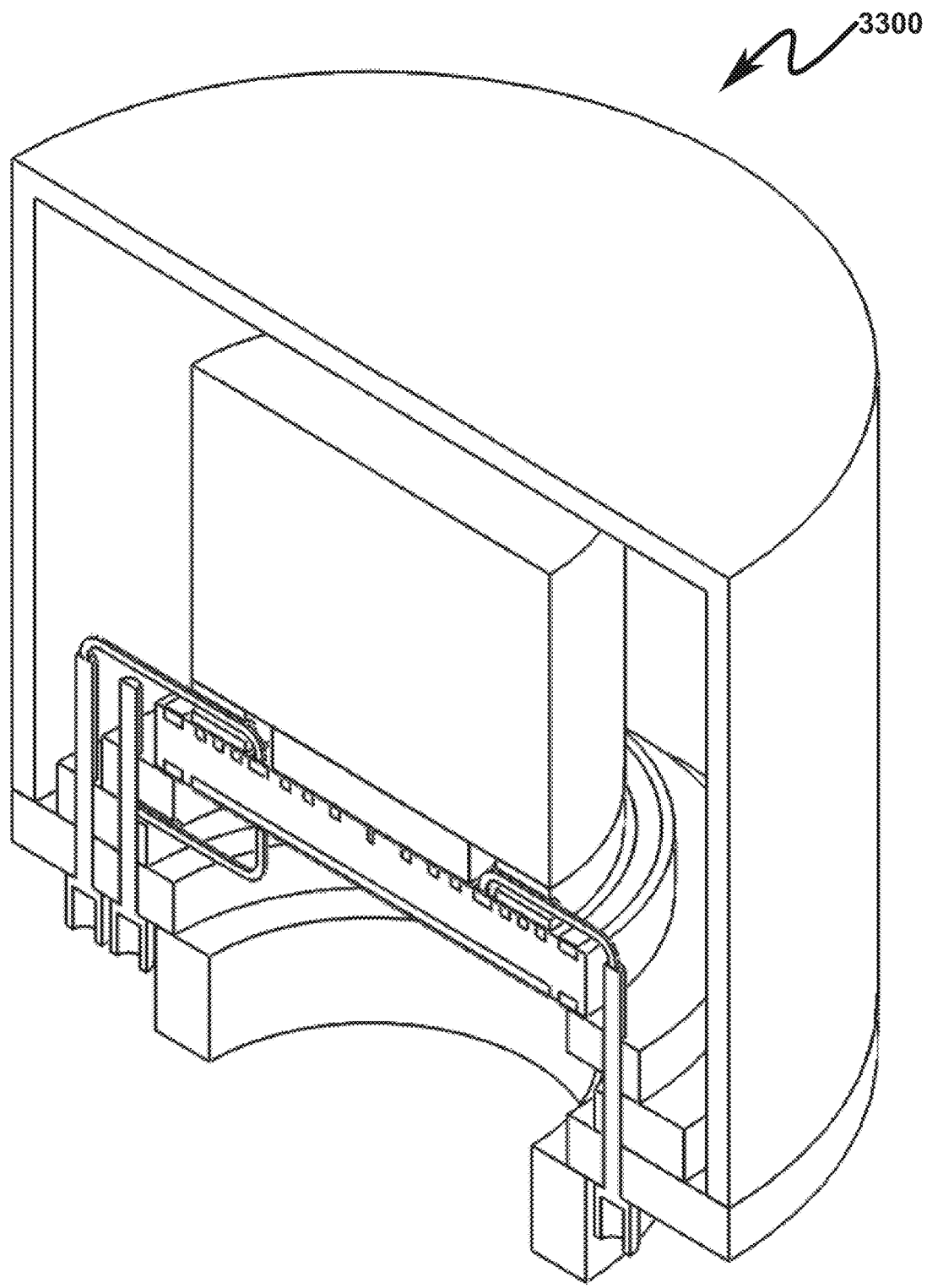
FIG. 33 illustrates a top front perspective front sectional detail view of a typical SSDD+RSD anode-facing-RSD assembly.
Figure 34:
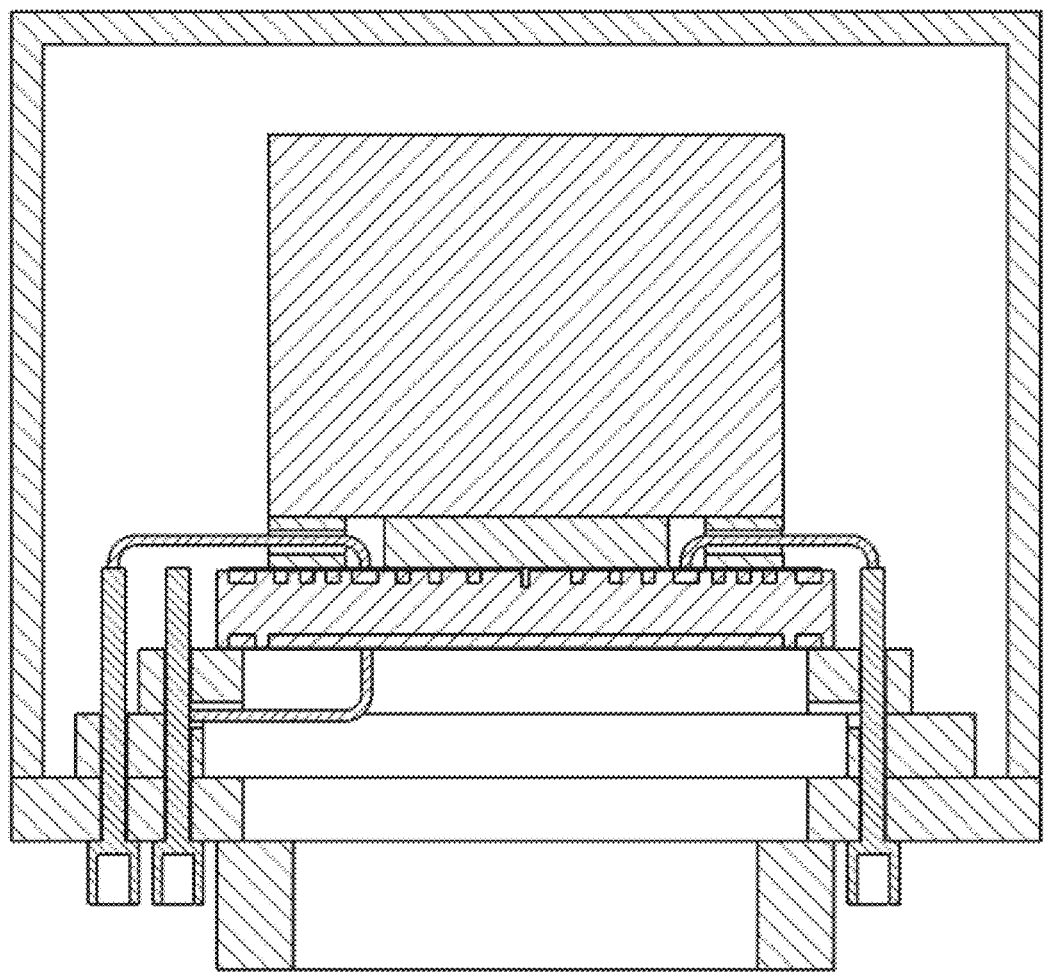
FIG. 34 illustrates a front sectional detail view of a typical SSDD+RSD anode-facing-RSD assembly.
Figure 35:
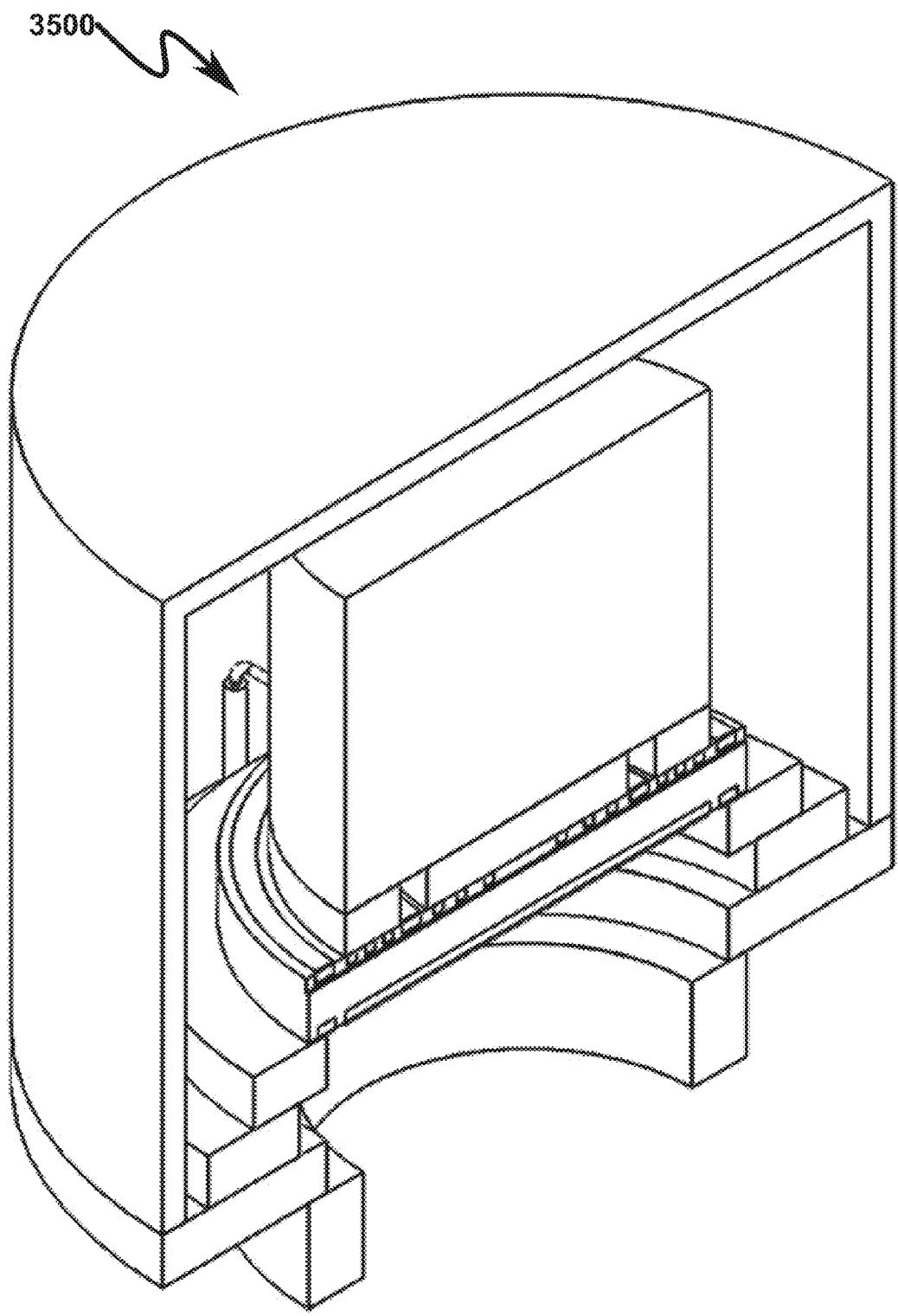
FIG. 35 illustrates a top front perspective side sectional detail view of a typical SSDD+RSD anode-facing-RSD assembly.

FIG. 27 (2700)-FIG. 28 (2800) depict front sectional views of the SSDD+RSD anode-facing-RSD and inspection chamber assembly. FIG. 29 (2900)-FIG. 30 (3000) depict side sectional views of the SSDD+RSD anode-facing-RSD and inspection chamber assembly. FIG. 31 (3100)-FIG. 32 (3200) depict diagonal sectional views of the SSDD+RSD anode-facing-RSD and inspection chamber assembly. FIG. 33 (3300)-FIG. 34 (3400) depict isolated front sectional views of the SSDD+RSD anode-facing-RSD assembly. FIG. 35 (3500)-FIG. 36 (3600) depict isolated side sectional views of the SSDD+RSD anode-facing-RSD assembly.

While the depicted SSDD+RSD assemblies in these examples are cylindrical, the present invention also anticipates square or rectangular geometries for the detector and/or housing. One skilled in the art will also recognize that the anode/cathode connections to the SSDD+RSD assembly may be constructed in a variety of ways with the depicted connection methodology being just one preferred example.

Exemplary Anode-RIS Configuration (3700)-(4800)

Figure 37:
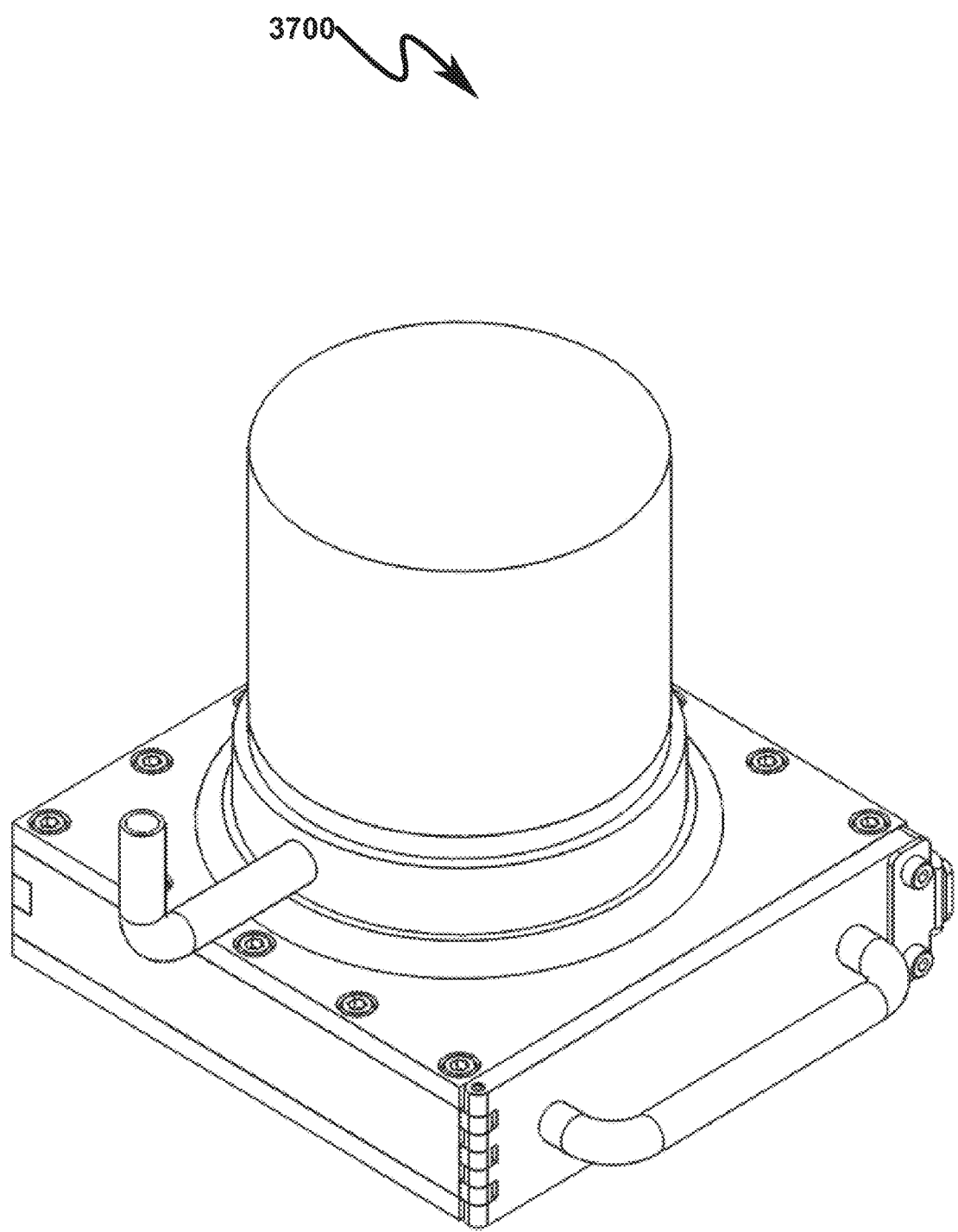
FIG. 37 illustrates a top front perspective view of a typical SSDD+RSD anode-facing-RIS assembly mated with an exemplary inspection chamber with the front access door closed.
Figure 38:
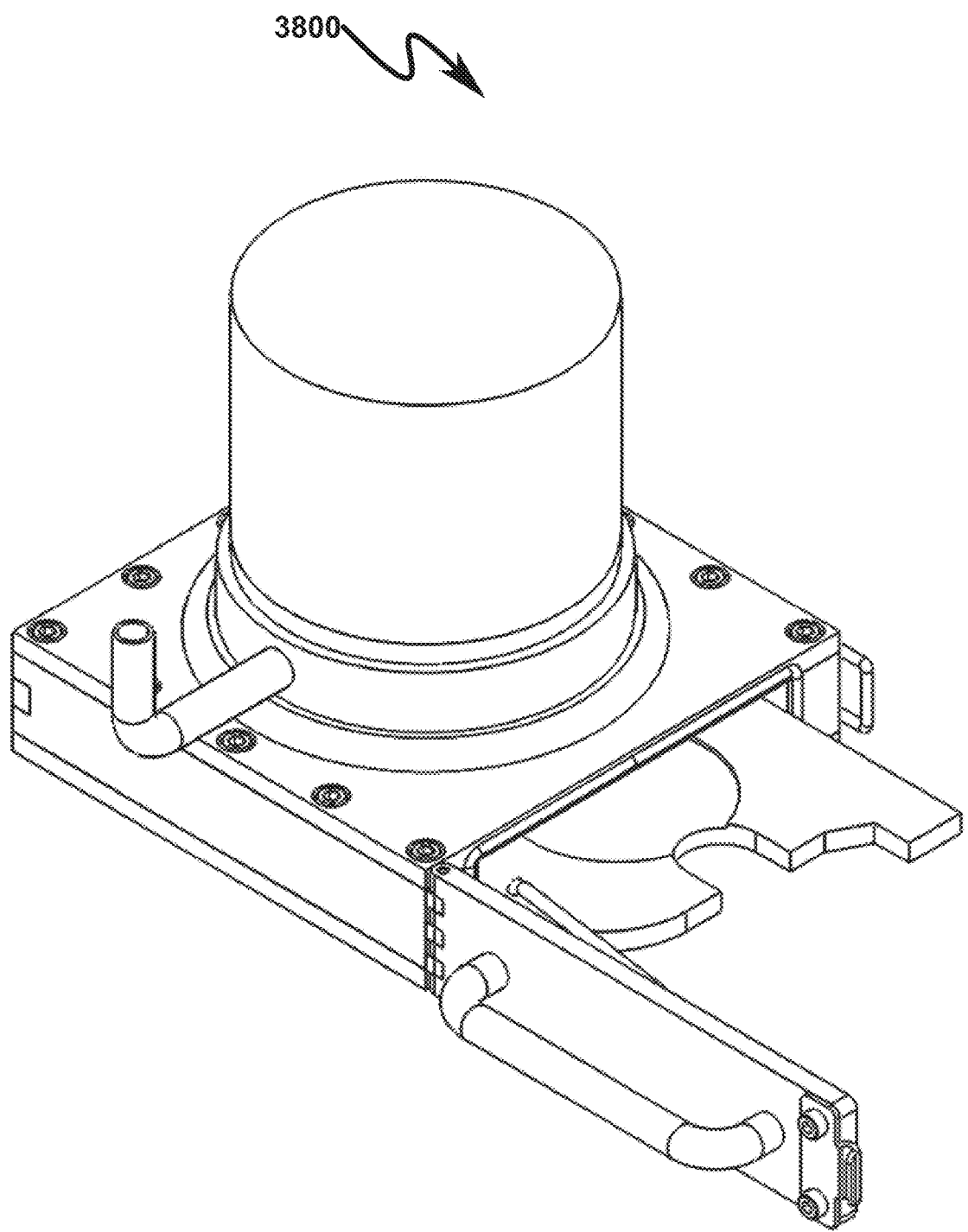
FIG. 38 illustrates a top perspective view of a typical SSDD+RSD anode-facing-RIS assembly mated with an exemplary inspection chamber with the front access door fully open.
Figure 48:
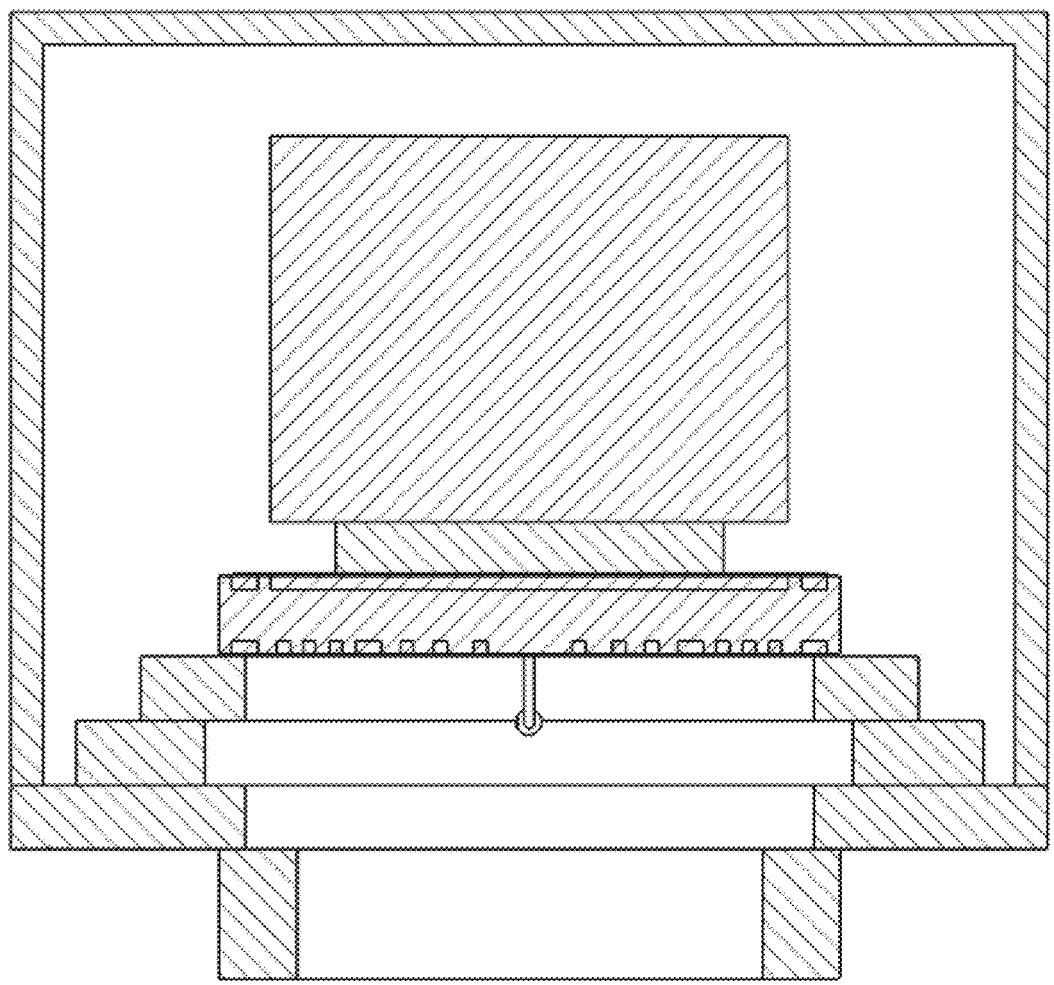
FIG. 48 illustrates a side sectional detail view of a typical SSDD+RSD anode-facing-RIS assembly.

An exemplary invention embodiment wherein the SSDD+RSD structure is configured with the segmented silicon drift detector (SSDD) anode directed toward the radiation inspection surface (RIS) is depicted in FIG. 37 (3700)-FIG. 48 (4800). Here the SSDD+RSD structure is stacked with the SSDD (3921) mated with the RSD (3922) with and adhesive layer (3923) such that the anode (3924) side of the SSDD (3921) is directed away from the RSD (3922) and toward the RIS and the inspection platform (3925) in the inspection chamber.

Figure 39:
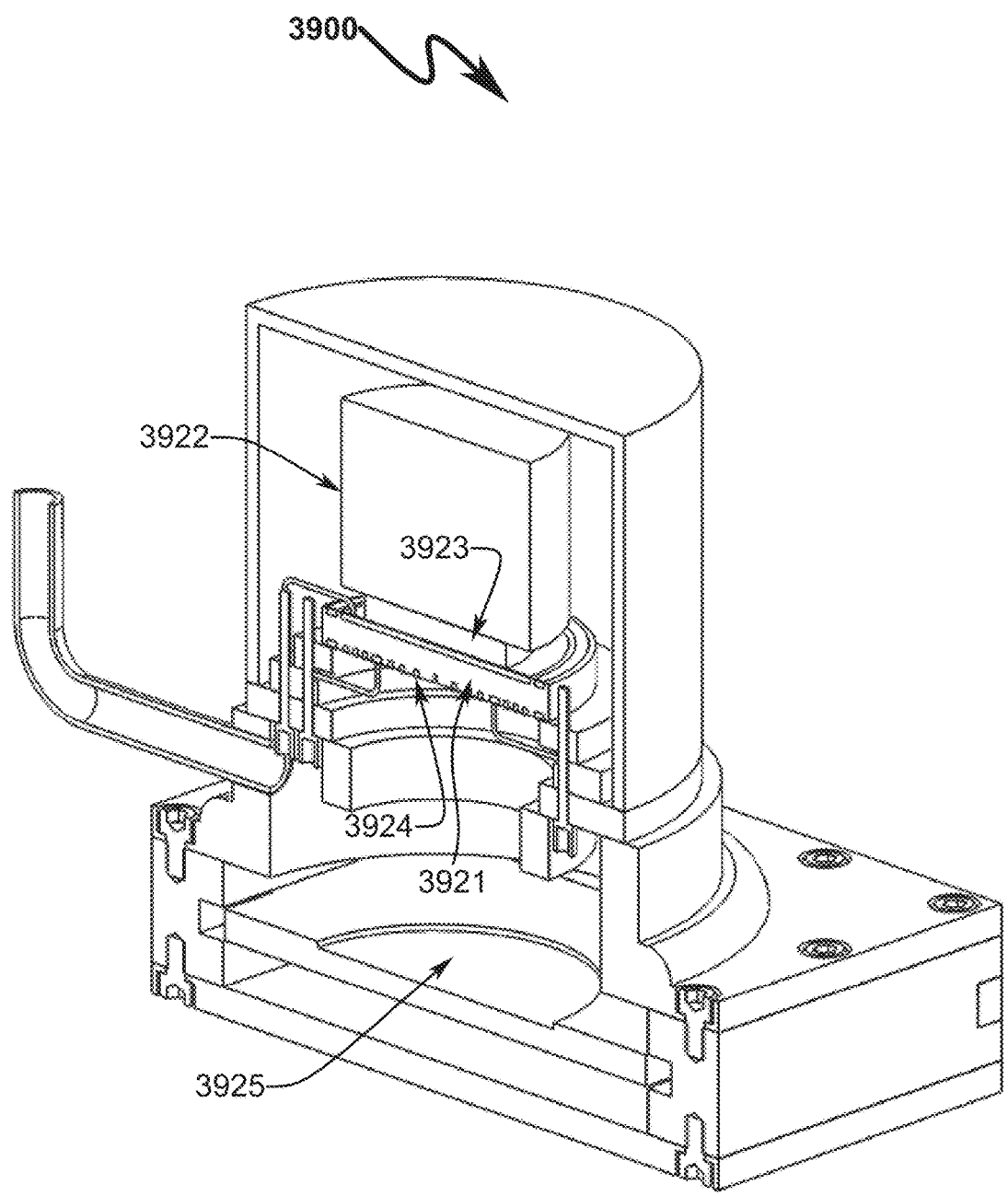
FIG. 39 illustrates a top front perspective front sectional view of a typical SSDD+RSD anode-facing-RIS assembly mated with an exemplary inspection chamber.
Figure 40:
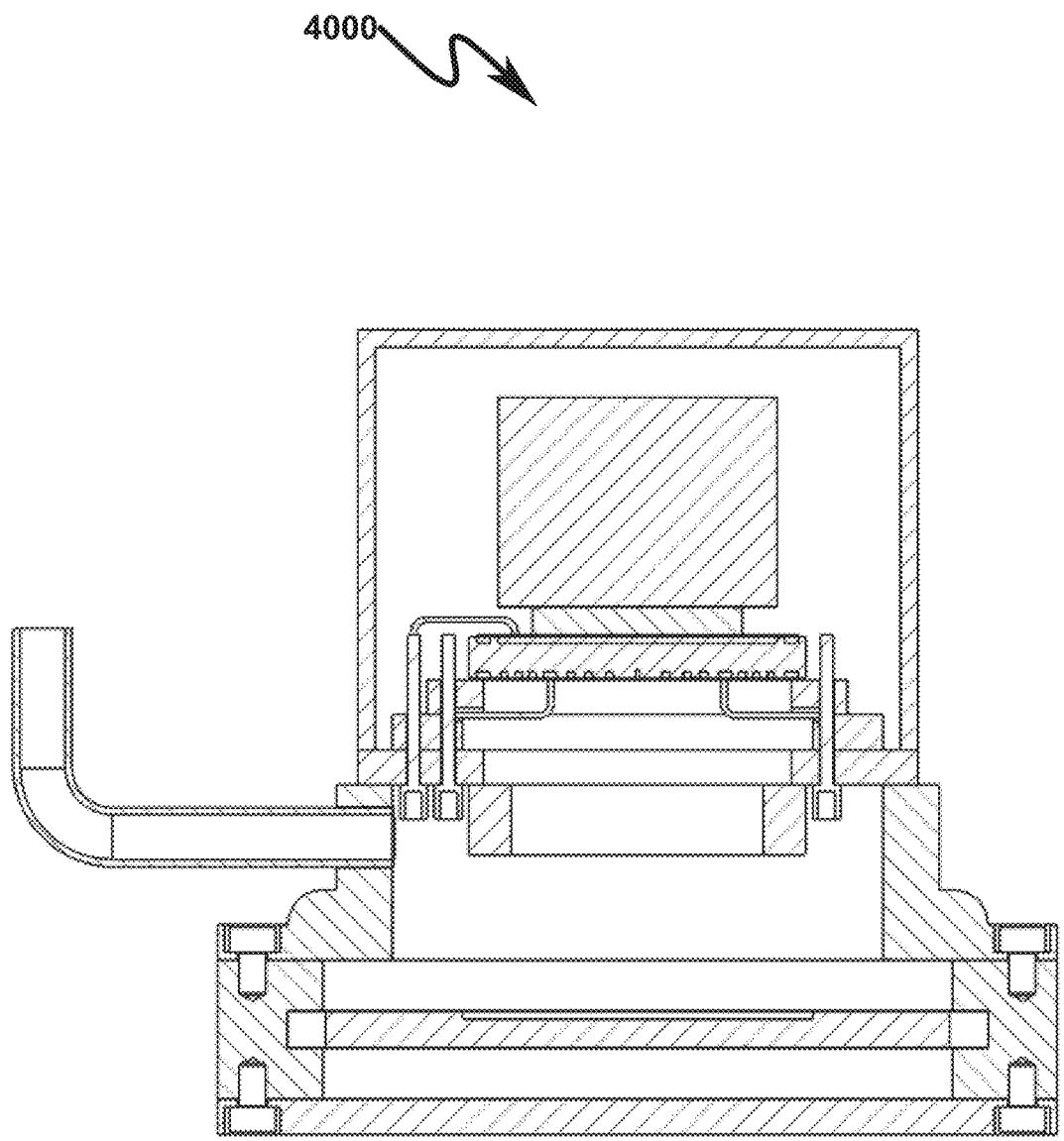
FIG. 40 illustrates a front sectional view of a typical SSDD+RSD anode-facing-RIS assembly mated with an exemplary inspection chamber.
Figure 41:
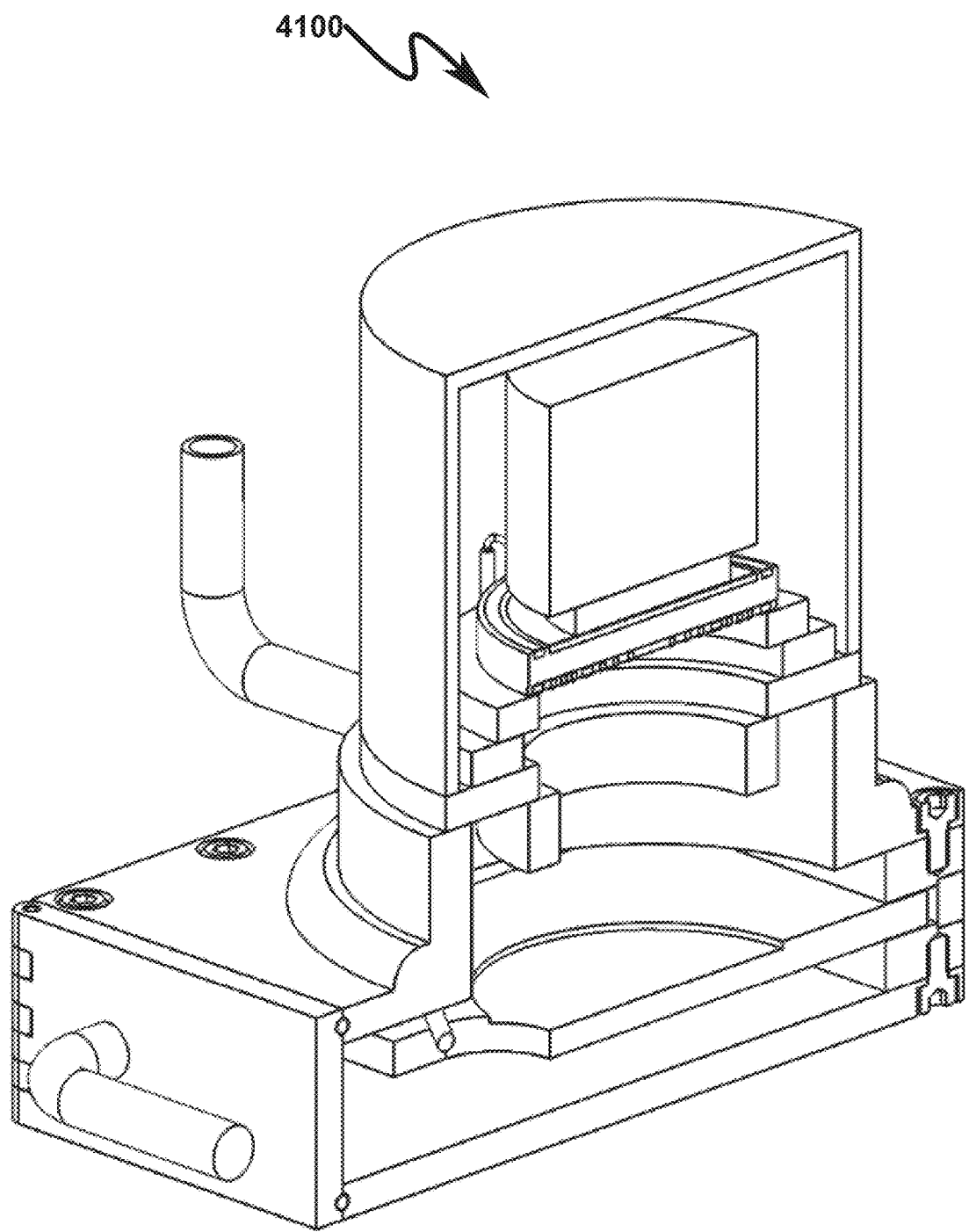
FIG. 41 illustrates a top front perspective side sectional view of a typical SSDD+RSD anode-facing-RIS assembly mated with an exemplary inspection chamber.
Figure 42:
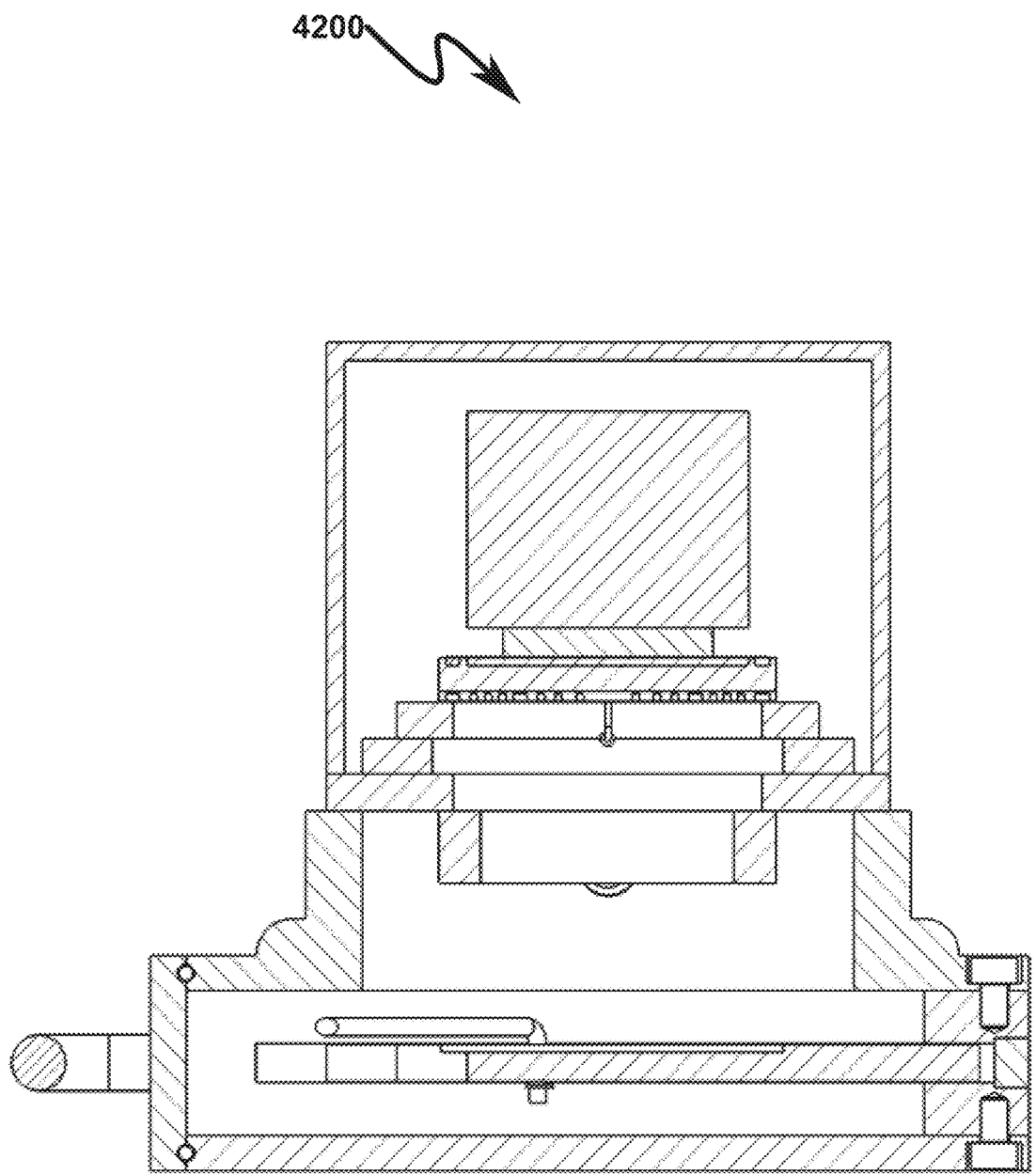
FIG. 42 illustrates a side sectional view of a typical SSDD+RSD anode-facing-RIS assembly mated with an exemplary inspection chamber.
Figure 43:
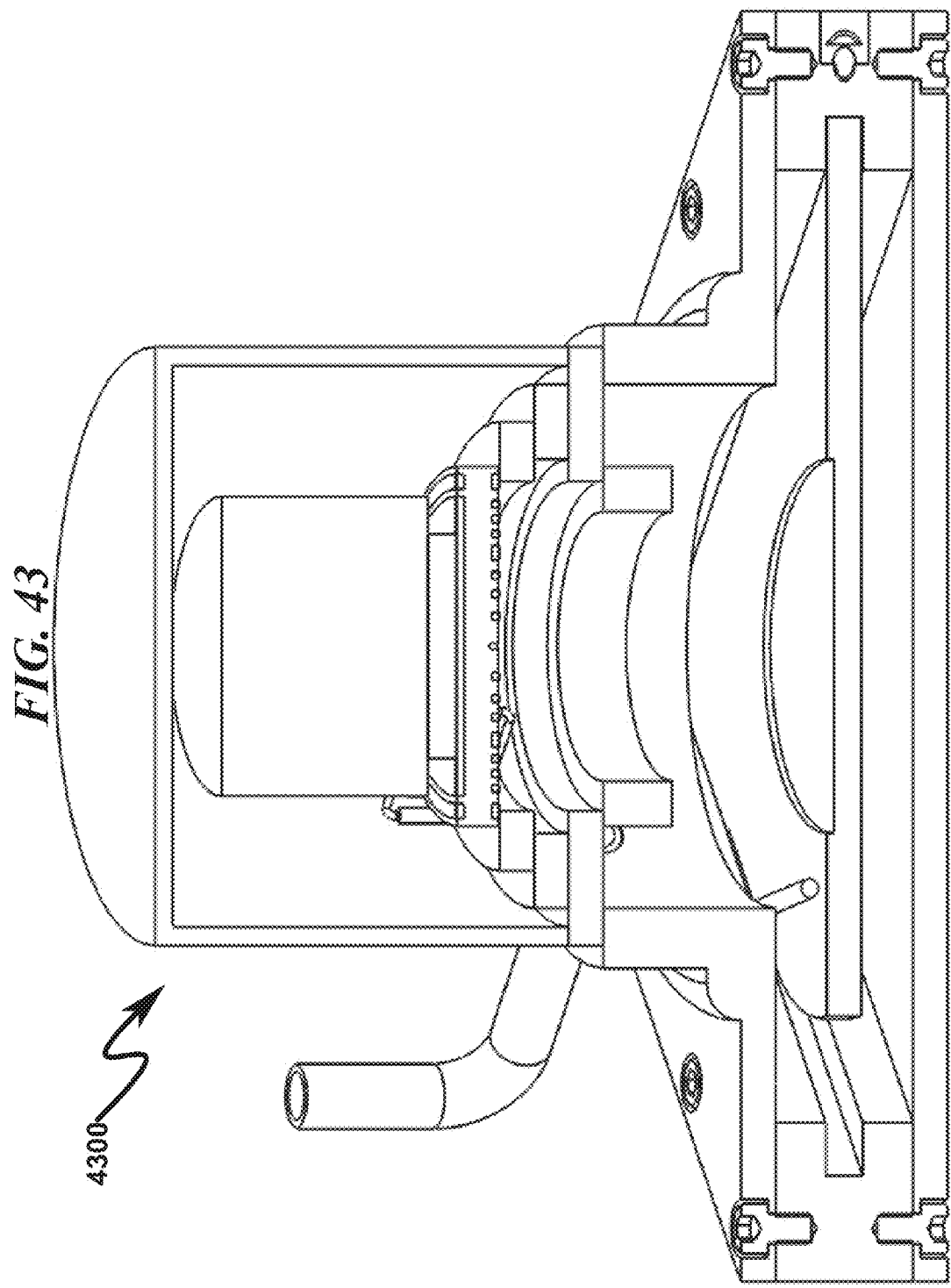
FIG. 43 illustrates a top front perspective diagonal sectional view of a typical SSDD+RSD anode-facing-RIS assembly mated with an exemplary inspection chamber.
Figure 44:
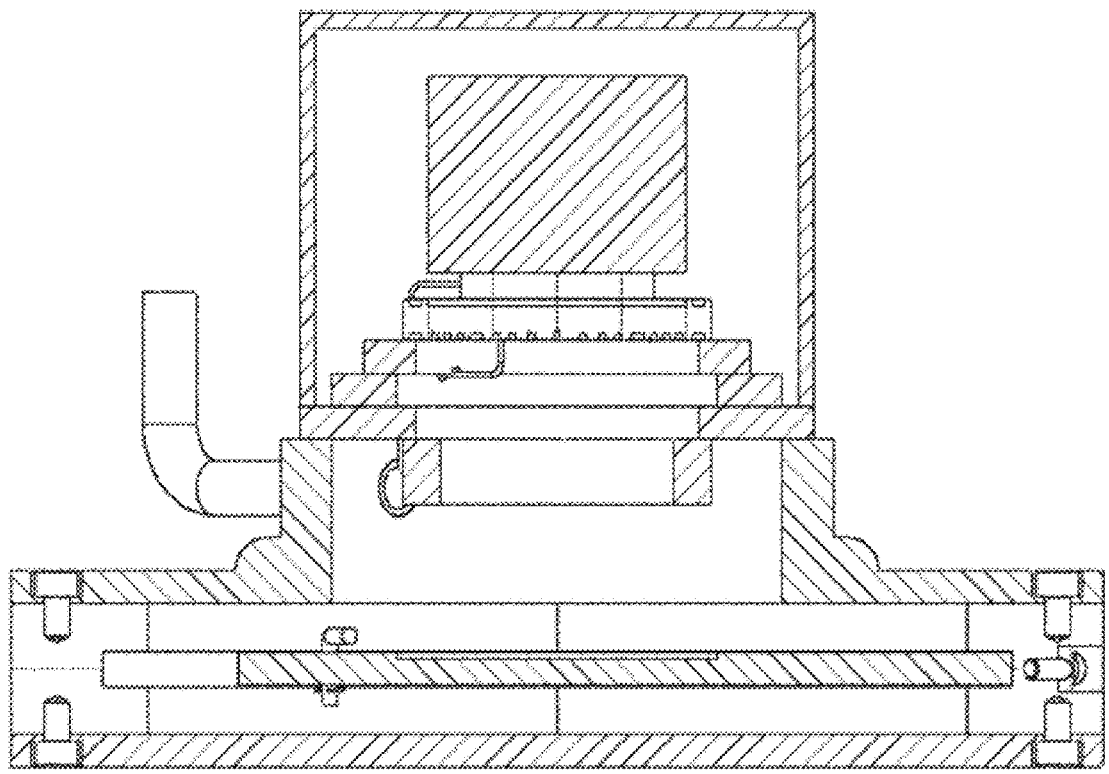
FIG. 44 illustrates a diagonal sectional view of a typical SSDD+RSD anode-facing-RIS assembly mated with an exemplary inspection chamber.

FIG. 39 (3900)-FIG. 40 (4000) depict front sectional views of the SSDD+RSD anode-facing-RIS and inspection chamber assembly. FIG. 41 (4100)-FIG. 42 (4200) depict side sectional views of the SSDD+RSD anode-facing-RIS and inspection chamber assembly. FIG. 43 (4300)-FIG. 44

Figure 45:
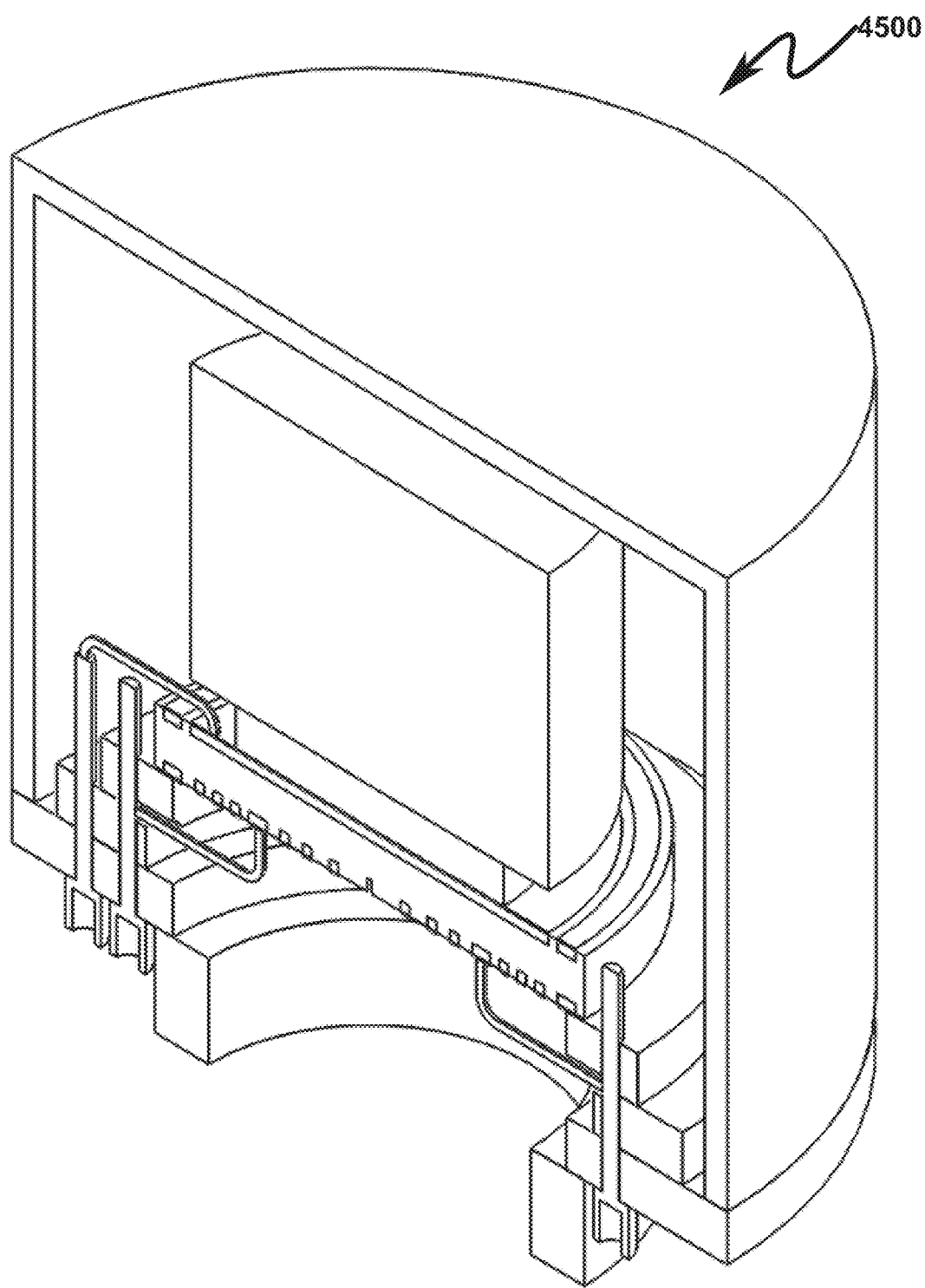
FIG. 45 illustrates a top front perspective front sectional detail view of a typical SSDD+RSD anode-facing-RIS assembly.
Figure 46:
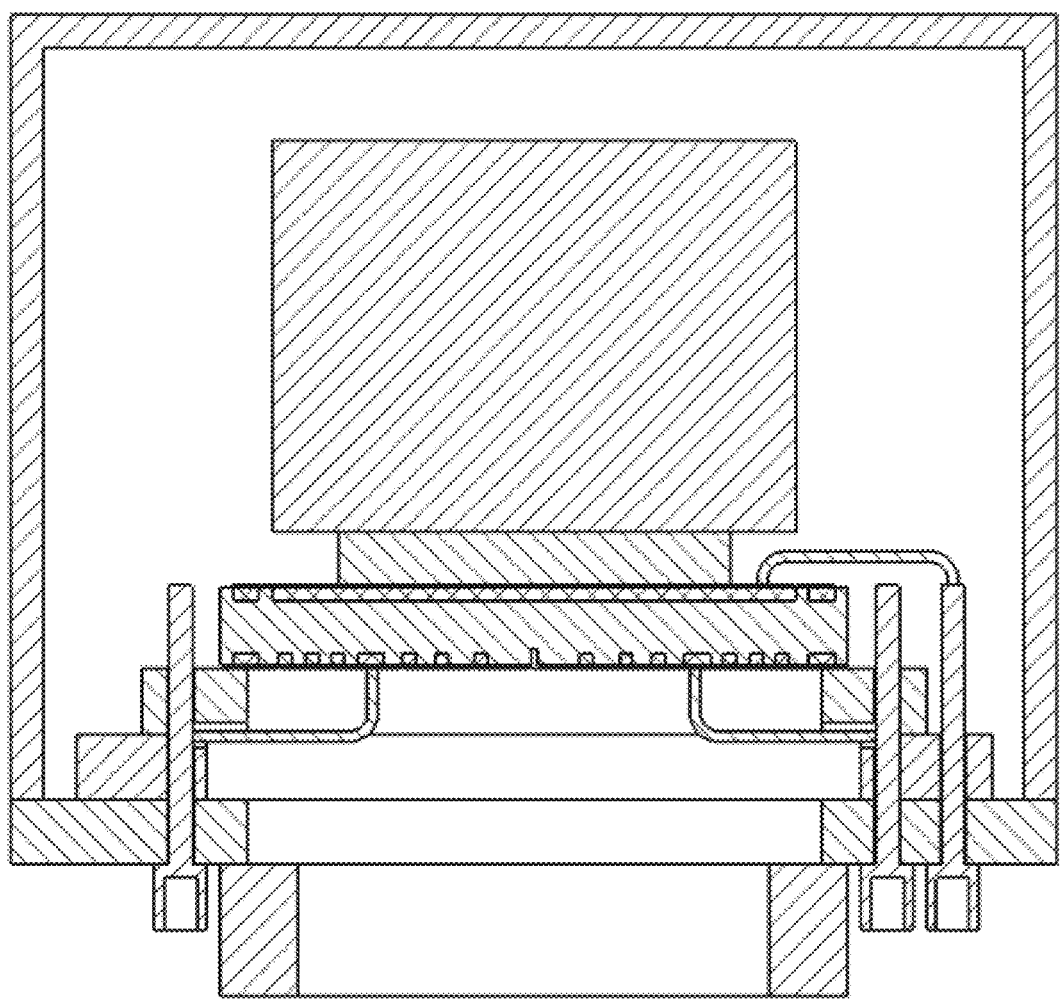
FIG. 46 illustrates a front sectional detail view of a typical SSDD+RSD anode-facing-RIS assembly.
Figure 47:
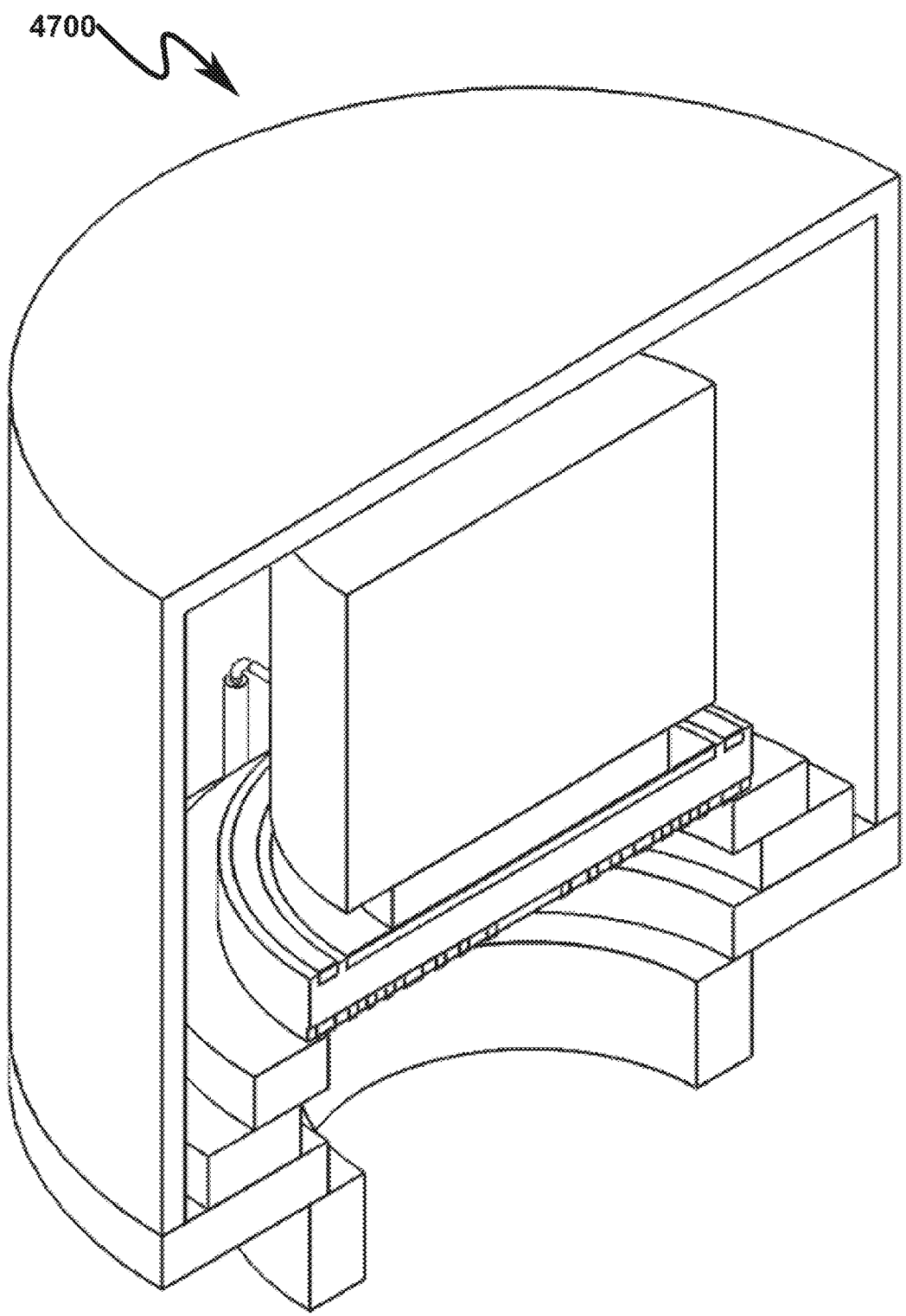
FIG. 47 illustrates a top front perspective side sectional detail view of a typical SSDD+RSD anode-facing-RIS assembly.

(4400) depict diagonal sectional views of the SSDD+RSD anode-facing-RIS and inspection chamber assembly. FIG. 45 (4500)-FIG. 46 (4600) depict isolated front sectional views of the SSDD+RSD anode-facing-RIS assembly. FIG. 47 (4700)-FIG. 48 (4800) depict isolated side sectional views of the SSDD+RSD anode-facing-RIS assembly.

While the depicted SSDD+RSD assemblies in these examples are cylindrical, the present invention also anticipates square or rectangular geometries for the detector and/or housing. One skilled in the art will also recognize that the anode/cathode connections to the SSDD+RSD assembly may be constructed in a variety of ways with the depicted connection methodology being just one preferred example.

Exemplary Circular SSDD Construction (4900)-(5600)

Figure 49:
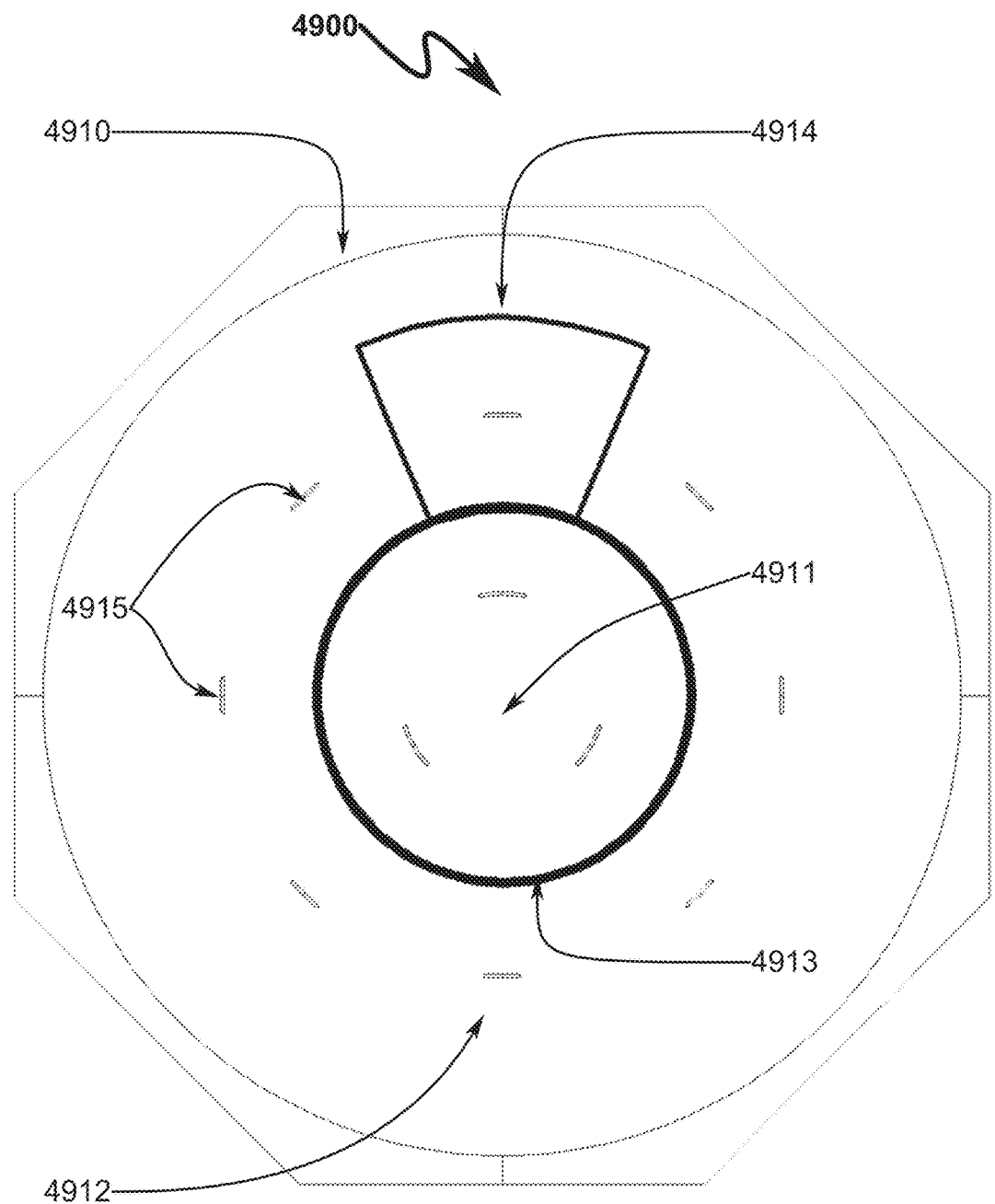
FIG. 49 illustrates an outline of a preferred exemplary two-segment circular SSDD detector structure.
Figure 50:
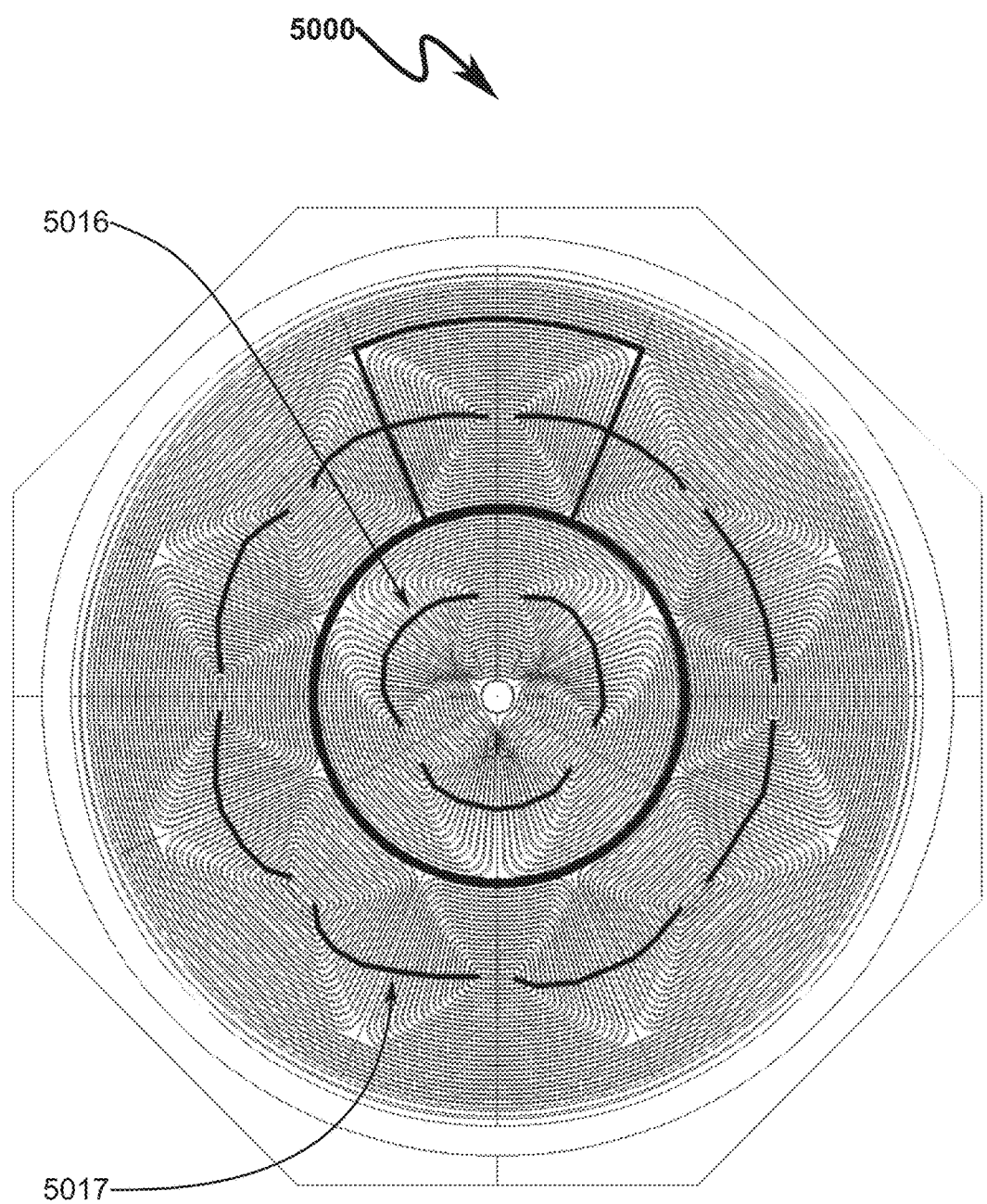
FIG. 50 illustrates a preferred exemplary two-segment circular SSDD detector structure illustrating segment outlines and anode bonding wire connections.
Figure 56:
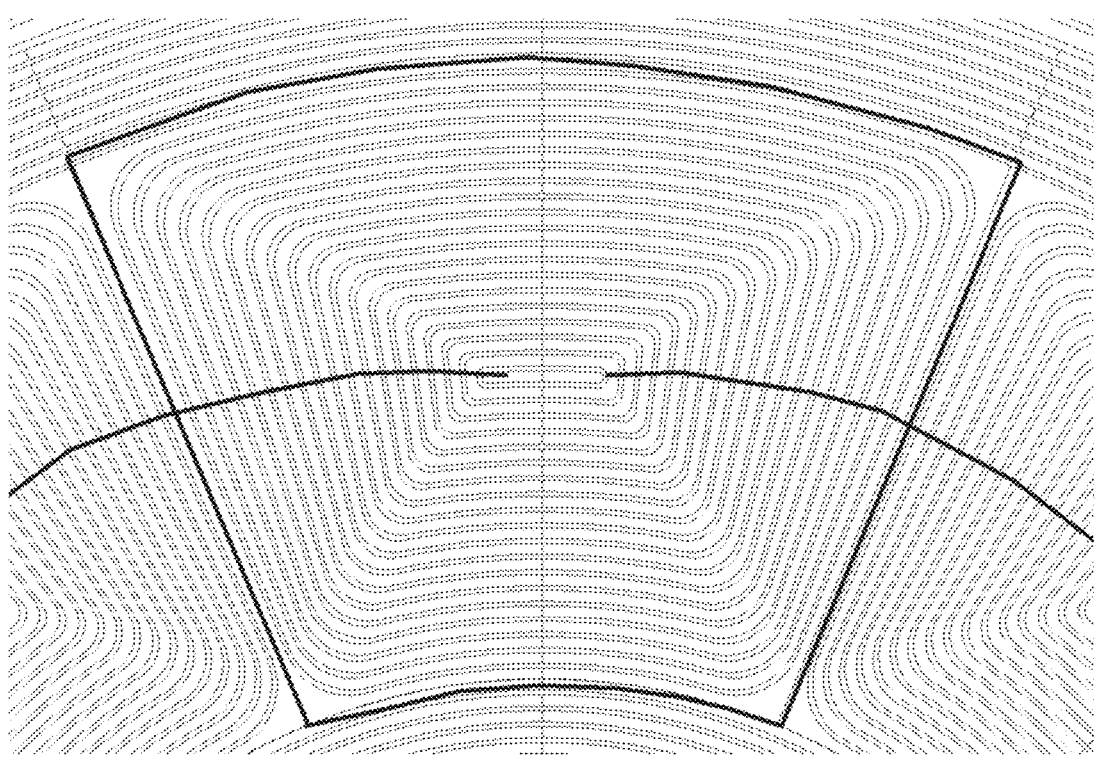
FIG. 56 illustrates a preferred exemplary two-segment circular SSDD detector structure illustrating top segment high resolution detail.

An exemplary circular SSDD detector structure is depicted in FIG. 49 (4900)-FIG. 56 (5600). As depicted in the outline of FIG. 49 (4900), the circular SSDD (4910) detector includes a first segment (4911) and a second segment (4912). The boundary (4913) between the first segment (4911) and second segment (4912) is also depicted. An elementary sub-segment contour (4914) is depicted along with a typical anode connection (4915). As depicted in FIG. 50 (5000), additional SSDD detail is provided illustrating the anode interconnections (5016, 5017) comprising bonding wires that interconnect the SSDD anodes within the first segment (4911) and a second segment (4912).

Figure 51:
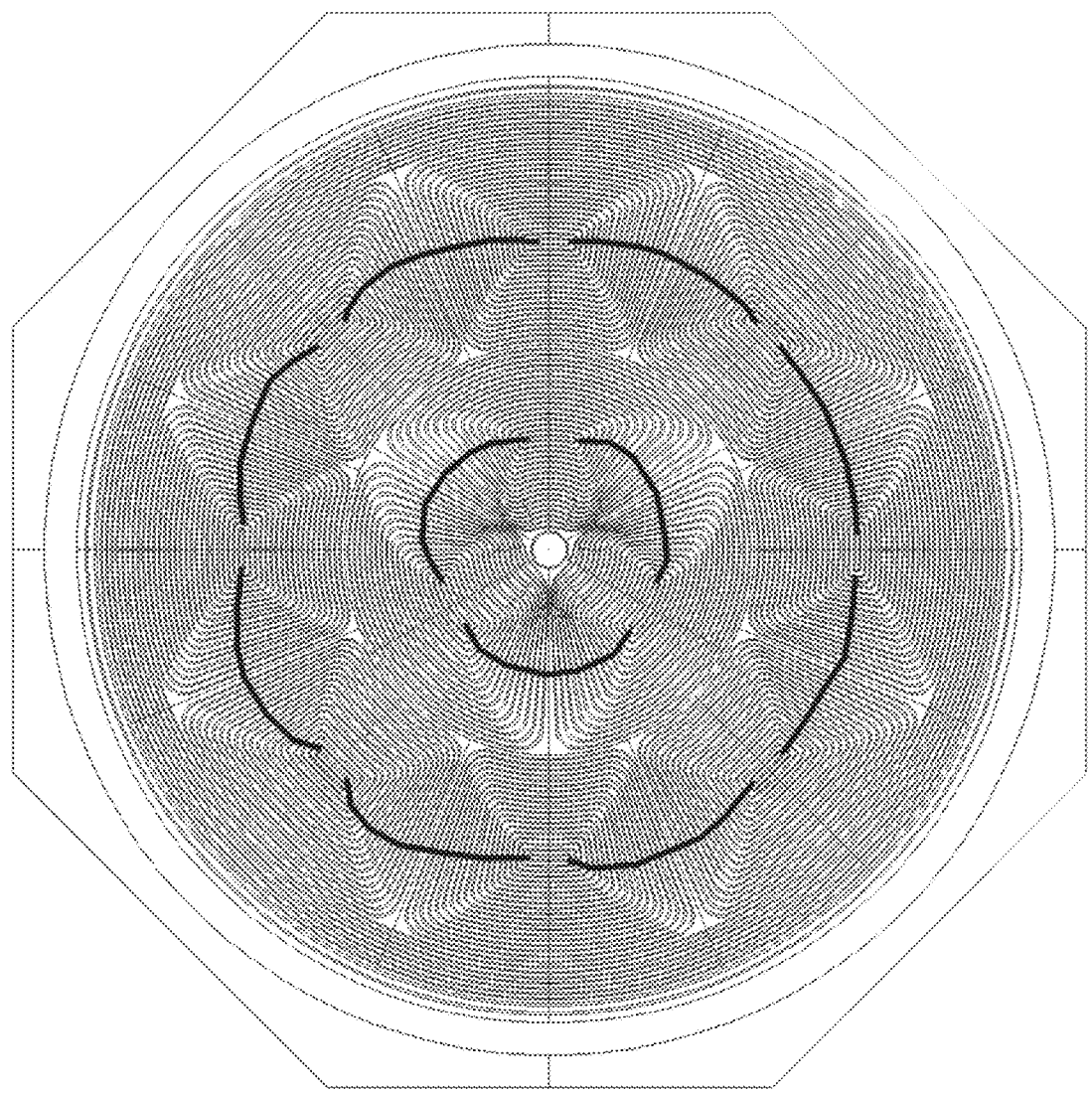
FIG. 51 illustrates a preferred exemplary two-segment circular SSDD detector structure illustrating bonding wire placement.
Figure 52:
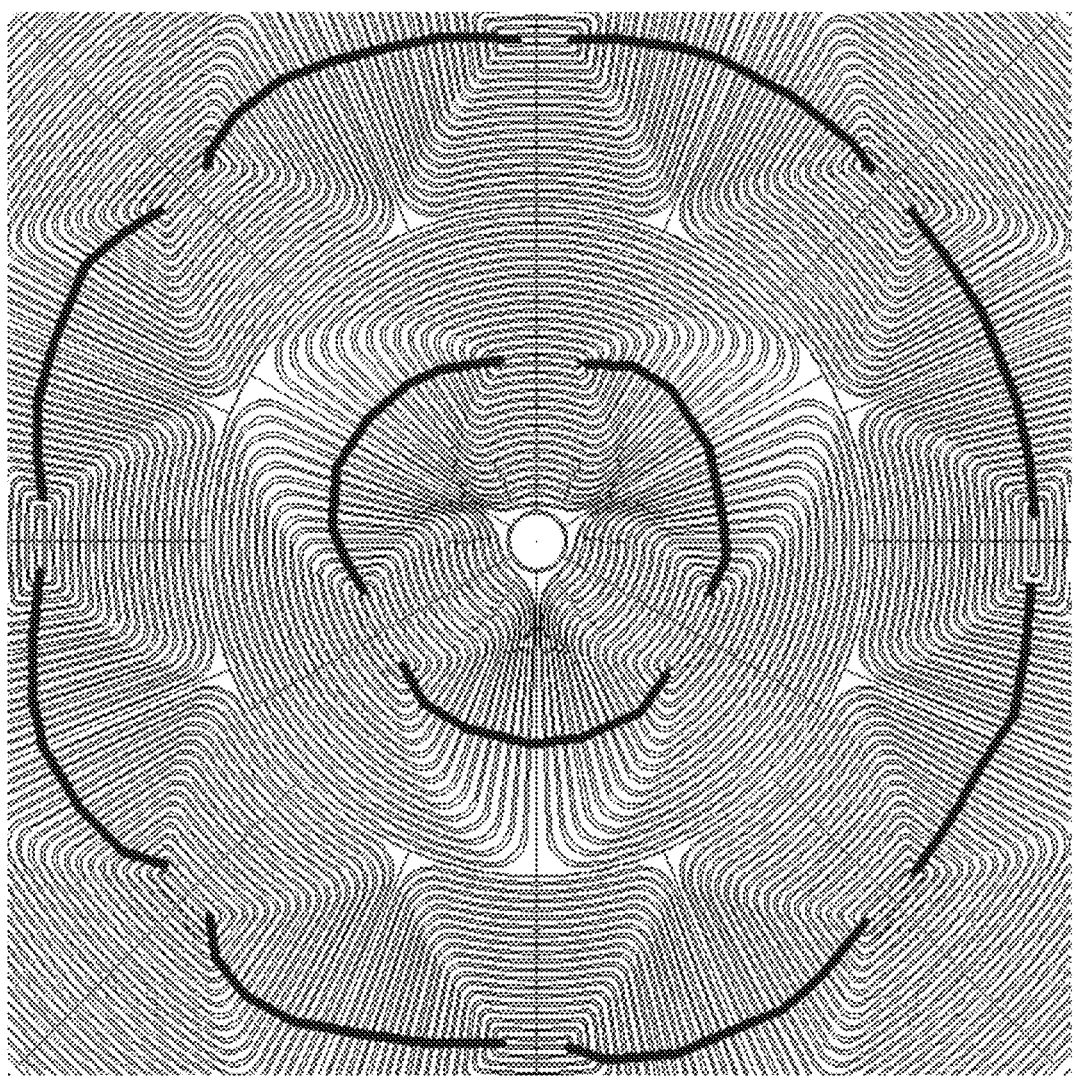
FIG. 52 illustrates a preferred exemplary two-segment circular SSDD detector structure illustrating detail of the center segments.
Figure 53:
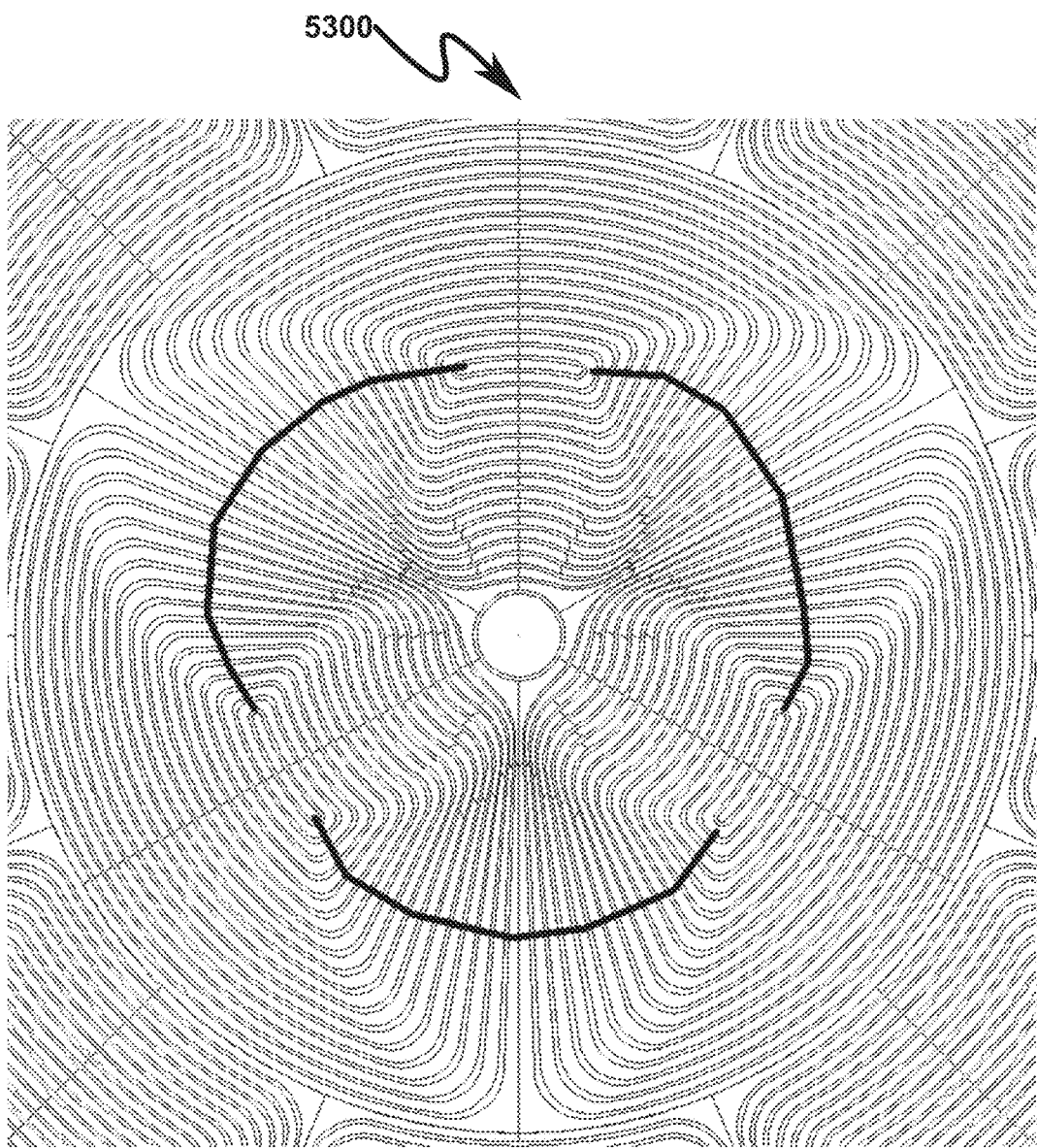
FIG. 53 illustrates a preferred exemplary two-segment circular SSDD detector structure illustrating center segment detail.
Figure 54:
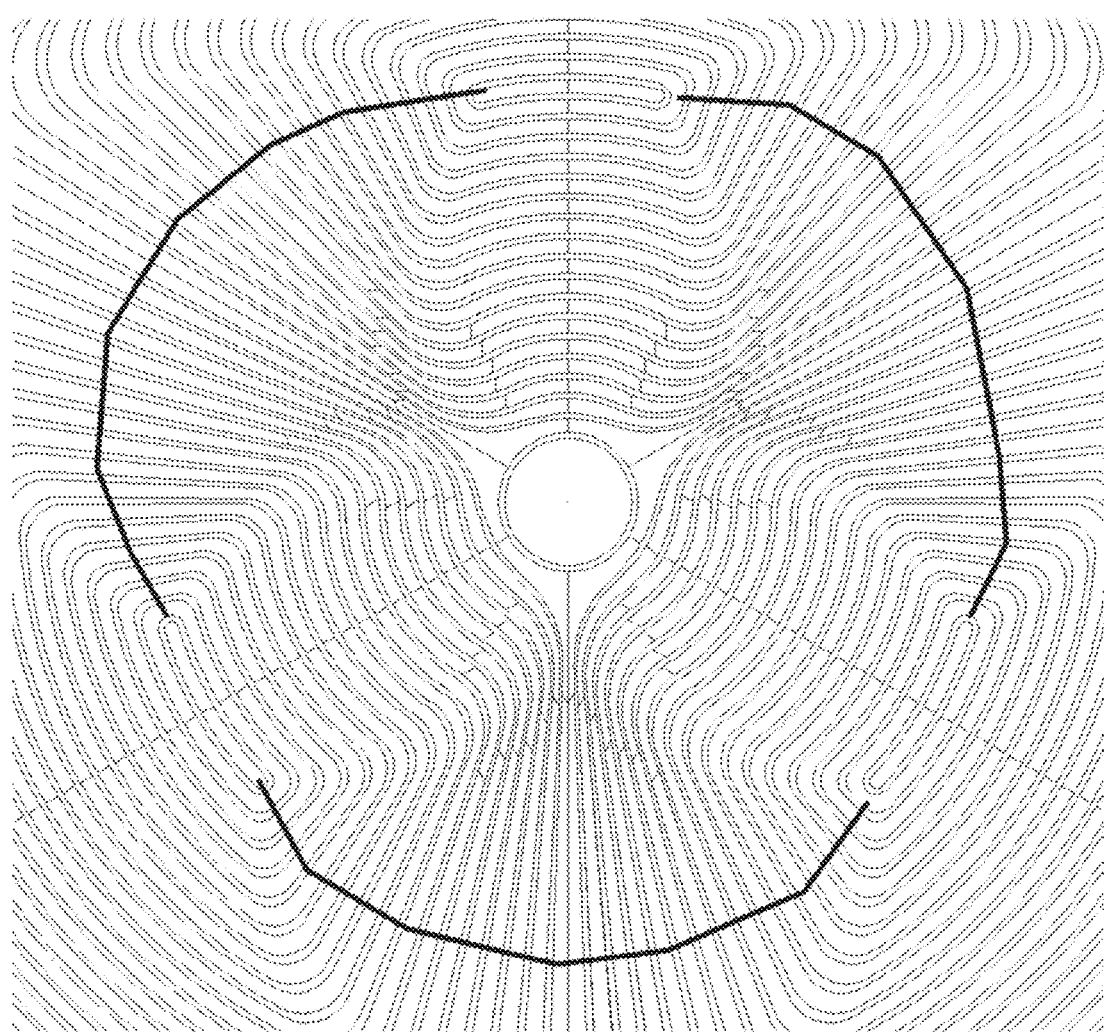
FIG. 54 illustrates a preferred exemplary two-segment circular SSDD detector structure illustrating center segment high resolution detail.
Figure 55:
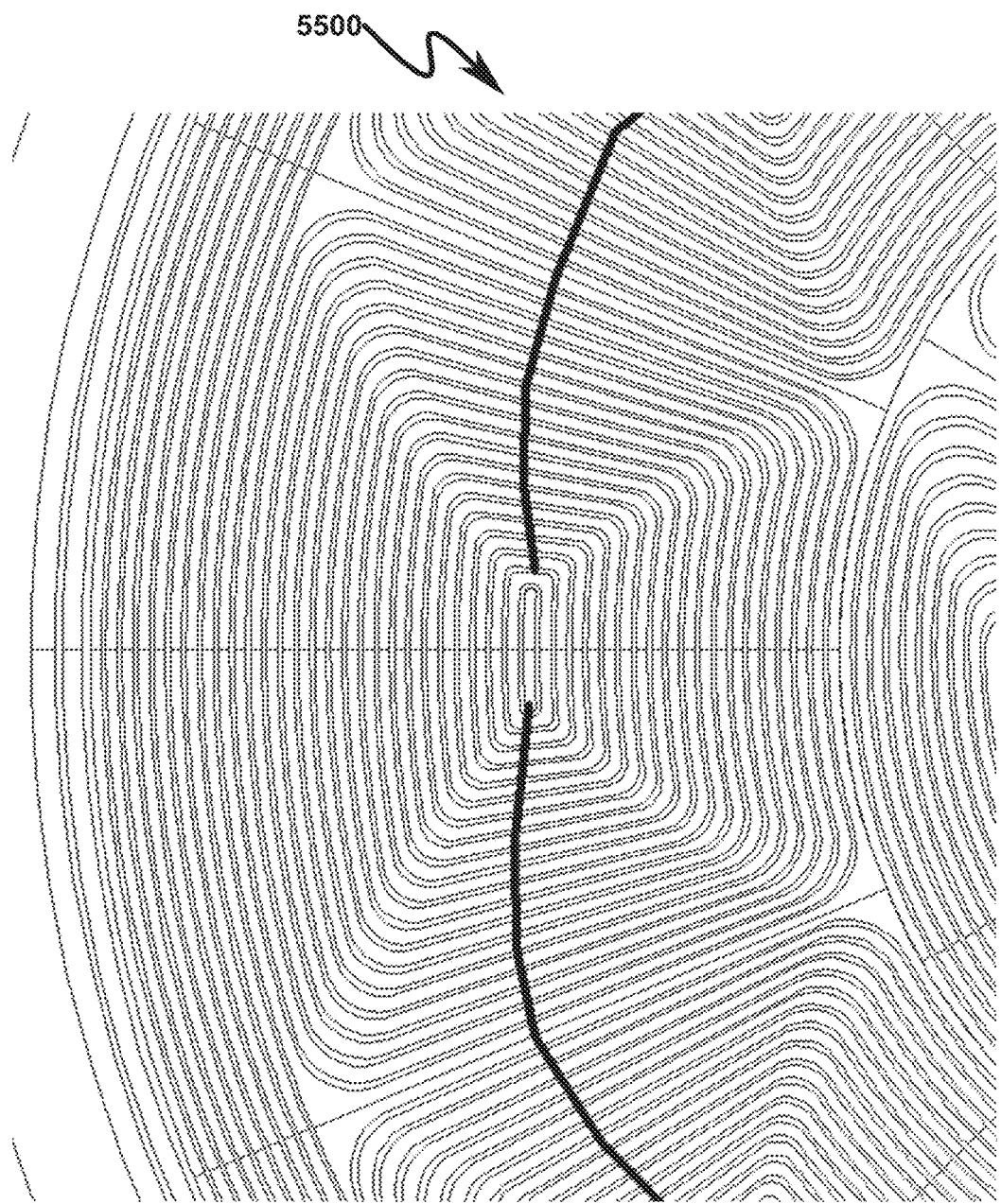
FIG. 55 illustrates a preferred exemplary two-segment circular SSDD detector structure illustrating left segment high resolution detail.

FIG. 51 (5100)-FIG. 56 (5600) depict sections of the circular SSDD in further detail and illustrate the sub-segment contours and placement of bonding wires. Some preferred embodiments may utilize metalized lithographic techniques to provide for interconnection of the anodes in the SSDD.

Exemplary Rectangular SSDD Construction (5700)-(6400)

Figure 57:
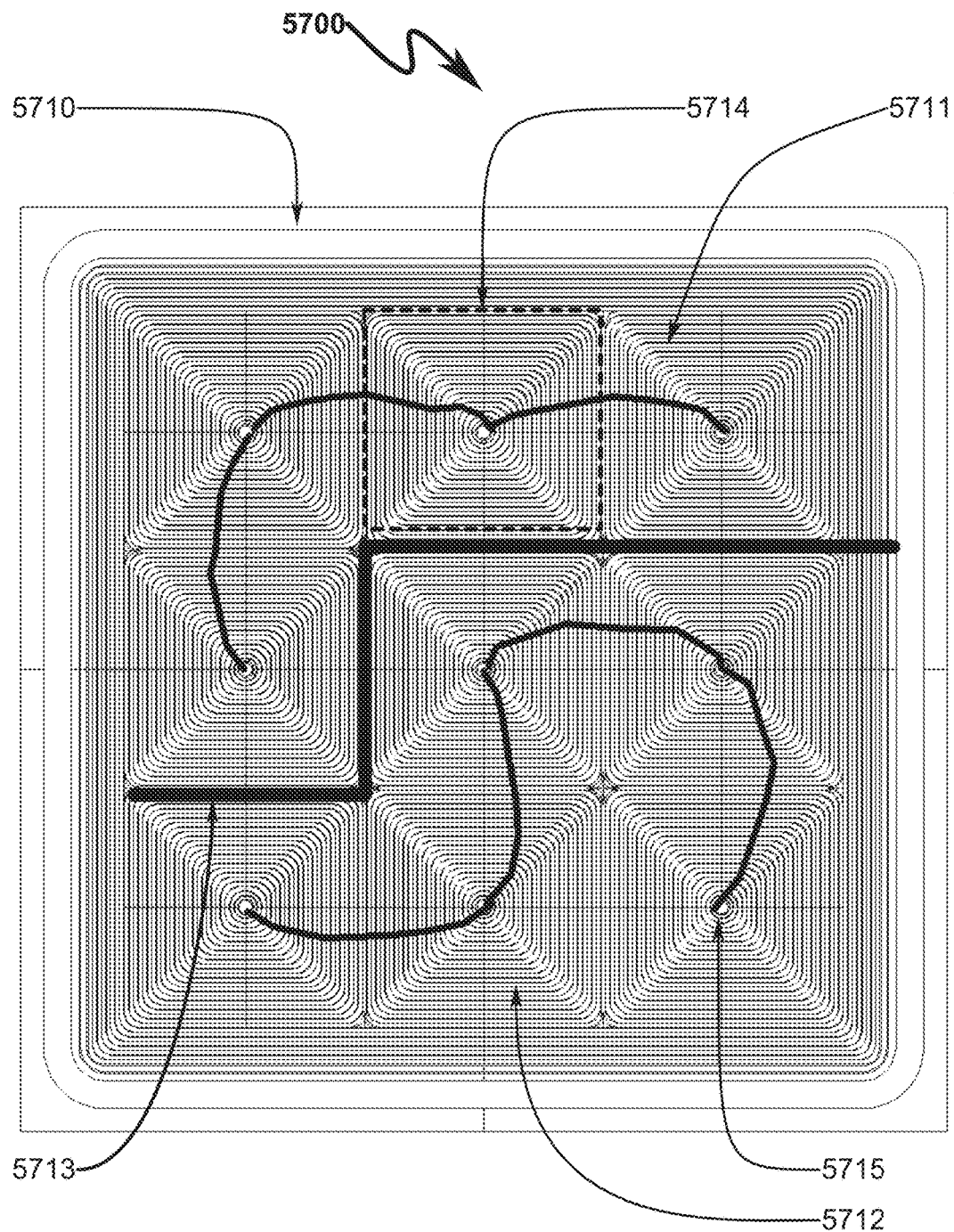
FIG. 57 illustrates an outline of a preferred exemplary two-segment rectangular SSDD detector structure.
Figure 58:
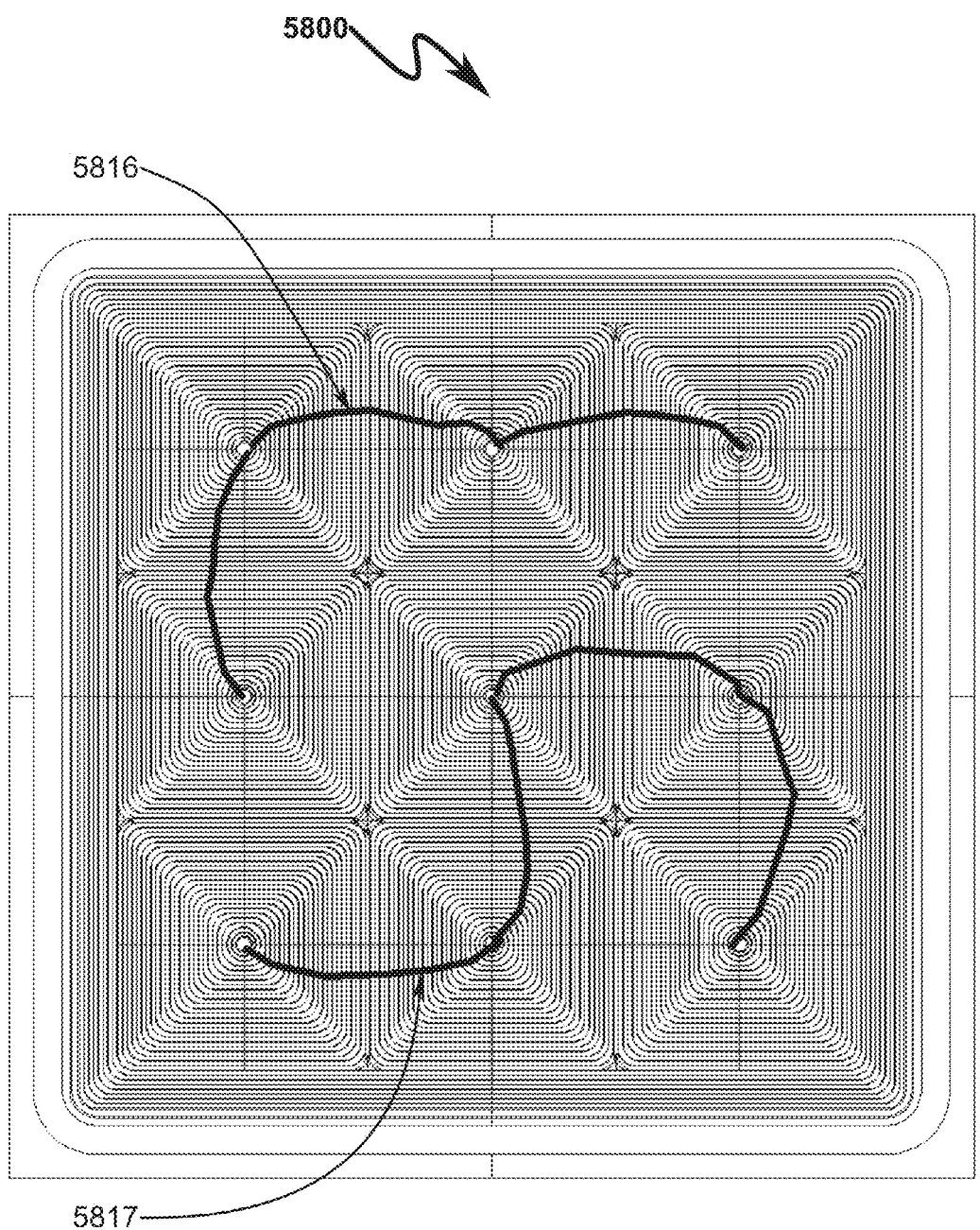
FIG. 58 illustrates a preferred exemplary two-segment rectangular SSDD detector structure illustrating anode bonding wire connections.
Figure 64:
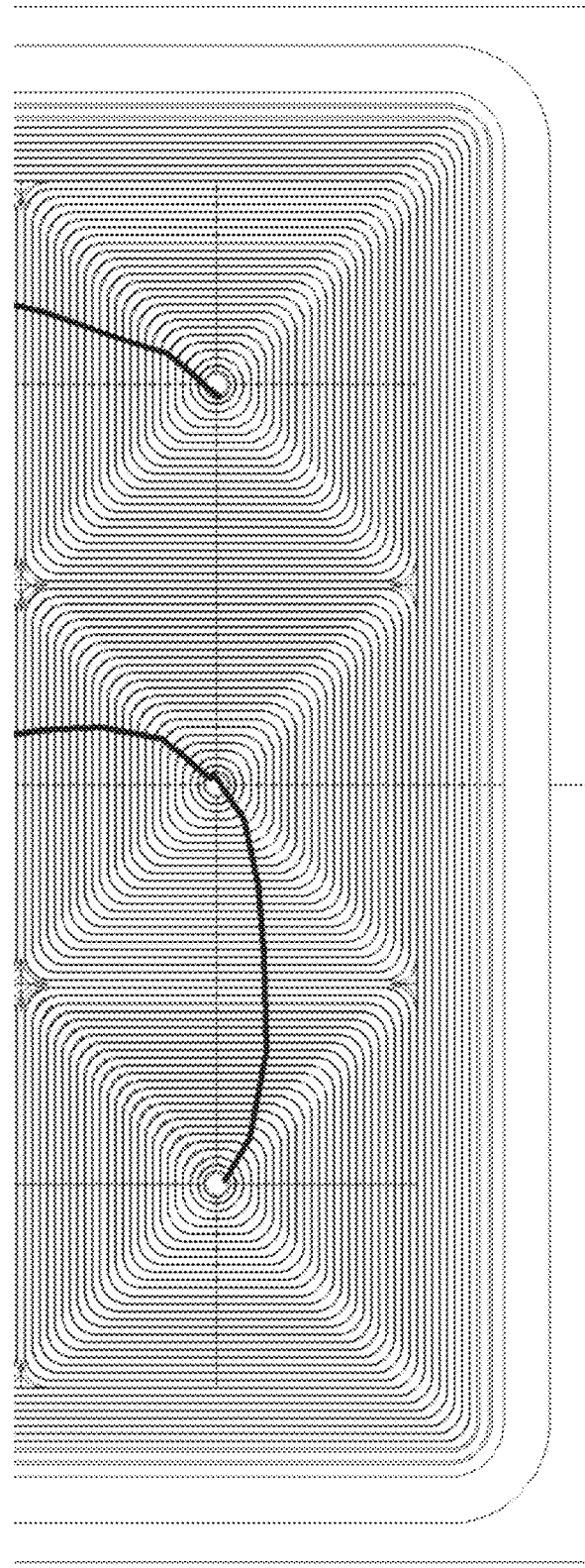
FIG. 64 illustrates a preferred exemplary two-segment rectangular SSDD detector structure illustrating a high resolution view of bottom segment bonding wire placement.

An exemplary rectangular SSDD detector structure is depicted in FIG. 57 (5700)-FIG. 64 (6400). As depicted in the outline of FIG. 57 (5700), the rectangular SSDD (5710) detector includes a first segment (5711) and a second segment (5712). The boundary (5713) between the first segment (5711) and second segment (5712) is also depicted. An elementary sub-segment contour (5714) is depicted along with a typical anode connection (5715). As depicted in FIG. 58 (5800), additional SSDD detail is provided illustrating the anode interconnections (5816, 5817) comprising bonding wires that interconnect the SSDD anodes within the first segment (5711) and a second segment (5712).

Figure 59:
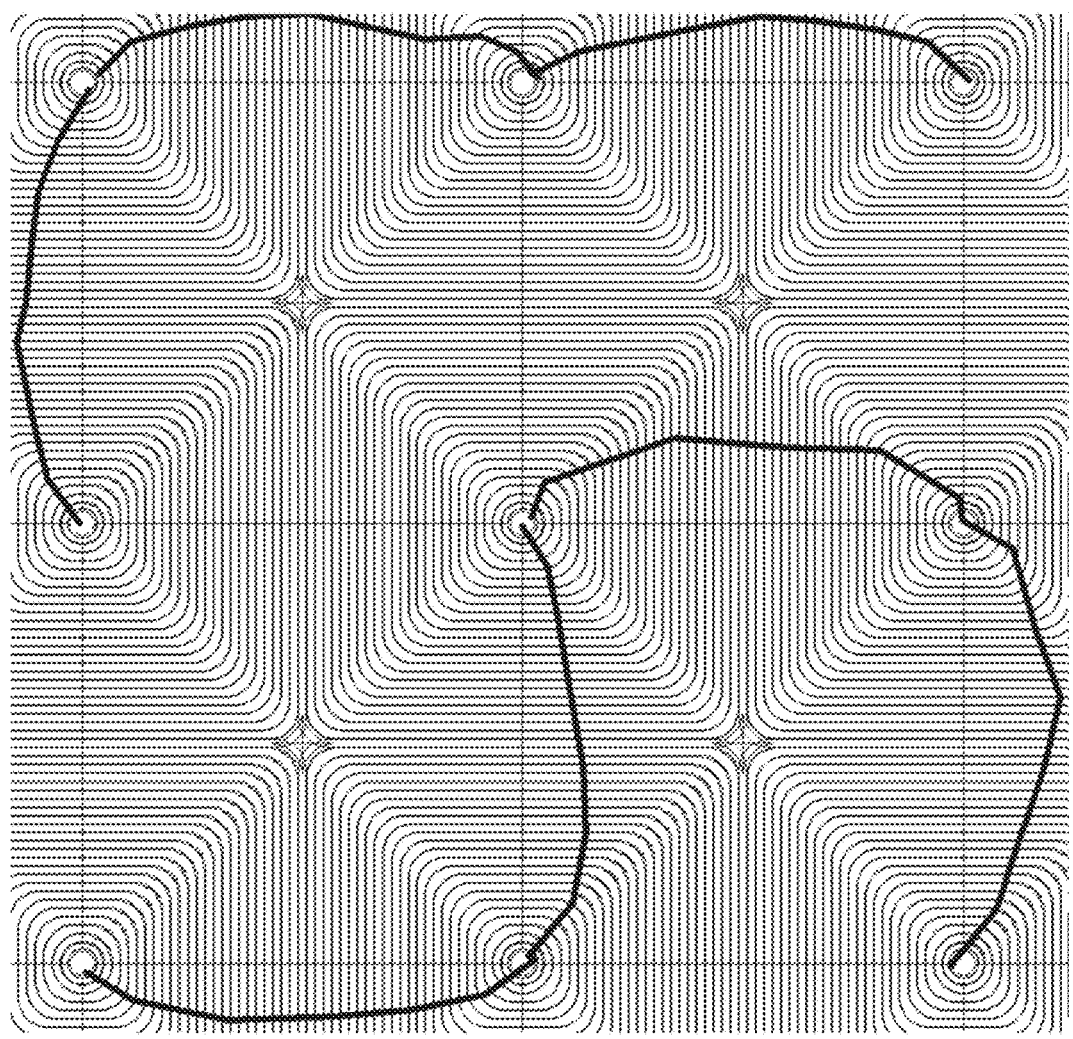
FIG. 59 illustrates segment detail of a preferred exemplary two-segment rectangular SSDD detector structure illustrating center segment detail.
Figure 60:
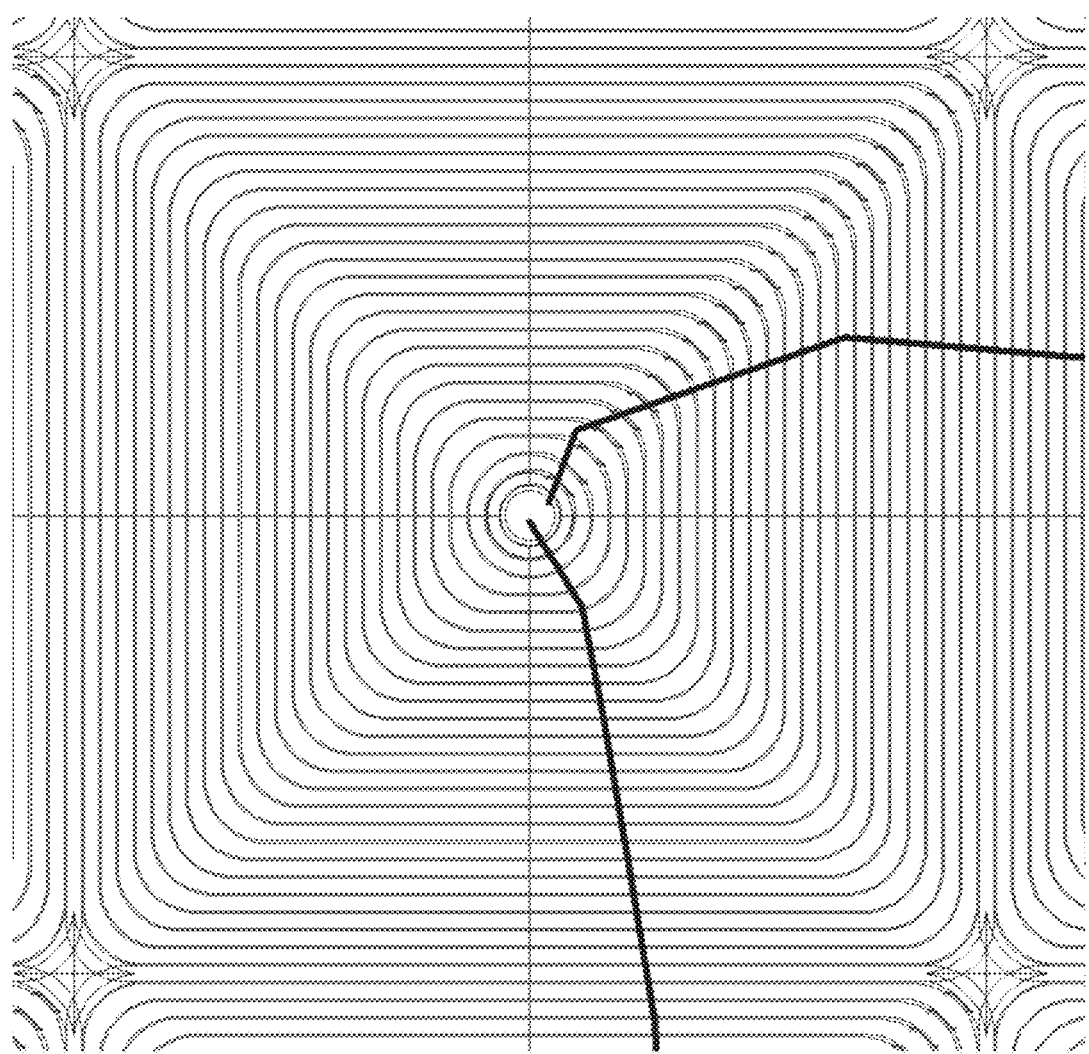
FIG. 60 illustrates a preferred exemplary two-segment rectangular SSDD detector structure illustrating center segment high resolution detail.
Figure 61:
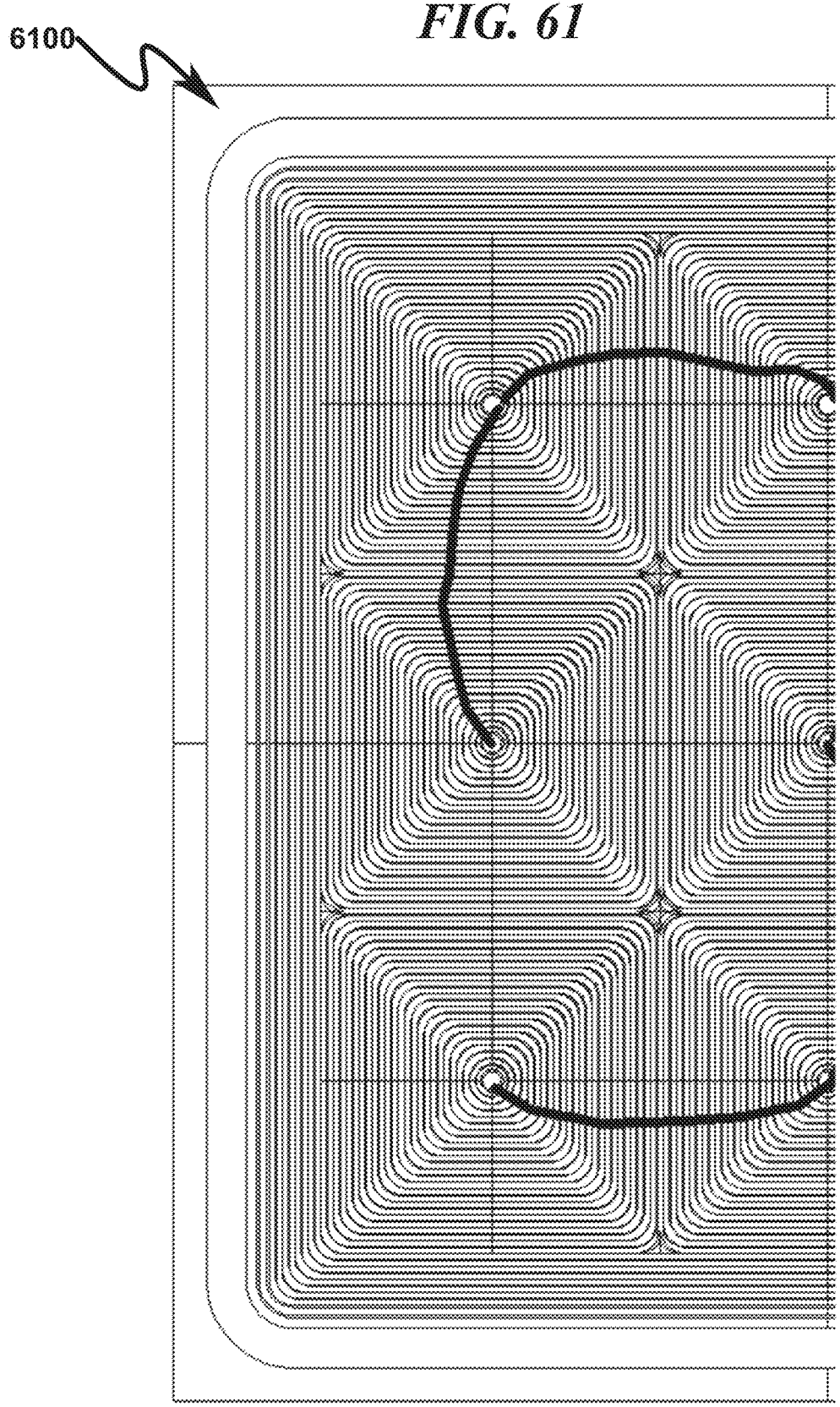
FIG. 61 illustrates a preferred exemplary two-segment rectangular SSDD detector structure illustrating left segment detail.
Figure 62:
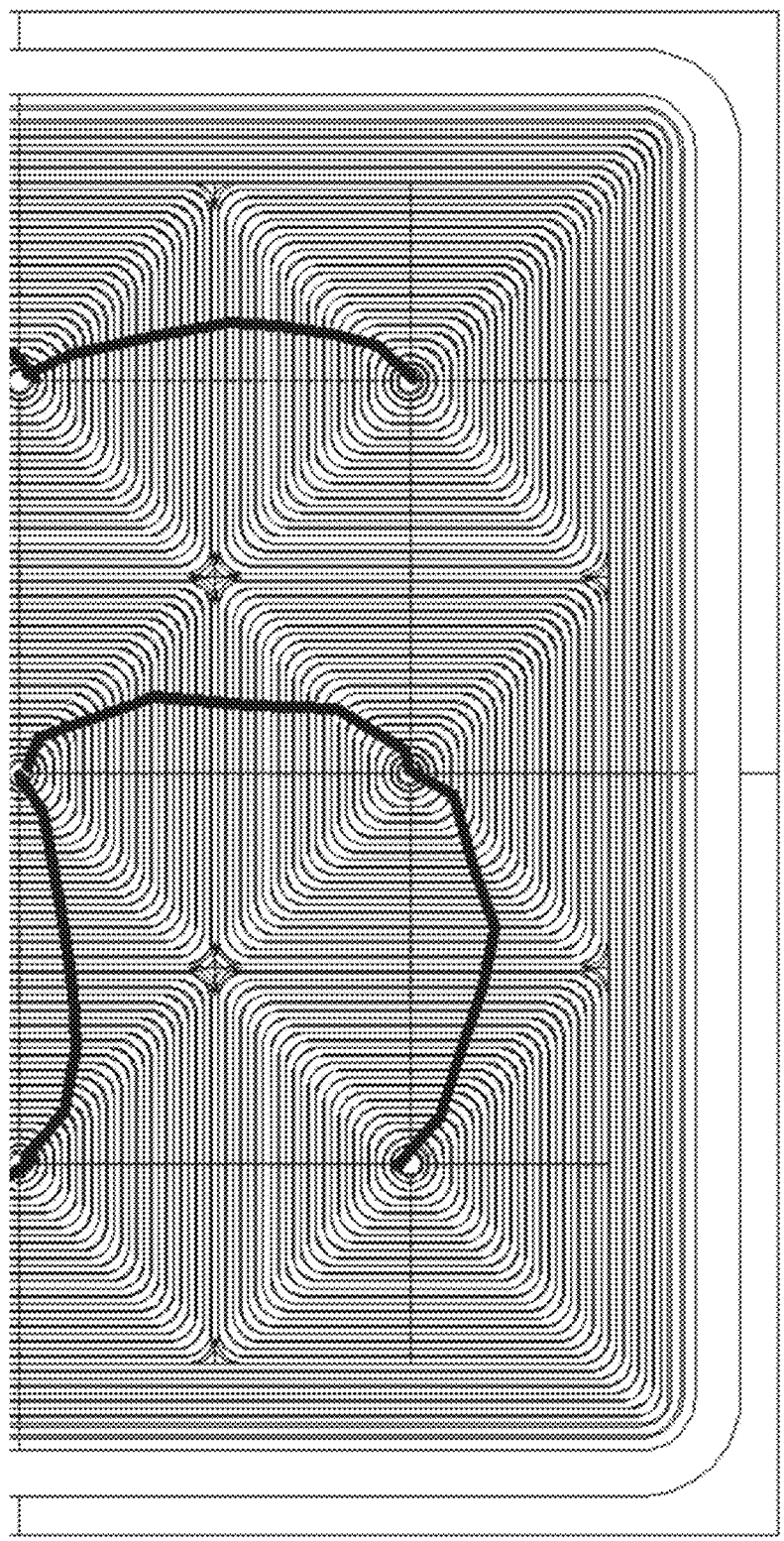
FIG. 62 illustrates a preferred exemplary two-segment rectangular SSDD detector structure illustrating right segment detail.
Figure 63:
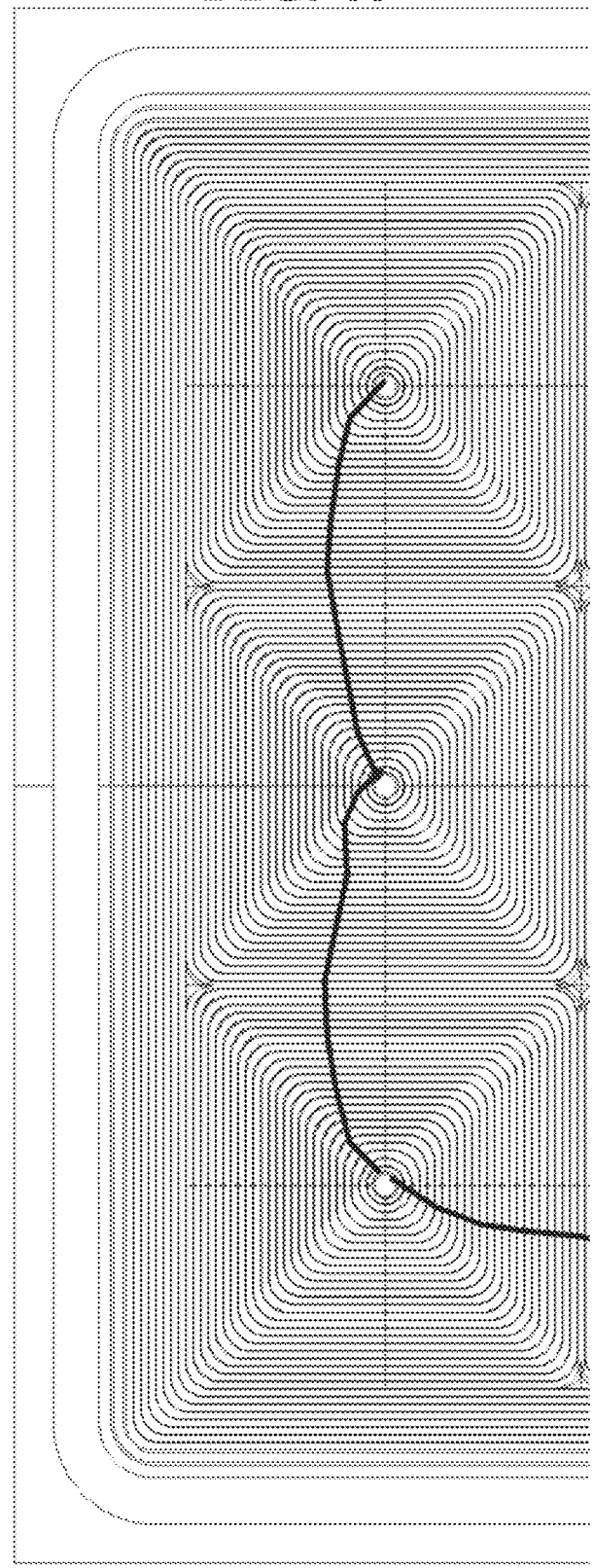
FIG. 63 illustrates a preferred exemplary two-segment rectangular SSDD detector structure illustrating a high resolution view of top segment bonding wire placement.

FIG. 59 (5900)-FIG. 64 (6400) depict sections of the rectangular SSDD in further detail and illustrate the sub-segment contours and placement of bonding wires. Some preferred embodiments may utilize metalized lithographic techniques to provide for interconnection of the anodes in the SSDD.

Prior Art Comparison

The present invention merges the functionality of SSDD and RSD devices to form a hybrid radiation detector capable of multi-radiation detection and dosimetry. The system as described may incorporate SSDD+RSD detectors with charge sensitive amplifiers (CSAs) followed by time-stamped MCAs on both sides of the detector. The present invention covers the use of SSDDs where charge sensitive amplifiers followed by MCAs in the time stamping mode are connected on at least two segments on the anode side and on the main irradiation side of the detector.

Anode Side CSA Response

The use of two anode side segments silicon drift detectors assembled with the anode side directed toward the surface to be inspected allows the measurement of directly absorbed radiation in the semiconductor (betas, conversion electrons, Lx lines and alphas) on one segment and the scintillated radiation (coming from gamma rays) on both segments of the silicon drift detector. This allows a radiation-type differentiation.

Time stamping differentiation allows radiation discrimination. Using the time-stamped differentiation with two segments differentiates the present invention from a one segment SSDD where scintillated and directly absorbed signals are differentiated by pulse shape analysis.

Each of these segments can be made of sub-segments where anodes are interlinked with bonding wire or lithography techniques and allows a noise minimization and an optimization of the price of FET transistors and charge sensitive amplifiers while keeping good drift lengths.

CSA Response Comparison on Anode/Irradiation Side

If an amplifier is connected to the junction on the irradiation side, the measurement of the energy imbalance witnessed on the main irradiation junction and on the anode ohmic contact can allow discrimination of radiations that have deposited energy on one side or on both sides of the potential minimal silicon drift detectors. Medium, high energy beta emitters by Sr-90 and Y-90, and cosmic radiations are typical radiations that can deposit their energy all along the silicon drift detector. The possibility to suppress these events, allows lowering of the background radiation levels, enabling a better separation between the tails of alpha radiations and beta backgrounds. The suppression of these medium energy and high energy betas in conjunction with the use of a small filter will allow filtering away of low energy betas and enable the measurement of Lx lines (13-17 keV) and some gamma lines (59.35 keV) of actinides with lower MDAs.

Segmented Detectors in Coincidence Applications

Alphas are emitted in coincidence with CEs or with gammas and Lx. The detection of simultaneous alphas and CEs allows identification of actinides without the influent of cosmics or background of betas. The detection of simultaneous alphas and Lx allows similar purposes.

The present invention is differentiated from the prior art in that alpha, Lx differentiation is by the use of a segmented detector. The prior art places the medium of analysis between an alpha and an Lx detector. The present invention approach allows the inspection of surfaces in an In Situ mode. Two pixels (as existing in one embodiment of the present invention) could allow use of this mode.

The optimal distance between source and detector will be higher than for a simple detector without coincidence. If the actinide is against a pixel, both conversion electrons and alphas will be detected in the same segment.

Form Factor

Embodiments of the present invention comprising a SSDD detector may be either circular or rectangular:
  With at least two segments on the anode side connected to at least two electronic channels (made of charge sensitive amplifier and MCAs in the time stamping mode) allowing the acquisition of the energy and timing (made of a charge sensitive amplifier and an MCA allowing energy and timing);

Where a third electronic channel is connected to the irradiation side junction and connected to charge sensitive amplifier and MCAs in the time stamping mode;

With each segment of the anode side made of sub-segments possessing their own anodes. These anodes are inter-bonded anodes by wirebonding or connected by lithographical interconnection techniques;

Neighboring segments may also be bonded to each other;

A two channel system may be devised where each channel is linked to a series of alternated pixels by wire bonding linking the anodes or equivalent lithographic interlinking techniques. The alternating of segments may help to increase the probability that an alpha falls on a series of segments linked to the first channel while the CE will fall on a series of segments linked to the second channel;

The SSDD is connected to a scintillator on the "counter irradiation side." The detector is set in a vacuum enclosure that can be positioned on a surface to be inspected. The base of the chamber is covered with a foam pad material than can adhere on surfaces of any ruggedness. Vacuum is applied if alpha, low energy beta, or conversion electron spectroscopy is required.

Anode Side Segmentation

The segmentation of at least two segments on the anode side is performed for two reasons:

to keep the lateral drift length of carriers traveling to the anodes minimal; and to allow the processing of information given by the partial energies of the segments and their timing.

Timing Interpretation

Timing interpretation and processing of partial energies can include timing processing steps such as:

addition of the energies of two or more segments coincident within a time window;

rejection of the partial energies of two or more segments coincident within a time window;

analysis of imbalance and ratios of partial energies between two segments collected within a time window;

registering of coincident events in independent spectra; and assessment of differences in the collection time on each segment.

Two Segment Timing Analysis—Scintillated/Non-Scintillated Radiation

If a gamma ray is absorbed within the scintillator, visual scintillated light will reach both segments of the SSDD simultaneously. The proportion of deposited energy will be proportional to the segments area.

If an X-ray, Ce, or alpha radiation is absorbed within the semiconducting material of the SSDD, its energy will be deposited in a small volume of the semiconducting material (not broader than 10-20 µm). The radiation generated current will only thus be detected in one segment.

The present invention equally addresses the differentiation of scintillated and direct absorption of X-rays and gamma rays with a SSDD coupled to a scintillator wherein the anode side is directed toward the area to be inspected. In this application, a one segment only SDD is used: the current pulses generated by direct absorption have a small time base, while the current pulses generated by scintillated light are much longer since visual photons reach the SSDD in all points: from center to edge. In such a case, the pulse duration is at least as large as the drift time of electrons generated at the farthest distance to the anode.

The time coincidence analysis of the collected energies of 2 segments both allow the use of digital filtering or analog filtering and can therefore be compatible with more low power solutions.

Alpha and Lx in Coincidence or Alphas and CEs in Coincidence

The analysis of the energy balance of the anode side segments can help to identify radionuclides that emit alpha and CEs or alphas and Lx lines in coincidence.

The presence of CEs and alphas can help to discriminate radionuclides where alpha energies are too close to each other to be discerned by traditional alpha spectroscopy.

This analysis technique can also enable the possibility to suppress cosmic and beta backgrounds since that will only deposit energy in one segment.

An alpha will be detected by a first segment, while a conversion electron emitted in coincidence may be detected by the other segment. If the energy couple (E1, E2) can be identified as typical of a known (CE, alpha) radioactive decay (for instance 34 keV, 5.4 MeV is typical of the 241-Am decay), then the detection of this element will have been performed with a high probability and this element will be devoid of any beta, alpha tailing or cosmic background. The energy ratio 34 keV/5485 keV is also much smaller than the energy ratio that can be measured when the inner and outer segment will be hit by scintillated light where the ratios will be proportional to the area ratios, typically 1/3 or 1/4.

An alpha will be detected by a first segment, while a Lx emitted in coincidence may be detected by the other segment. If the energy couple (E1, E2) can be identified as typical of a known (Lx, alpha) radioactive decay (for instance 13.9 keV of 241-Am, and 34 keV CE is typical of the 241-Am decay), then the detection of this element will have been performed with a high probability and this element will be devoid of any beta, alpha tailing, cosmic background or gamma background.

A two channel system can be devised where each channel is linked to a series of alternated pixels (such as shown in FIG. 57 (5700)-FIG. 64 (6400)) by bonding wire linking the anodes or lithographic interlinking techniques. The alternating of segments may help to increase the probability that an alpha falls on a series of segments linked to the first channel while the CE will fall on a series of segments linked to the second channel.

Anode/Counter-Anode Analysis—Cosmic and Beta Suppression

These two electronic channels are combined with a third channel (also made of a charge sensitive amplifier (CSA) and MCAs in the time stamping mode) on the irradiation side. The conjugated use of the third segment measured in conjunction with the first two segments can be used for cosmic and high energy beta suppression. This is enabled by the time processing of the partial energy collected on the irradiation side together with the time processing on the anode side.

The analysis of the energy imbalance witnessed on the anode and on the irradiation side will enable the discrimination of particles such as betas and cosmic radiation that deposit energy on both sides of the potential minimal and particles such as alphas and Lx lines that only deposit energy on one side of the potential minimal of SSDDs.

Betas and cosmics will lead to an energy imbalance on the front and back side. Most of the alphas and Lx will deposit energy on one side of the potential minimum and will not lead to an energy imbalance.

One use of time processing is the discrimination of single segment and double segment hits that can help to discriminate scintillated from directly absorbed signals and inter-bonded anodes having lower capacitances than linear anodes previously described in a former patent of the present inventors.

In the case of Lx spectroscopy, the detector is equipped with an extra low energy beta filter for filtering away low energy betas that are only depositing under the potential minima (electron, highway) in order to be able to suppress all beta backgrounds.

Preferred Embodiments

Several preferred invention embodiments are constructed with the anode side of the detector directed toward the surface to be inspected. The scintillator is glued on a large junction that is opposite to the anode often referred to as P+ junction or irradiation junction for X-ray SDDs.

Additional preferred embodiments are constructed with the large P+ junction irradiation side of the detector directed toward the surface to be inspected. The scintillator is glued on the anode side in this configuration. Anode and steering connections can either be:
  fanned out by the use of lithographical interconnects; or
  connected by wire bonding (in such a case, a thick enough transparent epoxy will be poured on the wire bonds, followed by the placement of the scintillator. The height of the bonding wires will be minimized (smaller than 1 mm) in order to minimize the thickness of the transparent epoxy).

The geometric configurations of the SSDD, the connection of electrodes to electronics described in this disclosure and the possible conjunction of an SSDD with other sensors CAM detector and/or a scintillator allows the use of the SSDD technology to probe alpha, beta, conversion electrons and gammas with a very limited number of semiconductor detectors.

With respect to single detectors, very broad investigations can be performed with one SSDD where two anode segments and one main P+ irradiation junction are connected to three charge sensitive amplifiers connected to time stamping electronics. The possibility is given to differentiate directly absorbed radiation from scintillated radiation and to differentiate radiation that deposits energy on one or both sides of the potential minimum of a silicon drift detector allowing In Situ analysis of surfaces to be commissioned or other surfaces of interest.

For multi-segment detectors (a detector with two or more segments), one segment may be configured to detect alpha and the other segment detecting CEs or Lx. Setting substrates to be investigated in sandwich between and alpha and an Lx detector has been done by ORTEC. However, this approach does not allow the direct inspection of surfaces. Having a two segment detector as taught by the present invention allows this approach.

Time-Stamped Differentiation (6500)

The Use of Time Stamping in Spectroscopy

Figure 65:
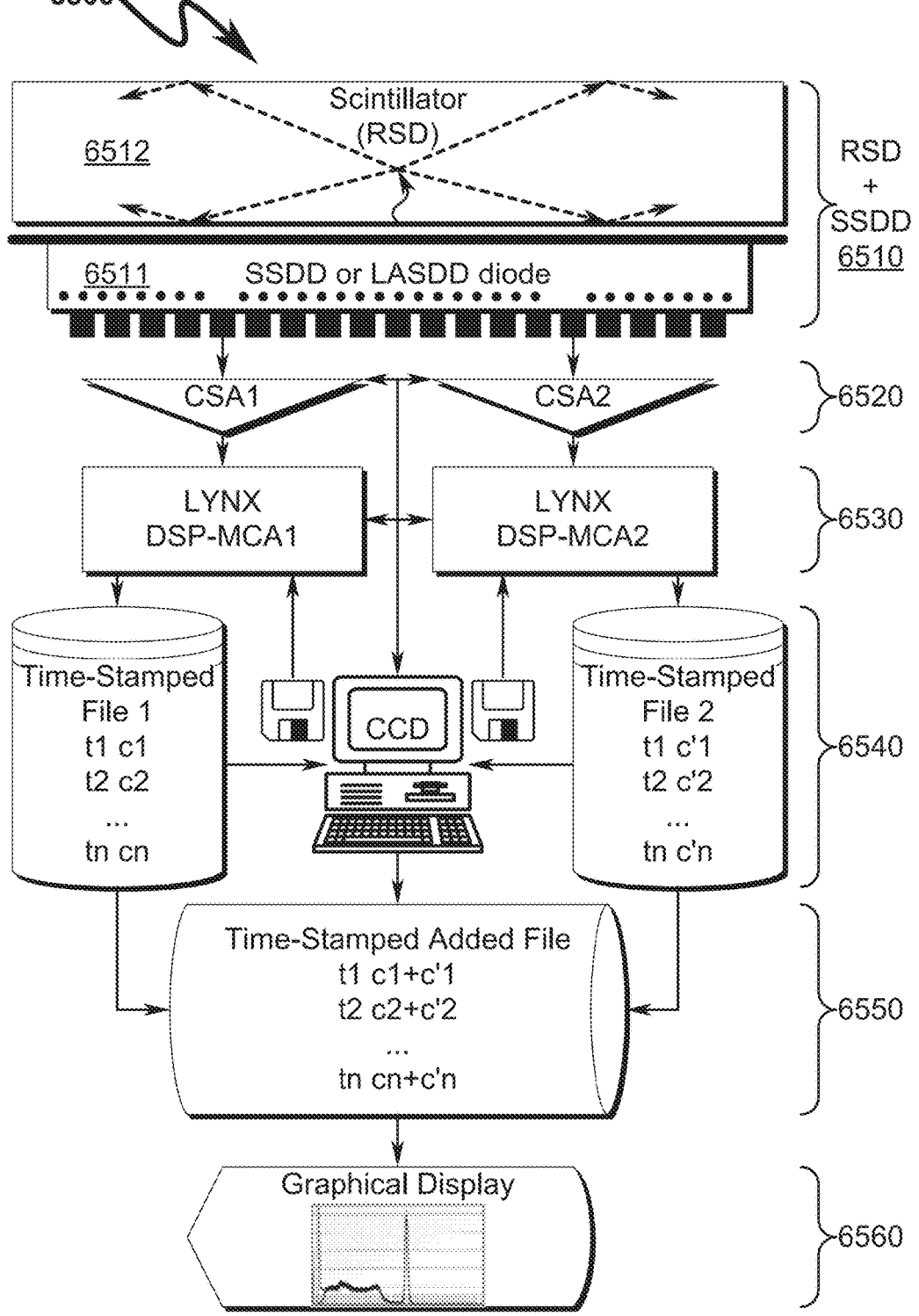
FIG. 65 illustrates an exemplary invention system embodiment employing time-stamped differentiation of radiation count data.

As generally depicted in FIG. 65 (6500), the following discussion will explain the time stamping function for a case where radiations are detected in a RSD+SSDD segmented detector (6510) with at least two segments. In this example the collecting anodes of the RSD+SSDD detector (6510) are located on the lower side of the segmented silicon drift detector (SSDD) (6511). The detector is connected to a RSD scintillator (6512) and glued to the upper side of this double segmented detector.

As generally depicted in FIG. 65 (6500), high energy radiations generate scintillated visual photons in an isotropic manner so that visual light reaches both segments of the RSD detector (6511) simultaneously. Radiations can directly reach the detector or be reflected a few times on the white reflecting walls of the scintillator (6512). In practice, all scattered radiation will reach the two SSDD detector segments in a time frame at inferior to 0.5 ns (5 times the height of the scintillator divided by the speed of light).

On the example below, the detector (6511) is also connected to a scintillator.

Example of Addition of Partial Energies of Two Segments Detected in Coincidence by Time-Stamped Addition We hereby give an example of time-stamped addition of energies collected in coincidence in the left and right segment of an SSDD coupled to a scintillator.

The addition of partial energies collected by individual anodes of the segmented SDDs (SSDD) is used for totalizing the energy collected by all the pixels of the SSDD.

We will hereby describe a time-stamped addition after digitization of the detected energy and the recording of the time stamp associated with the detected event. This can be both done on DSP systems or on MCA systems that are implemented after an analog-shaping stage.

An example of time-stamped addition realized with two Digital Signal Processing Multichannel Analysers (DSP-MCAs) (6530) is depicted in FIG. 65 (6500).

Referencing FIG. 65 (6500), each DSP-MCA (6530) is connected to a charge sensitive amplifier (CSA) (6520) connected to a SSDD (6511) segment. All DSP-MCAS (6530) are connected by cables ensuring that their time registration by their local clocks is synchronized within the nanosecond.

Every time that an event with energy characterized by a centroid position $c_i$ is detected, the time stamp $t_i$ or time at which the event has been detected in one DSP-MCA (6530) is appended to an output file (6540) (for post spectral analysis) or streamed to an application.

The measurement time will range between 1 minute and 8 hours. In the case of a time-stamped analysis on two segments that occurs after the spectral acquisition, a coincidence analysis is performed on the two files containing a list of time tags and energy values related to these time tags (6550). Results of this analysis may be displayed on a graphical output display (6560).

For analyzing coincidence in an easier way, the time-stamped files will typically be divided in smaller files that contain the energy and time stamp recordings for small time periods (typically 1 second) wherein:
  N is the maximum number of events in the first segment;
  M is the maximum;
  T(I) is a dimensioned variable where the time tag of events recorded by the first segment (recorded in ns) is stored;
  C(I) is a dimensioned variable where the energy centroid value of events recorded by the first segment is stored;
  T'(I) is a dimensioned variable where the time tag of events recorded by the second segment (recorded in ns) is stored;
  C'(I) is a dimensioned variable where the energy centroid value of events recorded by the second segment is stored;
  DELTA_T: is the maximum range of the time margin allowed for two events to be considered as coincident;

C_ADDED(I) is a dimensioned variable where the energy centroid value of the sum of events recorded by the first segment and second segments that are in coincidence is stored.

The algorithm for this analysis is described below:

```
K=0
For i = 1 to N
    For j = 1 to M
        IF (T' (J)-T(I)) < DELTA_T then
            K=K+1
            C_ADDED(K)=C(i)+C' (j)
        END IF
    Next j
Next i
```

Example of a Binning a Low Energy Spectrum of Conversion Electrons and a High Energy Spectrum of Alphas that are Emitted and Detected in Coincidence Actinides such as 241-Am, 239-Pu, 238-Pu can emit high energetic alpha radiations and low energy conversion electrons or Lx lines in coincidence. Recording a "low energy spectrum" and a "high energy spectrum" of events that are detected in coincidence, each on one segment of a two segment SSDD can be performed with time-stamping analysis:

The low energy events can come from either segments of an SSDD;

The high energy events can come from either segment of the SSDD.

Recording the conversion electron spectrums of actinide decays that produce conversion electrons in coincidence with alphas can be a good way to discriminate low energy conversion electrons from low energy betas coming from beta emitters. For this the energy limit has to be set between the low energy part of the spectrum and the high energy part of the spectrum. Typically, this will set this limit at 1 MeV, or 1e6 eV:

E_limit_high_low=$10^6$.

N is the maximum number of events in the first segment.

M is the maximum.

T(I) is a dimensioned variable where the time tag of events recorded by the first segment (recorded in ns) is stored.

C(I) is a dimensioned variable where the energy centroid value of events recorded by the first segment is stored.

T'(I) is a dimensioned variable where the time tag of events recorded by the second segment (recorded in ns) is stored.

C'(I) is a dimensioned variable where the energy centroid value of events recorded by the second segment is stored.

DELTA_T: is the maximum range of the time margin allowed for two events to be considered as coincident.

C_low_energy_in_coincidence (I) is a dimensioned variable where the energy centroid value of the low energy events (such as conversion electrons) is recorded, provided that the second segment has recorded a high energy event in coincidence with the first segment.

C_high_energy_in_coincidence (I) is a dimensioned variable where the energy centroid value of the high energy events (such as alphas) is recorded, provided that the second segment has recorded a low energy event in coincidence with the first segment.

The time stamping algorithm is described below:

```
For I = 1 to N
    For j = 1 to M
        IF (T' (J)-T(I)) < DELTA_T THEN
            IF c(I)<E_limit_high_low AND C' (I) >E_limit_high_low
                THEN
                K=K+1
                C_low_energy_ in_coincidence (K)=C(I)
                C_high_energy_in_coincidence (K)=C' (J)
            END IF
            IF c(I)>E_limit_high_low AND C' (I) <E_limit_high_low
                THEN
                K=K+1
                C_low_energy_in_coincidence (K)=C' (I)
                C_high_energy_in_coincidence (K)=C(J)
            END IF
        END IF
    Next J
Next I
```

These algorithms here described can be programmed within embedded FPGA custom hardware or implemented in software on a microcontroller.

Suppressing Low Energy Background Radiation (6600)-(7200)

Overview

The present invention may incorporate a method of suppressing background radiation in the low energy part of the spectrum in order to be able to better determine the integral of conversion electrons at low energies. The background radiation is proportional to the integral of the alphas. By finding the appropriate function describing this background radiation it is possible to subtract the "spill-over" tail arising from the alphas and have a better estimation of the conversion electron integrals. To accomplish this, the integral of alpha peaks is first determined, then a coefficient to the spill-over function is introduced and the spill-over function is subtracted from the low energy spectrum to yield the conversion electron integrals. Having the integrals of conversion electrons and of alphas, it is possible to better differentiate nuclides such as 214-Am and 238-Pu which have two neighboring alpha lines that are distinguishable from the conversion electron lines.

Background Subtraction Methodology

When doing a spectral acquisition for analyzing conversion electron emission lines and alpha emission lines in vacuum, a low energy "spill-over" tail appears in the conversion electron energy range (10-90 keV). This "spill-over" tail is thought to come from incomplete collection of recoiled atoms after an alpha emission.

The possible origin of this "spill-over" tail and collection can be attributed to recoiled atoms (the atom that is emitted in the counter direction of the alpha emission) and TRIM simulations have indicated that a significant part of this collection partially occurs in the non-depleted boron junction. Signals arising from this region can recombine and are slow. They can lead to such a "spill-over" tail.

The deposition of energy of recoiled atoms in the non-depleted layer is a function of the vacuum of the chamber and of the partial pressure of the atmosphere.

For 2 mbars, having a detector source distance >6 cm may significantly reduce tailing due to the energy deposition of recoiled atoms in the boron junction. However, at such distances, the counting times may be prohibitively long.

For 20 mbars, having a detector source distance >1 cm may significantly reduce tailing due to the energy deposition of recoiled atoms in the boron junction. However, at such vacuums, the alpha resolution may not be optimal.

It is therefore important to get a good knowledge of this tailing function for several detector-source distances. In experimental measurements, vacuums of 2 mbars and source-to-detector distances of 15 mm were used. The background function was then accurately computed.

The lack of knowledge of the analytical function describing this background makes the computation of the areas of the conversion electrons inaccurate.

The present invention may optionally incorporate a more accurate description of this background function as follows:

$$BackgroundCounts(\text{Energy}) = \frac{\int AlphaPeak}{110000} e^{-a \cdot Energy(keV)} e^{b} \quad (1)$$

The present invention may subtract the background function from the acquired spectrum in order to determine the integrals of conversion electron lines with more accuracy. The background counts distribution is given as a function of the energy and as a function of the integral of the alpha peaks. This background exponentially decreases as a function of the energy. Its general description is given as:

$$BackgroundCounts(\text{Energy}) = \frac{\int AlphaPeak}{110000} e^{-a \cdot Energy(keV)} e^{b} \quad (2)$$

By experimental analysis, it was determined that optimal fitted parameters a and b may be determined as follows:

$$BackgroundCounts(\text{Energy}) = \frac{\int AlphaPeak}{110000} e^{-0.089 \cdot Energy(keV)} e^{10.7} \quad (3)$$

In an experimental spectral acquisition, the integral of alphas was 110000. So, in this particular case, $$BackgroundCounts(\text{Energy}) = e^{-0.089 \cdot Energy(keV)} e^{10.7} \quad (4)$$

This fit has been carried out with a measurement covering the full energy range: between 10 keV and 5000 keV.

Method Steps (6600)

Figure 66:
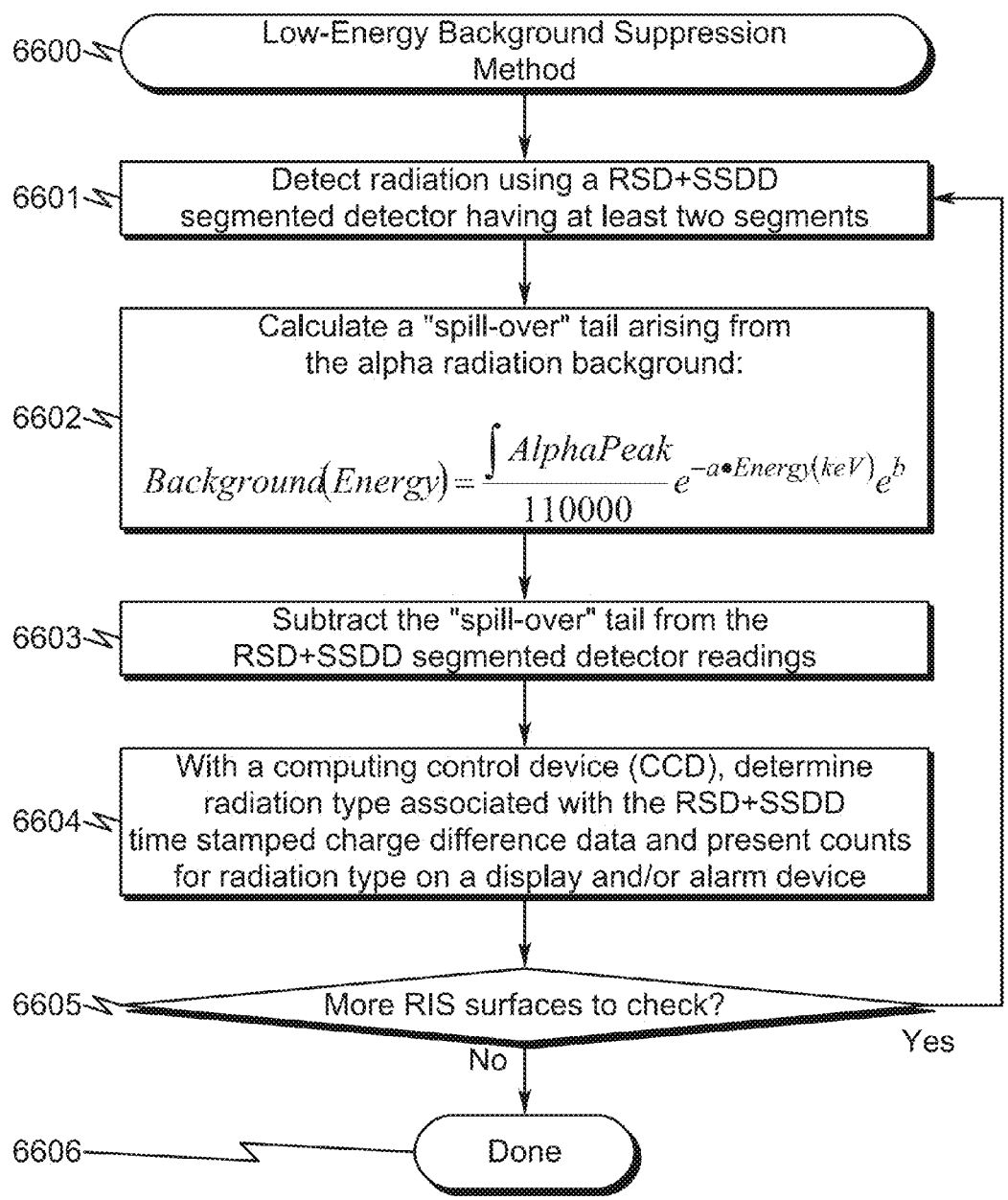
FIG. 66 illustrates a flowchart depicting a preferred exemplary method of removing background radiation from measured radiation counts collected from a RSD+SSDD detector combination.

A present invention method as generally depicted by the flowchart in FIG. 66 (6600) anticipates subtraction of the background radiation as described above using a method comprising:
  (1) Detecting radiation using a RSD+SSDD segmented detector having at least two segments (6601);
  (2) With a computing control device (CCD), calculating a "spill-over" tail arising from the alpha radiation background associated with the detected radiation (6602);
  (3) With a computing control device (CCD), subtracting the "spill-over" tail from the RSD+SSDD segmented detector detected radiation readings (6603);
  (4) With a computing control device (CCD), determining radiation types associated with the RSD+SSDD time-stamped charge difference data and presenting counts for radiation type on a display and/or alarm device (6604); and
  (5) Determining if additional radiation inspection surfaces are to be inspected, and if so, proceeding to step (1) (6605).

This general method summary may be augmented by the various elements described herein to produce a wide variety of invention embodiments consistent with this overall design description. While the following function may be used to describe and fit the "spill-over" tail, this equation may vary based on application context:

$$BackgroundCounts(\text{Energy}) = \frac{\int AlphaPeak}{110000} e^{-a \cdot Energy(keV)} e^{b} \quad (5)$$

Exemplary Application to Background Radiation Suppression (6700)-(7200)

Figure 67:
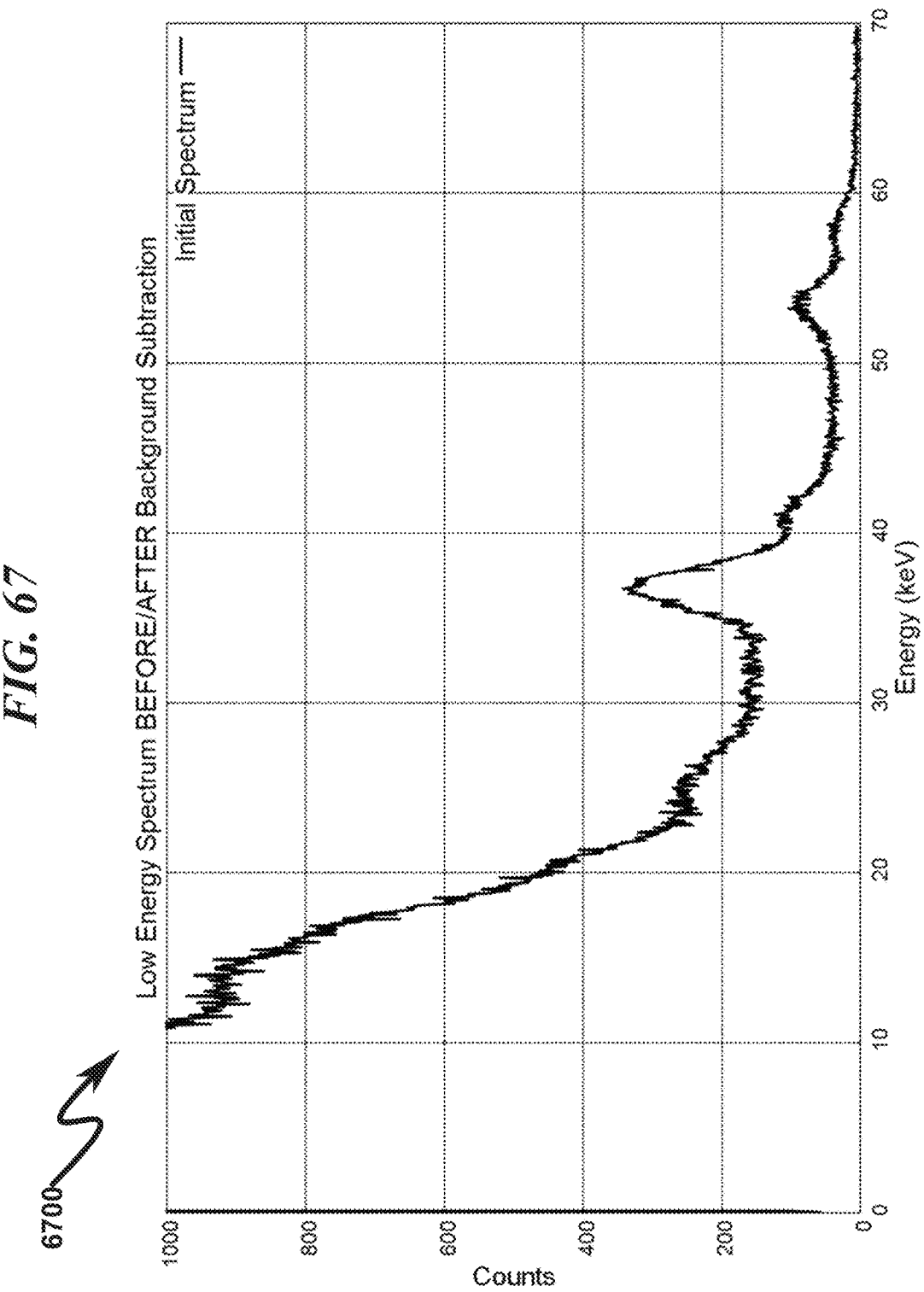
FIG. 67 illustrates an exemplary graph of initially collected radiation data.
Figure 68:
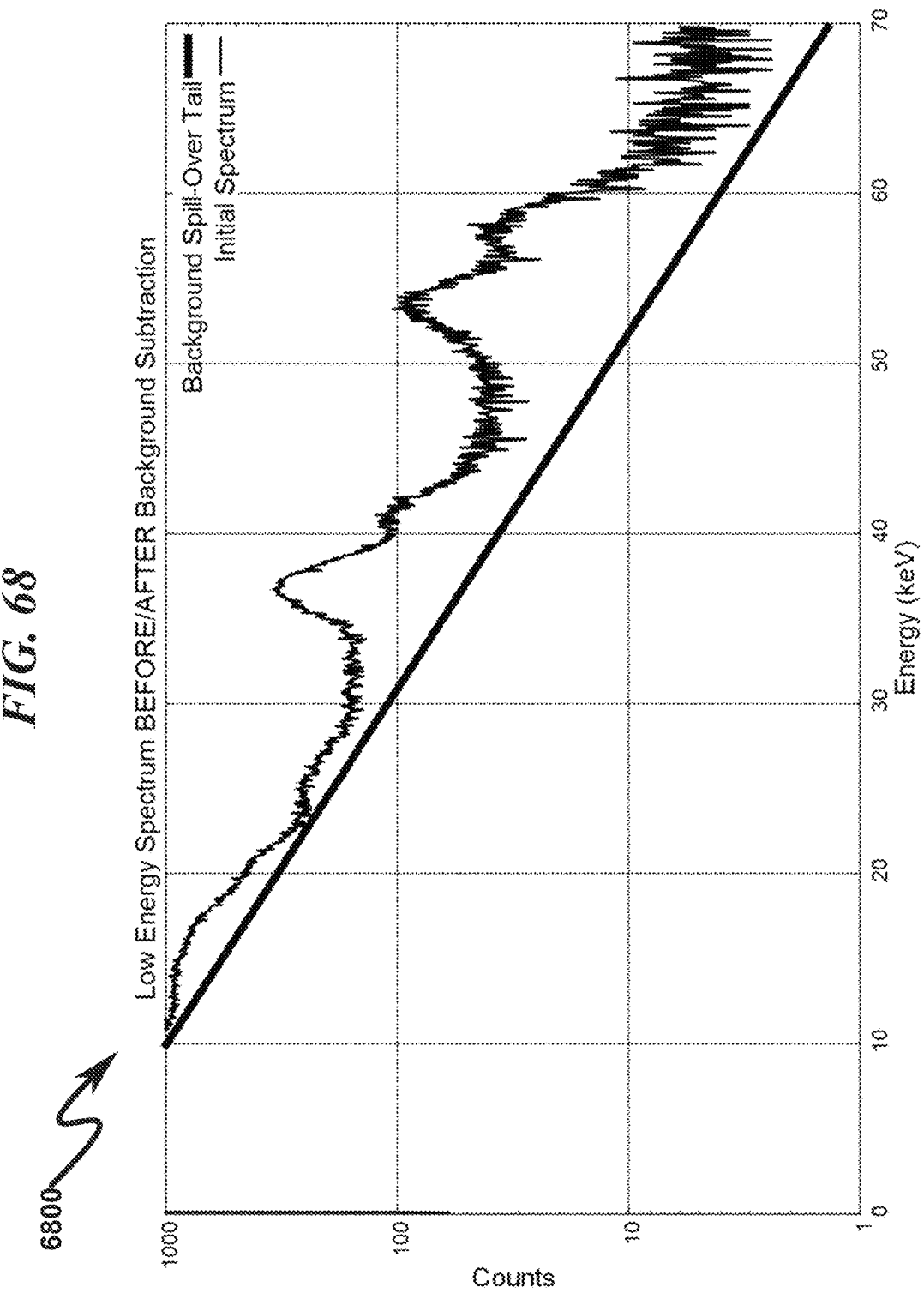
FIG. 68 illustrates an exemplary log fit of the background radiation "spill-over" tail against the measured radiation data.
Figure 69:
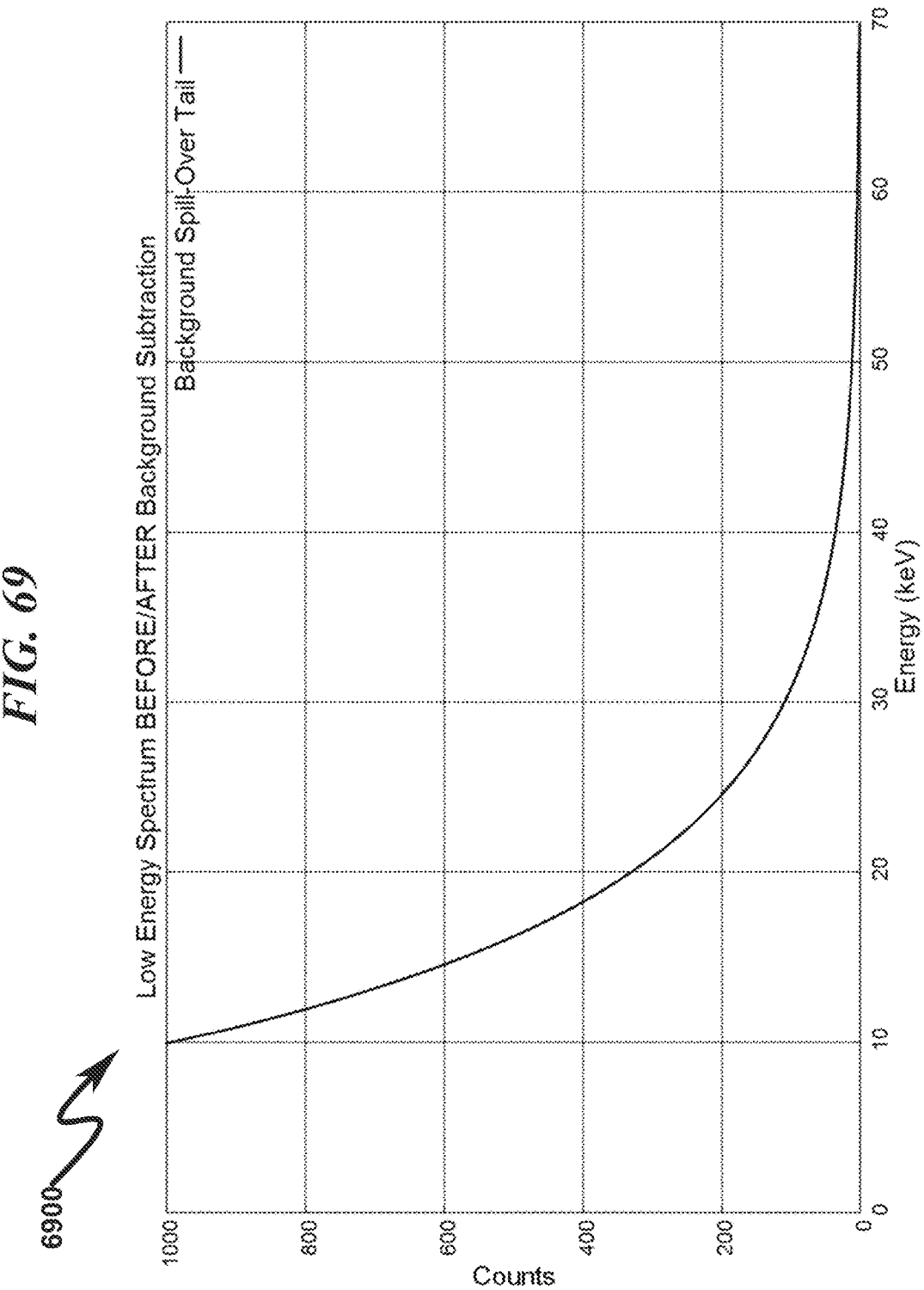
FIG. 69 illustrates an exemplary linear plot of a background radiation "spill-over" tail fitted to the measured radiation data.
Figure 70:
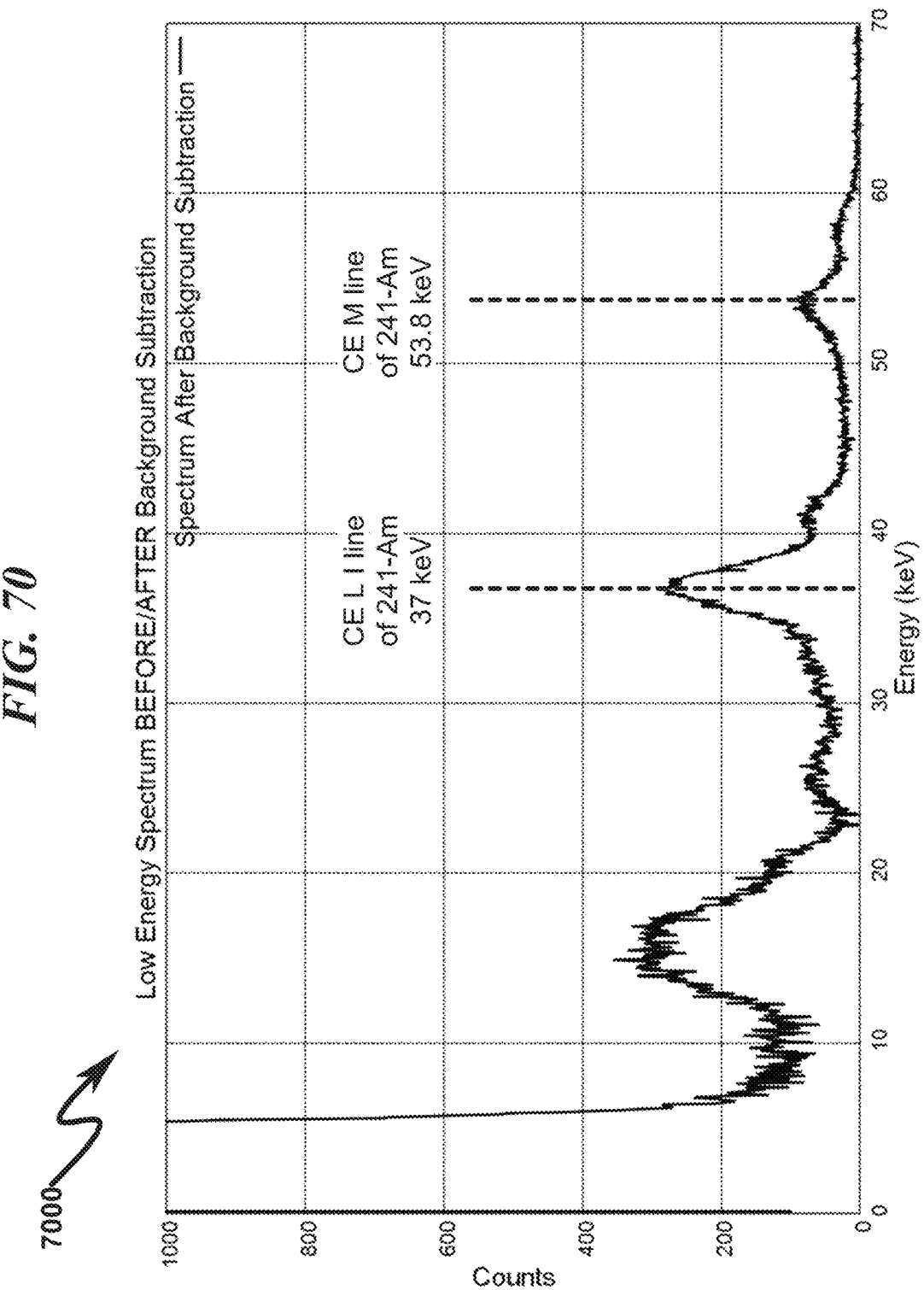
FIG. 70 illustrates a plot of the resulting low energy radiation counts after subtracting the background radiation "spill-over" tail from the measured radiation data using fitting parameters a=−0.11 and b=8.

To better understand how the background radiation subtraction may be applied in a variety of contexts, a concrete example will now be provided. As generally depicted in FIG. 67 (6700), a graph of an initial spectrum as obtained from the RSD+SSDD hybrid detector is depicted. The calculation of the spill-over tail as fitted to the initial spectrum is depicted in the logarithmic plot of FIG. 68 (6800) in which the fitting parameters of a=−0.11 and b=8 were used in this example. This background spill-over function is depicted in isolation in FIG. 69 (6900). FIG. 70 (7000) depicts the result of subtracting the calculated background spill-over function from the initial spectrum.

Note that this subtracted resulting graph (7000) allows clear indications of low energies where the 37 keV and 54 keV main conversion electron emission lines can be seen but where the 5485 keV emission line of 214-Am emitter could not be seen.

Figure 71:
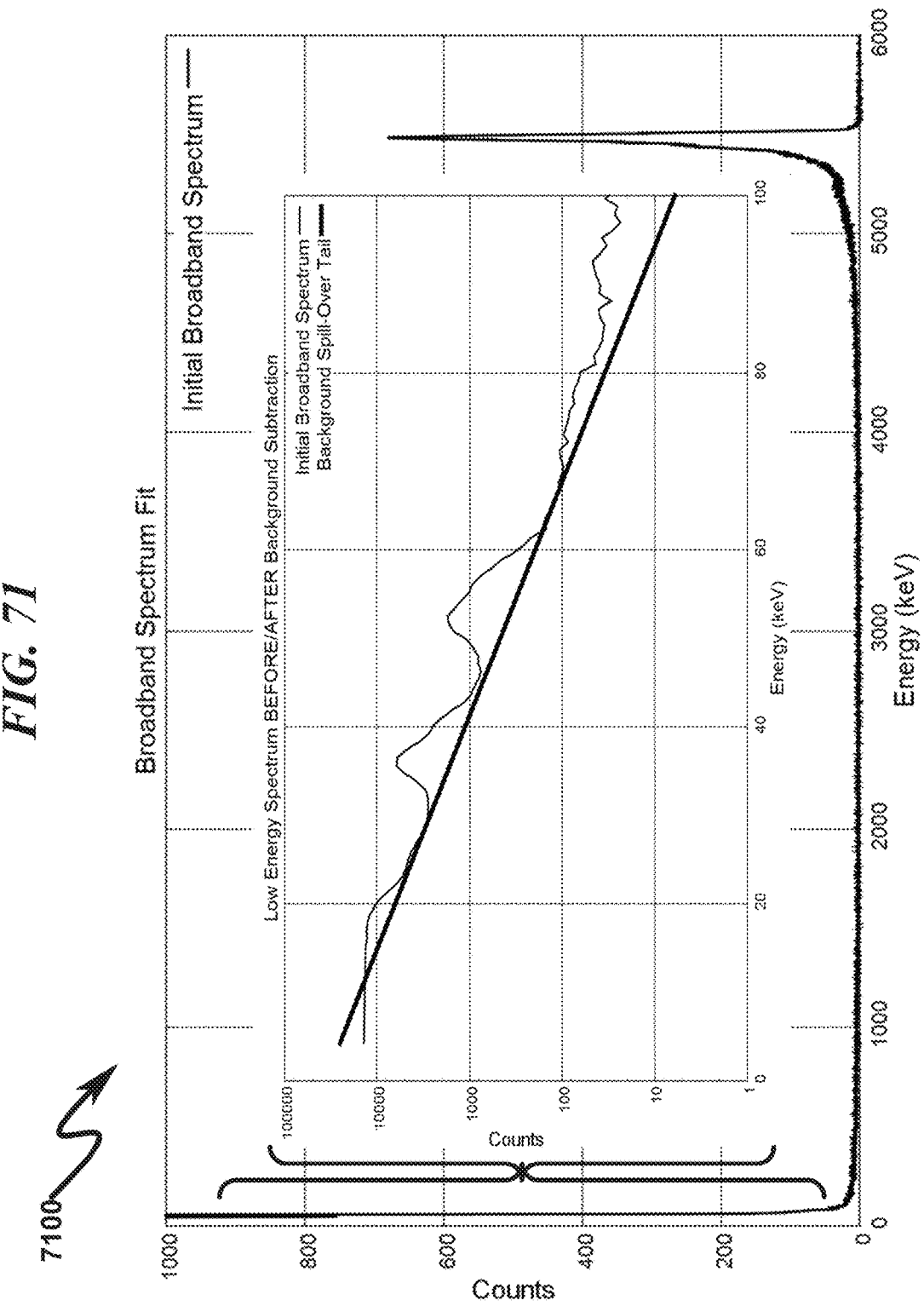
FIG. 71 illustrates another example of an exemplary graph of initially collected radiation data from a broad energy source with an inset graph depicting the background radiation "spill-over" tail fitted to the measured radiation data.
Figure 72:
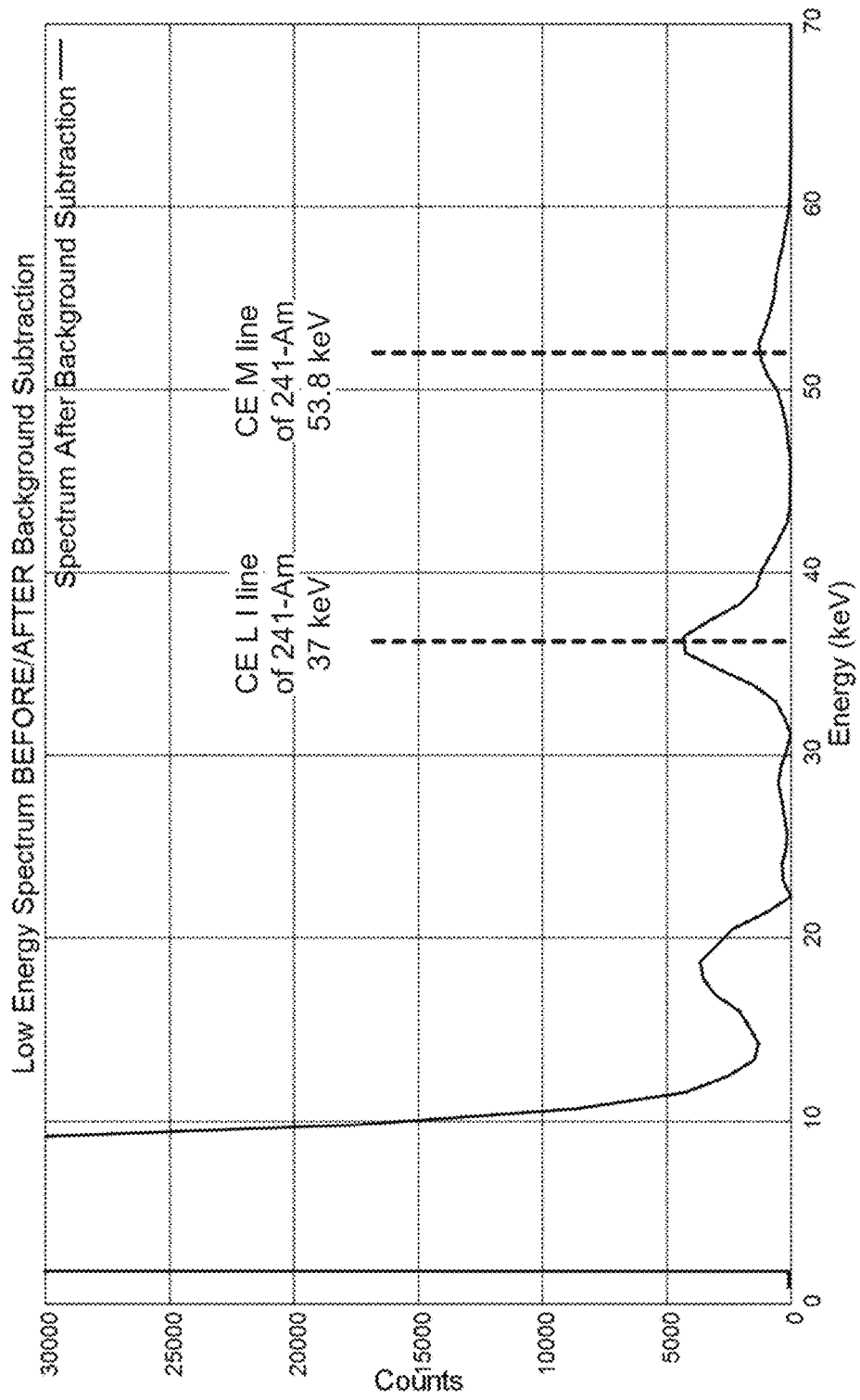
FIG. 72 illustrates a plot of the resulting low energy radiation counts after subtracting the background radiation "spill-over" tail from the measured radiation data using fitting parameters a=−0.087 and b=10.5.

Another application example of the present invention wherein a broad energy spectral acquisition is depicted in FIG. 71 (7100) where both low and high energies could be seen. The inset graph in FIG. 71 (7100) provides the fitted background characteristic for this graph indicating the fit parameters of a=−0.087 and b=10.5. The resulting radiation counts after subtraction of the background are depicted in FIG. 72 (7200).

Extended Detection Range

It should be noted that the detection of the low-energy spectra as presented in the above-discussed graphs would not be possible using conventional radiation detectors due to their low sensitivity. In contrast, the low-level detection capabilities of the present invention permit both high-energy and low-energy radiation events to be accurately measured, thus allowing low-level contamination events to be detectable in scenarios where conventional detectors would not be capable of detecting these events.

System Summary

The present invention system anticipates a wide variety of variations in the basic theme of construction, but can be generalized as a multi-radiation identification and dosimetry system comprising:
  (a) segmented silicon drift detector (SSDD);
  (b) radiation scintillation detector (RSD);
  (c) radiation detection chamber (RDC);
  (d) time stamping differentiator (TSD); and
  (e) computing control device (CCD);
  wherein:
  the SSDD is attached to the RSD with a SSDD-to-RSD mechanical coupler;
  the SSDD and the RSD are contained within the RDC;
  the SSDD comprises a plurality of segmented detection regions (SDR);
  the SSDD comprises an anode side and a cathode side;

the SSDD anode side is directed toward a radiation inspection surface (RIS) to be inspected for radiation contamination;

the SSDD cathode side is configured to contact the SSDD-to-RSD mechanical coupler;

the TSD is electrically coupled to the SSDD and the RSD and configured to collect and time-stamp charge data collected from directly absorbed radiation within each of the SDR and visual photons in the RSD that reach all of the SDR simultaneously; and the CCD is configured to determine a radiation type associated with the time-stamped charge data collected from the TSD and present counts associated with the radiation type on a display device.

This general system summary may be augmented by the various elements described herein to produce a wide variety of invention embodiments consistent with this overall design description.

Method Summary

The present invention method anticipates a wide variety of variations in the basic theme of implementation, but can be generalized as a multi-radiation identification and dosimetry method comprising:

(1) fabricating a segmented silicon drift detector (SSDD) with a plurality of segmented detection regions (SDR);

(2) attaching said SSDD to a radiation scintillation detector (RSD) with a SSDD-to-RSD mechanical coupler;

(3) securing the SSDD and the RSD within a radiation detection chamber (RDC);

(4) electrically coupling a time stamping differentiator (TSD) to the SSDD and the RSD and configuring the TSD to collect and time-stamp charge data collected from directly absorbed radiation within each of the SDR and visual photons in the RSD that reach all of the SDR simultaneously; and (5) with a computing control device (CCD), determining a radiation type associated with the time-stamped charge data collected from the TSD and presenting counts associated with the radiation type on a display device;

wherein:

the SSDD comprises an anode side and a cathode side;

the SSDD anode side is directed toward a radiation inspection surface (RIS) to be inspected for radiation contamination; and the SSDD cathode side is configured to contact the SSDD-to-RSD mechanical coupler.

This general method summary may be augmented by the various elements described herein to produce a wide variety of invention embodiments consistent with this overall design description.

Alternate System Summary

An alternative present invention system anticipates a wide variety of variations in the basic theme of construction, but can be generalized as a multi-radiation identification and dosimetry system comprising:

(a) segmented silicon drift detector (SSDD);
(b) radiation scintillation detector (RSD);
(c) radiation detection chamber (RDC);
(d) time stamping differentiator (TSD); and
(e) computing control device (CCD);

wherein:

the SSDD is attached to the RSD with a SSDD-to-RSD mechanical coupler;

the SSDD and the RSD are contained within the RDC;

the SSDD comprises a plurality of segmented detection regions (SDR);

the SSDD comprises an anode side and a cathode side;

the SSDD cathode side is directed toward a radiation inspection surface (RIS) to be inspected for radiation contamination;

the SSDD anode side is configured to contact the SSDD-to-RSD mechanical coupler;

the TSD is electrically coupled to the SSDD and the RSD and configured to collect and time-stamp charge data collected from directly absorbed radiation within each of the SDR and visual photons in the RSD that reach all of the SDR simultaneously; and the CCD is configured to determine a radiation type associated with the time-stamped charge data collected from the TSD and present counts associated with the radiation type on a display device.

This general system summary may be augmented by the various elements described herein to produce a wide variety of invention embodiments consistent with this overall design description.

Alternate Method Summary

An alternative present invention method anticipates a wide variety of variations in the basic theme of implementation, but can be generalized as a multi-radiation identification and dosimetry method comprising:

(1) fabricating a segmented silicon drift detector (SSDD) with a plurality of segmented detection regions (SDR);

(2) attaching said SSDD to a radiation scintillation detector (RSD) with a SSDD-to-RSD mechanical coupler;

(3) securing the SSDD and the RSD within a radiation detection chamber (RDC);

(4) electrically coupling a time stamping differentiator (TSD) to the SSDD and the RSD and configuring the TSD to collect and time-stamp charge data collected from directly absorbed radiation within each of the SDR and visual photons in the RSD that reach all of the SDR simultaneously; and (5) with a computing control device (CCD), determining a radiation type associated with the time-stamped charge data collected from the TSD and presenting counts associated with the radiation type on a display device;

wherein:

the SSDD comprises an anode side and a cathode side;

the SSDD cathode side is directed toward a radiation inspection surface (RIS) to be inspected for radiation contamination; and the SSDD anode side is configured to contact the SSDD-to-RSD mechanical coupler.

This general method summary may be augmented by the various elements described herein to produce a wide variety of invention embodiments consistent with this overall design description.

System/Method Variations

The present invention anticipates a wide variety of variations in the basic theme of construction. The examples presented previously do not represent the entire scope of possible usages. They are meant to cite a few of the almost limitless possibilities.

This basic system and method may be augmented with a variety of ancillary embodiments, including but not limited to:

An embodiment wherein the SSDD is attached to the RSD with adhesive.

An embodiment wherein the SSDD anode side comprises a plurality of interconnected anode connections.

An embodiment wherein the SSDD anode side comprises a plurality of concentric networks of inter-bonded anodes.

An embodiment wherein the SSDD anode side comprises a plurality of inter-bonded anodes, the inter-bonded anodes electrically coupled to a charge sensitive amplifier (CSA) and a main irradiation junction on the opposite side of the SSDD.

An embodiment wherein the SSDD comprises a telescope of SSDDs.

An embodiment wherein the SSDD anode side comprises a plurality of circular networks of inter-bonded anodes, the inter-bonded anodes having a size in the range of 100 um to 400 um.

An embodiment wherein the SSDD anode side comprises a plurality of rectangular networks of inter-bonded anodes.

An embodiment wherein the SSDD is cooled by a Peltier element.

An embodiment wherein the SDR is coupled to a charge sensitive amplifier (CSA).

An embodiment wherein every the SDR is coupled to an individual channel of a charge sensitive amplifier (CSA) implemented within an application specific integrated circuit (ASIC).

An embodiment wherein the TSD is configured to differentiate between alpha, beta, and gamma radiation.

An embodiment wherein the TSD is configured to differentiate between alpha radiation, beta radiation, conversion electrons, and X-rays.

An embodiment wherein the anode of the SSDD has a surface area in the range of 3 $cm^2$ to 4 $cm^2$.

An embodiment wherein the SSDD comprises the SDR regions numbering from 4 to 8.

An embodiment wherein the RDC further comprises a magnetic field generator configured to allow deviation of beta radiation outside of a detection region of the SDR.

An embodiment wherein the RDC further comprises an inspection chamber comprising a front access door and sliding inspection platform that permit insertion/removal of radiation inspection samples (RIS) on the inspection platform.

An embodiment wherein: the RDC further comprises an inspection chamber comprising a front access door and sliding inspection platform that permit insertion/removal of radiation inspection samples (RIS) on the inspection platform; the inspection platform configured to automatically retract from the inspection chamber upon opening of the front access door; and the inspection platform configured to automatically insert into the inspection chamber upon closing of the front access door.

An embodiment wherein the CCD is configured to compute an exponential background spill-over tail function that estimates alpha background radiation from the time-stamped charge data before determining the radiation type associated with the time-stamped charge data.

An embodiment wherein the CCD is configured to compute the counts associated with the radiation type by subtracting a background radiation function that estimates alpha background radiation from the time-stamped charge data.

An embodiment wherein the CCD is configured to compute the counts associated with the radiation type by subtracting an exponential background spill-over tail function that estimates alpha background radiation from the time-stamped charge data.

One skilled in the art will recognize that other embodiments are possible based on combinations of elements taught within the above invention description.

Generalized Computer Usable Medium

In various alternate embodiments, the present invention may be implemented as a computer program product for use with a computerized computing system. Those skilled in the art will readily appreciate that programs defining the functions defined by the present invention can be written in any appropriate programming language and delivered to a computer in many forms, including but not limited to: (a) information permanently stored on non-writeable storage media (e.g., read-only memory devices such as ROMs or CD-ROM disks); (b) information alterably stored on writeable storage media (e.g., floppy disks and hard drives); and/or (c) information conveyed to a computer through communication media, such as a local area network, a telephone network, or a public network such as the Internet. When carrying computer readable instructions that implement the present invention methods, such computer readable media represent alternate embodiments of the present invention.

As generally illustrated herein, the present invention system embodiments can incorporate a variety of computer readable media that comprise computer usable medium having computer readable code means embodied therein. One skilled in the art will recognize that the software associated with the various processes described herein can be embodied in a wide variety of computer accessible media from which the software is loaded and activated. Pursuant to In re *Beauregard*, 35 USPQ2d 1383 (U.S. Pat. No. 5,710, 578), the present invention anticipates and includes this type of computer readable media within the scope of the invention. Pursuant to In re *Nuijten*, 500 F.3d 1346 (Fed. Cir. 2007) (U.S. patent application Ser. No. 09/211,928), the present invention scope is limited to computer readable media wherein the media is both tangible and non-transitory.

CONCLUSION

A multi-radiation identification and dosimetry system and method that allows for monitoring of alpha, beta, and gamma radiation has been disclosed. The system/method incorporates a segmented silicon drift detector (SSDD) that allows measurement of directly absorbed radiation in the semiconductor (betas, conversion electrons, Lx lines, and alphas) on one SSDD segment and radiation from a radiation scintillation detector (RSD) on multiple segments of the SSDD. With the anode side of the SSDD directed toward the radiation inspection surface (RIS), the SSDD+RSD stacked radiation detector collects radiation which is processed by a charge sensitive amplifier (CSA) and then processed by a time stamping differentiator (TSD). A computing control device (CCD) may be configured to collect the time stamp differentiation data from the various SSDD segments to permit the simultaneous discrimination of several types of radiation by and presentation of these radiation types and counts on a display monitor.

CLAIMS INTERPRETATION

The following rules apply when interpreting the CLAIMS of the present invention:

The CLAIM PREAMBLE should be considered as limiting the scope of the claimed invention.

"WHEREIN" clauses should be considered as limiting the scope of the claimed invention.

"WHEREBY" clauses should be considered as limiting the scope of the claimed invention.

"ADAPTED TO" clauses should be considered as limiting the scope of the claimed invention.

"ADAPTED FOR" clauses should be considered as limiting the scope of the claimed invention.

The term "MEANS" specifically invokes the means-plus-function claims limitation recited in 35 U.S.C. § 112(f) and such claim shall be construed to cover the corresponding structure, material, or acts described in the specification and equivalents thereof.

The phrase "MEANS FOR" specifically invokes the means-plus-function claims limitation recited in 35 U.S.C. § 112(f) and such claim shall be construed to cover the corresponding structure, material, or acts described in the specification and equivalents thereof.

The phrase "STEP FOR" specifically invokes the step-plus-function claims limitation recited in 35 U.S.C. § 112(f) and such claim shall be construed to cover the corresponding structure, material, or acts described in the specification and equivalents thereof.

The step-plus-function claims limitation recited in 35 U.S.C. § 112(f) shall be construed to cover the corresponding structure, material, or acts described in the specification and equivalents thereof ONLY for such claims including the phrases "MEANS FOR", "MEANS", or "STEP FOR".

The phrase "AND/OR" in the context of an expression "X and/or Y" should be interpreted to define the set of "(X and Y)" in union with the set "(X or Y)" as interpreted by Ex Parte Gross (USPTO Patent Trial and Appeal Board, Appeal 2011-004811, Ser. No. 11/565,411, ("'and/or' covers embodiments having element A alone, B alone, or elements A and B taken together").

The claims presented herein are to be interpreted in light of the specification and drawings presented herein with sufficiently narrow scope such as to not preempt any abstract idea.

The claims presented herein are to be interpreted in light of the specification and drawings presented herein with sufficiently narrow scope such as to not preclude every application of any idea.

The claims presented herein are to be interpreted in light of the specification and drawings presented herein with sufficiently narrow scope such as to preclude any basic mental process that could be performed entirely in the human mind.

The claims presented herein are to be interpreted in light of the specification and drawings presented herein with sufficiently narrow scope such as to preclude any process that could be performed entirely by human manual effort.

What is claimed is:

1. A multi-radiation identification and dosimetry system comprising:

(a) segmented silicon drift detector (SSDD);
(b) radiation scintillation detector (RSD);
(c) radiation detection chamber (RDC);
(d) time stamping differentiator (TSD); and
(e) computing control device (CCD);
wherein:
said SSDD is attached to said RSD with a SSDD-to-RSD mechanical coupler;
said SSDD and said RSD are contained within said RDC;
said SSDD comprises a plurality of segmented detection regions (SDR);
said SSDD comprises an anode side and a cathode side;
said SSDD cathode side is directed toward a radiation inspection surface (RIS) to be inspected for radiation contamination;
said SSDD anode side is configured to contact said SSDD-to-RSD mechanical coupler;
said TSD is electrically coupled to said SSDD and said RSD and configured to collect and time-stamp charge data collected from directly absorbed radiation within each of said SDR and visual photons in said RSD that reach all of said SDR simultaneously; and
said CCD is configured to determine a radiation type associated with said time-stamped charge data collected from said TSD and present counts associated with said radiation type on a display device.

2. The multi-radiation identification and dosimetry system of claim 1 wherein said SSDD anode side comprises a plurality of interconnected anode connections.

3. The multi-radiation identification and dosimetry system of claim 1 wherein said SSDD anode side comprises a plurality of concentric networks of inter-bonded anodes.

4. The multi-radiation identification and dosimetry system of claim 1 wherein said SSDD anode side comprises a plurality of inter-bonded anodes, said inter-bonded anodes electrically coupled to a charge sensitive amplifier (CSA) and a main irradiation junction on the opposite side of said SSDD.

5. The multi-radiation identification and dosimetry system of claim 1 wherein said SSDD comprises a telescope of SSDDs.

6. The multi-radiation identification and dosimetry system of claim 1 wherein said SSDD anode side comprises a plurality of circular networks of inter-bonded anodes, said inter-bonded anodes having a size in the range of 100 um to 400 um.

7. The multi-radiation identification and dosimetry system of claim 1 wherein said SSDD anode side comprises a plurality of rectangular networks of inter-bonded anodes.

8. The multi-radiation identification and dosimetry system of claim 1 wherein said SSDD is cooled by a Peltier element.

9. The multi-radiation identification and dosimetry system of claim 1 wherein said SDR is coupled to a charge sensitive amplifier (CSA).

10. The multi-radiation identification and dosimetry system of claim 1 wherein every said SDR is coupled to an individual channel of a charge sensitive amplifier (CSA) implemented within an application specific integrated circuit (ASIC).

11. The multi-radiation identification and dosimetry system of claim 1 wherein said TSD is configured to differentiate between alpha, beta, and gamma radiation.

12. The multi-radiation identification and dosimetry system of claim 1 wherein said TSD is configured to differentiate between alpha radiation, beta radiation, conversion electrons, and X-rays.

13. The multi-radiation identification and dosimetry system of claim 1 wherein said anode of said SSDD has a surface area in the range of 3 cm² to 4 cm².

14. The multi-radiation identification and dosimetry system of claim 1 wherein said SSDD comprises said SDR regions numbering from 4 to 8.

15. The multi-radiation identification and dosimetry system of claim 1 wherein said RDC further comprises a magnetic field generator configured to allow deviation of beta radiation outside of a detection region of said SDR.

16. The multi-radiation identification and dosimetry system of claim 1 wherein said RDC further comprises an inspection chamber comprising a front access door and sliding inspection platform that permit insertion/removal of radiation inspection samples (RIS) on said inspection platform.

17. The multi-radiation identification and dosimetry system of claim 1 wherein: said RDC further comprises an inspection chamber comprising a front access door and sliding inspection platform that permit insertion/removal of radiation inspection samples (RIS) on said inspection platform; said inspection platform configured to automatically retract from said inspection chamber upon opening of said front access door; and said inspection platform configured to automatically insert into said inspection chamber upon closing of said front access door.

18. The multi-radiation identification and dosimetry system of claim 1 wherein said CCD is configured to compute an exponential background spill-over tail function that estimates alpha background radiation from said time-stamped charge data before determining said radiation type associated with said time-stamped charge data.

19. The multi-radiation identification and dosimetry system of claim 1 wherein said CCD is configured to compute said counts associated with said radiation type by subtracting a background radiation function that estimates alpha background radiation from said time-stamped charge data.

20. The multi-radiation identification and dosimetry system of claim 1 wherein said CCD is configured to compute said counts associated with said radiation type by subtracting an exponential background spill-over tail function that estimates alpha background radiation from said time-stamped charge data.

21. A multi-radiation identification and dosimetry method comprising:
(1) fabricating a segmented silicon drift detector (SSDD) with a plurality of segmented detection regions (SDR);
(2) attaching said SSDD to a radiation scintillation detector (RSD) with a SSDD-to-RSD mechanical coupler;
(3) securing said SSDD and said RSD within a radiation detection chamber (RDC);
(4) electrically coupling a time stamping differentiator (TSD) to said SSDD and said RSD and configuring said TSD to collect and time-stamp charge data collected from directly absorbed radiation within each of said SDR and visual photons in said RSD that reach all of said SDR simultaneously; and
(5) with a computing control device (CCD), determining a radiation type associated with said time-stamped charge data collected from said TSD and presenting counts associated with said radiation type on a display device;
wherein:
said SSDD comprises an anode side and a cathode side;
said SSDD cathode side is directed toward a radiation inspection surface (RIS) to be inspected for radiation contamination; and
said SSDD anode side is configured to contact said SSDD-to-RSD mechanical coupler.

22. The multi-radiation identification and dosimetry method of claim 21 wherein said SSDD anode side comprises a plurality of interconnected anode connections.

23. The multi-radiation identification and dosimetry method of claim 21 wherein said SSDD anode side comprises a plurality of concentric networks of inter-bonded anodes.

24. The multi-radiation identification and dosimetry method of claim 21 wherein said SSDD anode side comprises a plurality of inter-bonded anodes, said inter-bonded anodes electrically coupled to a charge sensitive amplifier (CSA) and a main irradiation junction on the opposite side of said SSDD.

25. The multi-radiation identification and dosimetry method of claim 21 wherein said SSDD comprises a telescope of SSDDs.

26. The multi-radiation identification and dosimetry method of claim 21 wherein said SSDD anode side comprises a plurality of circular networks of inter-bonded anodes, said inter-bonded anodes having a size in the range of 100 um to 400 um.

27. The multi-radiation identification and dosimetry method of claim 21 wherein said SSDD anode side comprises a plurality of rectangular networks of inter-bonded anodes.

28. The multi-radiation identification and dosimetry method of claim 21 wherein said SSDD is cooled by a Peltier element.

29. The multi-radiation identification and dosimetry method of claim 21 wherein said SDR is coupled to a charge sensitive amplifier (CSA).

30. The multi-radiation identification and dosimetry method of claim 21 wherein every said SDR is coupled to an individual channel of a charge sensitive amplifier (CSA) implemented within an application specific integrated circuit (ASIC).

31. The multi-radiation identification and dosimetry method of claim 21 wherein said TSD is configured to differentiate between alpha, beta, and gamma radiation.

32. The multi-radiation identification and dosimetry method of claim 21 wherein said TSD is configured to differentiate between alpha radiation, beta radiation, conversion electrons, and X-rays.

33. The multi-radiation identification and dosimetry method of claim 21 wherein said anode of said SSDD has a surface area in the range of 3 cm² to 4 cm².

34. The multi-radiation identification and dosimetry method of claim 21 wherein said SSDD comprises said SDR regions numbering from 4 to 8.

35. The multi-radiation identification and dosimetry method of claim 21 wherein said RDC further comprises a magnetic field generator configured to allow deviation of beta radiation outside of a detection region of said SDR.

36. The multi-radiation identification and dosimetry method of claim 21 wherein said RDC further comprises an inspection chamber comprising a front access door and sliding inspection platform that permit insertion/removal of radiation inspection samples (RIS) on said inspection platform.

37. The multi-radiation identification and dosimetry method of claim 21 wherein:
said RDC further comprises an inspection chamber comprising a front access door and sliding inspection platform that permit insertion/removal of radiation inspection samples (RIS) on said inspection platform;

said inspection platform configured to automatically retract from said inspection chamber upon opening of said front access door; and said inspection platform configured to automatically insert into said inspection chamber upon closing of said front access door.

38. The multi-radiation identification and dosimetry method of claim 21 wherein said CCD is configured to compute an exponential background spill-over tail function that estimates alpha background radiation from said time-stamped charge data before determining said radiation type associated with said time-stamped charge data.

39. The multi-radiation identification and dosimetry method of claim 21 wherein said CCD is configured to compute said counts associated with said radiation type by subtracting a background radiation function that estimates alpha background radiation from said time-stamped charge data.

40. The multi-radiation identification and dosimetry method of claim 21 wherein said CCD is configured to compute said counts associated with said radiation type by subtracting an exponential background spill-over tail function that estimates alpha background radiation from said time-stamped charge data.

41. A tangible non-transitory computer usable medium having computer-readable program code means embodied thereon comprising a multi-radiation identification and dosimetry method, said method operating on data collected from a multi-radiation identification and dosimetry system comprising:
    (a) segmented silicon drift detector (SSDD);
    (b) radiation scintillation detector (RSD);
    (c) radiation detection chamber (RDC);
    (d) time stamping differentiator (TSD); and
    (e) computing control device (CCD);
    wherein:
    said SSDD is attached to said RSD with a SSDD-to-RSD mechanical coupler;
    said SSDD and said RSD are contained within said RDC;
    said SSDD comprises a plurality of segmented detection regions (SDR);
    said SSDD comprises an anode side and a cathode side;
    said SSDD cathode side is directed toward a radiation inspection surface (RIS) to be inspected for radiation contamination;
    said SSDD anode side is configured to contact said SSDD-to-RSD mechanical coupler;
    said TSD is electrically coupled to said SSDD and said RSD and configured to collect and time-stamp charge data collected from directly absorbed radiation within each of said SDR and visual photons in said RSD that reach all of said SDR simultaneously; and
    said CCD is configured to determine a radiation type associated with said time-stamped charge data collected from said TSD and present counts associated with said radiation type on a display device;
    wherein said method comprises the steps of:
    with said computing control device (CCD), determining a radiation type associated with said time-stamped charge data collected from said TSD; and
    presenting counts associated with said radiation type on a display device.

42. The computer useable medium of claim 41 wherein said SSDD anode side comprises a plurality of interconnected anode connections.

43. The computer useable medium of claim 41 wherein said SSDD anode side comprises a plurality of concentric networks of inter-bonded anodes.

44. The computer useable medium of claim 41 wherein said SSDD anode side comprises a plurality of inter-bonded anodes, said inter-bonded anodes electrically coupled to a charge sensitive amplifier (CSA) and a main irradiation junction on the opposite side of said SSDD.

45. The computer useable medium of claim 41 wherein said SSDD comprises a telescope of SSDDs.

46. The computer useable medium of claim 41 wherein said SSDD anode side comprises a plurality of circular networks of inter-bonded anodes, said inter-bonded anodes having a size in the range of 100 um to 400 um.

47. The computer useable medium of claim 41 wherein said SSDD anode side comprises a plurality of rectangular networks of inter-bonded anodes.

48. The computer useable medium of claim 41 wherein said SSDD is cooled by a Peltier element.

49. The computer useable medium of claim 41 wherein said SDR is coupled to a charge sensitive amplifier (CSA).

50. The computer useable medium of claim 41 wherein every said SDR is coupled to an individual channel of a charge sensitive amplifier (CSA) implemented within an application specific integrated circuit (ASIC).

51. The computer useable medium of claim 41 wherein said TSD is configured to differentiate between alpha, beta, and gamma radiation.

52. The computer useable medium of claim 41 wherein said TSD is configured to differentiate between alpha radiation, beta radiation, conversion electrons, and X-rays.

53. The computer useable medium of claim 41 wherein said anode of said SSDD has a surface area in the range of 3 $cm^2$ to 4 $cm^2$.

54. The computer useable medium of claim 41 wherein said SSDD comprises said SDR regions numbering from 4 to 8.

55. The computer useable medium of claim 41 wherein said RDC further comprises a magnetic field generator configured to allow deviation of beta radiation outside of a detection region of said SDR.

56. The computer useable medium of claim 41 wherein said RDC further comprises an inspection chamber comprising a front access door and sliding inspection platform that permit insertion/removal of radiation inspection samples (RIS) on said inspection platform.

57. The computer useable medium of claim 41 wherein: said RDC further comprises an inspection chamber comprising a front access door and sliding inspection platform that permit insertion/removal of radiation inspection samples (RIS) on said inspection platform; said inspection platform configured to automatically retract from said inspection chamber upon opening of said front access door; and said inspection platform configured to automatically insert into said inspection chamber upon closing of said front access door.

58. The computer useable medium of claim 41 wherein said CCD is configured to compute an exponential background spill-over tail function that estimates alpha background radiation from said time-stamped charge data before determining said radiation type associated with said time-stamped charge data.

59. The computer useable medium of claim 41 wherein said CCD is configured to compute said counts associated with said radiation type by subtracting a background radiation function that estimates alpha background radiation from said time-stamped charge data.

60. The computer useable medium of claim 41 wherein said CCD is configured to compute said counts associated with said radiation type by subtracting an exponential background spill-over tail function that estimates alpha background radiation from said time-stamped charge data.

* * * * *